US012643311B2

(12) United States Patent
Fahy et al.

(10) Patent No.: US 12,643,311 B2
(45) Date of Patent: Jun. 2, 2026

(54) FILMS, LAMINATES, AND METHODS OF MAKING COMPOSITIONS

(71) Applicant: Corning Incorporated, Corning, NY (US)

(72) Inventors: Kiyomi DeLige Fahy, Corning, NY (US); Jenny Kim, Sunnyvale, CA (US); Lingke Li, Shanghai (CN); Yang Li, Painted Post, NY (US); Kevin Robert McCarthy, Horseheads, NY (US); Hongxiang Wang, Shanghai (CN); Arlin Lee Weikel, Mansfield, PA (US)

(73) Assignee: CORNING INCORPORATED, Corning, NY (US)

( * ) Notice: Subject to any disclaimer, the term of this patent is extended or adjusted under 35 U.S.C. 154(b) by 193 days.

(21) Appl. No.: 18/290,835

(22) PCT Filed: Jul. 11, 2022

(86) PCT No.: PCT/US2022/036665
§ 371 (c)(1),
(2) Date: Jan. 22, 2024

(87) PCT Pub. No.: WO2023/003714
PCT Pub. Date: Jan. 26, 2023

(65) Prior Publication Data
US 2024/0367420 A1 Nov. 7, 2024

Related U.S. Application Data

(60) Provisional application No. 63/309,034, filed on Feb. 11, 2022, provisional application No. 63/224,657, filed on Jul. 22, 2021.

(51) Int. Cl.
*B32B 27/06* (2006.01)
*B32B 9/00* (2006.01)
(Continued)

(52) U.S. Cl.
CPC .............. *B32B 27/06* (2013.01); *B32B 9/005* (2013.01); *B32B 9/045* (2013.01); *B32B 17/10* (2013.01);
(Continued)

(58) Field of Classification Search
None
See application file for complete search history.

(56) References Cited

U.S. PATENT DOCUMENTS 4,783,504 A 11/1988 St. Clair et al.
4,822,857 A 4/1989 Gorman et al.
(Continued)

FOREIGN PATENT DOCUMENTS

CA 2343518 A1 * 3/2000 ............... C09J 7/29
CN 106700976 A 5/2017
(Continued)

OTHER PUBLICATIONS

"Kraton FG1901G", Polymer Data Document, 2019, 2 pages.
(Continued)

*Primary Examiner* — Tamra L. Dicus

(57) ABSTRACT

Laminates can comprise a substrate and a film. The film can comprise a film thickness from about 5 micrometers to about 400 micrometers and a tri-block copolymer comprising a first block positioned between two second blocks. The first block can be grafted with a first functional group. The first block can comprise a first glass transition temperature of about 0° C. or less. The two second blocks can each comprise a glass transition temperature of about 50° C. or more. A combined weight of the two second blocks can be from about 10 wt % to about 50 wt % of the tri-block copolymer. The film can comprise a refractive index from about 1.48 to about 1.55. Methods of forming a laminate can comprise disposing a film over a substrate. Methods can
(Continued)

further comprise heating the film and the substrate to a first temperature and then a second temperature.

19 Claims, 18 Drawing Sheets

(51) Int. Cl.

| | |
|---|---|
| *B32B 9/04* | (2006.01) |
| *B32B 17/10* | (2006.01) |
| *B32B 27/18* | (2006.01) |
| *B32B 37/10* | (2006.01) |
| *B32B 37/18* | (2006.01) |
| *C08F 287/00* | (2006.01) |

(52) U.S. Cl.

CPC .......... *B32B 27/18* (2013.01); *B32B 37/1018* (2013.01); *B32B 37/182* (2013.01); *C08F 287/00* (2013.01); *B32B 2250/02* (2013.01); *B32B 2307/412* (2013.01); *B32B 2307/418* (2013.01); *B32B 2307/542* (2013.01); *B32B 2307/7376* (2023.05); *B32B 2457/20* (2013.01)

(56) References Cited

U.S. PATENT DOCUMENTS

| | | | |
|---|---|---|---|
| 5,112,911 A | 5/1992 | Mori et al. | |
| 6,649,103 B1 | 11/2003 | Bousmina et al. | |
| 7,931,773 B2 | 4/2011 | Mahdi et al. | |
| 8,192,843 B2 | 6/2012 | Ober et al. | |
| 8,854,623 B2 | 10/2014 | Fontaine et al. | |
| 9,394,442 B2 | 7/2016 | Adams et al. | |
| 10,669,415 B2 | 6/2020 | Thimonier | |
| 10,840,474 B2 | 11/2020 | Al et al. | |
| 2010/0292403 A1* | 11/2010 | Ansems ................. | C09J 151/06 |
| | | | 525/125 |
| 2011/0226415 A1* | 9/2011 | Husemann .............. | B32B 17/10 |
| | | | 156/306.6 |
| 2018/0163024 A1 | 6/2018 | Gopalan et al. | |
| 2018/0179422 A1* | 6/2018 | Hartinger ................... | C09J 4/06 |
| 2018/0215929 A1 | 8/2018 | Deegan et al. | |
| 2018/0265740 A1* | 9/2018 | Chien ................ | C08G 18/4808 |
| 2019/0185604 A1 | 6/2019 | Gopalan et al. | |
| 2019/0203084 A1 | 7/2019 | Chen et al. | |
| 2020/0292731 A1 | 9/2020 | Park et al. | |
| 2020/0324521 A1 | 10/2020 | Park et al. | |
| 2020/0325372 A1* | 10/2020 | Shah .......................... | C09J 7/00 |
| 2020/0339823 A1 | 10/2020 | Deegan et al. | |
| 2021/0108077 A1* | 4/2021 | Berleue .............. | C08F 290/067 |

FOREIGN PATENT DOCUMENTS

| | | | | | |
|---|---|---|---|---|---|
| CN | 108350284 A | | 7/2018 | | |
| CN | 108561636 A | | 9/2018 | | |
| CN | 108610627 A | | 10/2018 | | |
| CN | 108753184 A | | 11/2018 | | |
| CN | 109054417 A | | 12/2018 | | |
| CN | 109705749 A | | 5/2019 | | |
| CN | 109957253 A | | 7/2019 | | |
| CN | 110669462 A | * | 1/2020 | ........... | C09J 157/02 |
| CN | 108329638 B | | 7/2020 | | |
| DE | 102006059295 B4 | | 12/2009 | | |
| EP | 0414768 B1 | | 2/1994 | | |
| EP | 1170114 A1 | | 1/2002 | | |
| EP | 1170116 A1 | | 1/2002 | | |
| IN | 201917009597 A | | 6/2019 | | |
| JP | 5758261 B2 | | 8/2015 | | |
| JP | 2020-143185 A | | 9/2020 | | |
| KR | 10-2068729 B1 | | 1/2020 | | |
| WO | 89/11512 A1 | | 11/1989 | | |
| WO | 2019/109328 A1 | | 6/2019 | | |

OTHER PUBLICATIONS

"Kraton FG1924G", Polymer Data Document, 2019, 2 pages.

Abrahamson et al; "Optically Clear Adhesives for OLED"; Organic Light Emitting Diode Technology and Applications (2019) 24 Pages.

International Search Report and Written Opinion of the International Searching Authority; PCT/US2022/036665; dated Dec. 21, 2022; 17 pages; European Patent Office.

* cited by examiner

FILMS, LAMINATES, AND METHODS OF MAKING COMPOSITIONS

CROSS-REFERENCE TO RELATED APPLICATIONS

This application is a national stage entry of International Patent Application Serial No. PCT/US2022/036665, filed on Jul. 11, 2022, which in turn, claims the benefit of priority under 35 U.S.C. § 119 of U.S. Provisional Application Ser. No. 63/224,657 filed on Jul. 22, 2021 and U.S. Provisional Application Ser. No. 63/309,034 filed on Feb. 11, 2022, the contents of each of which are relied upon and incorporated herein by reference in their entireties.

FIELD

The present disclosure relates generally to films, laminates, methods of making films, and methods of making laminates and, more particularly, to films, laminates, methods of making films, and methods of making laminates comprising a polymeric material.

BACKGROUND

Laminates are commonly used, for example, in display applications, for example, liquid crystal displays (LCDs), electrophoretic displays (EPD), organic light emitting diode displays (OLEDs), plasma display panels (PDPs), or the like. It is known to use adhesives to attach portions of foldable displays and/or foldable protective covers to form laminates. Also, it is known to use polymer-based portions in foldable displays and/or foldable protective covers.

Some prior foldable displays have used polymer portions and/or adhesives. However, traditional adhesives can impair the transparency and/or low haze of a display if there is a refractive index mismatch, the adhesive becomes opaque after repeated use, or the portions attached by the adhesive delaminate. Further, polymer-based portions can impair the flexibility and/or impact resistance of the foldable display and/or foldable protective cover. Moreover, adhesives and/or polymer-based portions can impair the flexibility and bending performance of the foldable display and/or foldable protective cover if the bending strain exceeds the ultimate elongation of the adhesive and/or polymer-based portion.

Further, application of adhesives and/or polymer-based portions can comprise applying a liquid material to the portions to be attached. Liquid materials can be difficult to handle, and certain laminates cannot be formed without multiple applications of liquid material and curing steps.

There is a desire to develop laminates, for example, as foldable displays or foldable protective covers to mount on foldable displays. Laminates should have good impact and puncture resistance. At the same time, foldable displays and foldable covers should have small minimum bend radii (e.g., about 10 millimeters (mm) or less). Additionally, there is a desire to develop methods of forming laminates that overcome the above problems of using liquid materials.

SUMMARY

There are set forth herein films and laminates comprising a polymeric material and methods of making the same. Providing a polymeric material comprising low haze can enable good visibility through the film and/or laminate. In aspects, a refractive index of the polymeric material of the film can comprise a small (e.g., about 0.01 or less) absolute difference from a refractive index of a substrate. Further the film and/or laminate can substantially maintain its optical properties (e.g., CIE values, color difference) after being held in various environments for 5 days or more or 10 days or more.

In aspects, the polymeric material can comprise a tri-block material. Providing a tri-block copolymer can improve an impact resistance of the film and/or laminate, for example, by absorbing and dissipating impact energy. Providing more than one type of tri-block copolymer can enable fine-tuning of the refractive index of the resulting layer (e.g., film). Providing a first block of the tri-block copolymer with a first glass transition temperature (Tg1) outside (e.g., below) of an operating range (e.g., from about 0° C. to about 40° C., from about −20° C. to about 60° C.) can enable consistent properties across the operating range of the article (e.g., film, laminate). Providing a second block of the tri-block copolymer with a second glass transition temperature outside (e.g., above) of an operating range (e.g., from about 0° C. to about 40° C., from about −20° C. to about 60° C.) can enable consistent properties across the operating range of the article (e.g., film, laminate). Providing a di-block copolymer in combination with the tri-block copolymer can increase a flexibility and/or impact resistance of the resulting layer (e.g., film, laminate). Providing a di-block copolymer comprising materials corresponding to the materials of the first block and one or both of the two second blocks can enable increased flexibility without substantially modifying the optical properties of the layer (e.g., film, laminate). Providing an antioxidant can improve a color of the film and/or laminate, for example by decreasing yellowing as the film and/or laminate ages.

The film can comprise good adhesion to a substrate (e.g., glass-based substrate and/or ceramic-based substrate). Providing the tri-block copolymer comprising the first block grafted with the first functional group can improve adhesion of the film (e.g., tri-block copolymer) with a substrate (e.g., glass-based substrate, ceramic-based substrate). Providing a silane coupling agent can increase an adhesion of the layer (e.g., film) to a substrate (e.g., glass-based substrate, ceramic-based substrate, the rest of a laminate) and improve the durability of the film and/or laminate. Providing the first function group comprising a silane can increase an adhesion of the film (e.g., tri-block copolymer) without the need for a separate silane coupling agent, decreasing processing complexity and time. Providing the first functional group comprising a silane can maintain and/or increase an adhesion of the film (e.g., tri-block copolymer) as the film ages, for example, as the silane forms and/or reforms interactions with the substrate, silsesquioxanes, and/or other silanes. Providing the film can enable a substantially uniform thickness of the film when incorporated in the laminate, for example, by having good dimensional stability. Providing the film can be easy to handle, store, and/or process into the laminate.

Methods are disclosed that can form a laminate from a film and a substrate. For example, a film can be formed of an adhesive material and/or a polymeric material by heating a liquid comprising the material and/or by extruding the material into a film. Providing a film can reduce processing steps to assemble the laminate. For example, laminates can be assembled using methods of the disclosure using a single heating cycle to bond one or more films, substrates, and/or other components of the laminate. Consequently, processing time and costs to create the laminate can be reduced. Providing films can reduce energy use, reduce material waste, and otherwise improve forming of the laminate.

Multiple films can be stacked to form shapes and/or thicknesses configured to correspond to a shape of the substrate (e.g., recess) and/or a first portion and second portion.

Some example aspects of the disclosure are described below with the understanding that any of the features of the various aspects may be used alone or in combination with one another.

Aspect 1. A film comprising:

a film thickness defined between a first major surface and a second major surface in a range from about 5 micrometers to about 400 micrometers;

a tri-block copolymer comprising a first block positioned between two second blocks, the first block grafted with a first functional group, the first block comprising a first glass transition temperature Tg1 of about 0° C. or less, the two second blocks each comprising a glass transition temperature Tg of about 50° C. or more, a combined weight of the two second blocks is in a range from about 10 weight % to about 50 weight % of the tri-block copolymer; and a refractive index at 589 nanometers in a range from about 1.48 to about 1.55.

Aspect 2. The film of aspect 1, wherein the combined weight of the two second blocks is in a range from about 13 weight % to about 30 weight % of the tri-block copolymer.

Aspect 3. The film of any one of aspects 1-2, wherein the refractive index at 589 nanometers is in a range from about 1.498 to about 1.502.

Aspect 4. The film of any one of aspects 1-3, wherein one or both of the second blocks is selected from a group consisting of polystyrene, poly(vinyl pyridine), poly(vinyl phenol), poly(ethylene terephthalate), polysulfone, parylene, poly(phenylene oxide), polyarylate, polycarbonate, poly(methyl methacrylate), polymethylacrylic acid, poly(acrylic acid), polymethacrylamide, polyacrylamide, polyacrylonitrile, and derivatives thereof.

Aspect 5. The film of aspect 4, wherein the glass transition temperature Tg of one or both of the second blocks is about 90° C. or more.

Aspect 6. The film of any one of aspects 4-5, wherein one or both of the second blocks comprise an aromatic-containing polymer.

Aspect 7. The film of any one of aspects 4-6, wherein one or both of the second blocks consists of polystyrene.

Aspect 8. The film of any one of aspects 4-7, wherein the two second blocks comprise the same material.

Aspect 9. The film of any one of aspects 1-8, wherein the first block is selected from a group consisting of polybutadiene, polybutylene, polyisobutylene, polyisoprene, poly(ethylene-co-butylene), poly(ethylene-co-butylene-co-styrene), poly(ethylene-co-propylene), and combinations thereof.

Aspect 10. The film of aspect 9, wherein the first block consists of a poly(ethylene-co-butylene) copolymer.

Aspect 11. The film of any one of aspects 1-10, wherein the first glass transition temperature Tg1 of the first block is about −20° C. or less.

Aspect 12. The film of any one of aspects 1-11, wherein the first functional group is selected from a group consisting of anhydrides, acrylates, isocyanates, maleates, and silanes.

Aspect 13. The film of aspect 12, wherein the first functional group consists of maleic anhydride.

Aspect 14. The film of aspect 12, wherein the first functional group consists of an ethoxysilane.

Aspect 15. The film of any one of aspects 1-14, wherein a weight of the first functional group is in a range from about 0.5 weight % to about 5 weight % of the tri-block copolymer.

Aspect 16. The film of aspect 15, wherein the weight of the first functional group is in a range from about 2 weight % to about 3 weight % of the tri-block copolymer.

Aspect 17. The film of any one of aspects 1-14, wherein a weight of the first functional group is in a range from about 0.5 weight % to about 2 weight % of the tri-block copolymer.

Aspect 18. The film of any one of aspects 1-17, wherein the tri-block copolymer comprises a plurality of tri-block copolymers, a first tri-block copolymer of the plurality of tri-block copolymers comprising a first combined weight of the two second blocks greater than a second combined weight of the two second blocks of a second tri-block copolymer of the plurality of tri-block copolymers.

Aspect 19. The film of any one of aspects 1-17, further comprising a di-block copolymer comprising an additional first block and an additional second block, wherein the additional first block comprises the same material as the first block of the tri-block copolymer, and the additional second block comprises the same material as at least one of the two second blocks of the tri-block copolymer.

Aspect 20. The film of aspect 19, wherein a mass ratio of a mass of the di-block copolymer to a combined mass of the tri-block copolymer is from about 5% to about 50%.

Aspect 21. The film of any one of aspects 1-20, wherein the film comprises a shear strength of about 2 MegaPascals or more in a Lap Shear Test after being held at about 25° C. for 10 days.

Aspect 22. The film of any one of aspects 1-20, wherein the film comprises a shear strength of about 1 MegaPascal or more in a Lap Shear Test after being held in a 65° C., 70% relative humidity environment for 10 days.

Aspect 23. The film of any one of aspects 1-22, wherein the film thickness is in a range from about 25 micrometers to about 200 micrometers.

Aspect 24. The film of aspect 23, wherein the film thickness is in a range from about 30 micrometers to about 80 micrometers.

Aspect 25. The film of any one of aspects 1-24, wherein the film comprises a color difference of about 0.5 or less after being held in a 60° C., 90% relative humidity environment for 120 hours.

Aspect 26. The film of any one of aspects 1-24, wherein the film comprises a color difference of about 0.5 or less after being held in a 60° C., 90% relative humidity environment for 240 hours.

Aspect 27. The film of any one of aspects 1-24, wherein the film comprises a color difference of about 1 or less after being held in a −25° C., 50% relative humidity environment for 120 hours.

Aspect 28. The film of any one of aspects 1-27, wherein an absolute difference in a CIE L* value between the film as-formed and the film is about 1 or less after being held in a 60° C., 90% relative humidity environment for 240 hours.

Aspect 29. The film of any one of aspects 1-27, wherein an absolute difference in a CIE L* value between the film as-formed and the film is about 1 or less after being held in a −25° C., 90% relative humidity environment for 240 hours.

Aspect 30. The film of any one of aspects 1-29, wherein an absolute difference in a CIE a* value between the film as-formed and the film is about 0.1 or less after being held in a 60° C., 90% relative humidity environment for 240 hours.

Aspect 31. The film of any one of aspects 1-30, wherein an absolute difference in a CIE b* value between the film as-formed and the film is about 0.7 or less after being held in a 60° C., 90% relative humidity environment for 240 hours.

Aspect 32. The film of any one of aspects 1-31, wherein a laminate comprising the film can withstand a pen drop height of 3 centimeters or more in a Pen Drop test, wherein the laminate comprises a glass-based substrate comprising a thickness of 50 micrometers attached to the first major surface of the film and a poly(ethylene terephthalate) layer comprising a thickness of 10 micrometers attached to the second major surface of the film.

Aspect 33. The film of any one of aspects 1-32, wherein the film comprises a transmittance of about 90% or more averaged over optical wavelengths in a range from 400 nanometers to about 700 nanometers.

Aspect 34. The film of any one of aspects 1-33, wherein the film consists of the tri-block copolymer and components thereof and an optional antioxidant.

Aspect 35. The film of any one of aspects 1-33, wherein the film further comprises an antioxidant.

Aspect 36. The film of any one of aspects 34-35, wherein a difference in CIE b* value between the film after being held in an 85° C. environment for 10 days and the film as-formed is about 0.10 or less.

Aspect 37. The film of any one of aspects 34-36, wherein the film comprises the antioxidant in a range from about 0.01 weight % to about 0.4 weight % of the film.

Aspect 38. The film of any one of aspects 1-37, wherein a weight of a free silane is less than about 0.1 weight % of the film.

Aspect 39. A laminate comprising:

a substrate comprising a third major surface and a fourth major surface opposite the third major surface, a substrate thickness defined between the third major surface and the fourth major surface; and the film of any one of aspects 1-37.

Aspect 40. The laminate of aspect 39, further comprising a silane coupling agent attaching the second major surface of the film to the third major surface of the substrate.

Aspect 41. The laminate of aspect 40, wherein the silane coupling agent comprises an amine-functionalized silane coupling agent.

Aspect 42. A laminate comprising:

a film comprising a first major surface and a second major surface opposite the first major surface, a film thickness defined between the first major surface and the second major surface, the film thickness in a range from about 5 micrometers to about 400 micrometers, the film comprising a tri-block copolymer comprising a first block positioned between two second blocks, the first block is grafted with a first functional group, the first block comprising a first glass transition temperature Tg1 of about 0° C. or less, the two second blocks each comprising a glass transition temperature Tg of about 50° C. or more, a combined weight of the two second blocks is in a range from about 10 weight % to about 50 weight % of the tri-block copolymer, and the film comprises a refractive index at 589 nanometers in a range from about 1.48 to about 1.55; and a substrate comprising a third major surface and a fourth major surface opposite the third major surface, a substrate thickness defined between the third major surface and the fourth major surface, and the film is disposed over the substrate.

Aspect 43. The laminate of aspect 42, further comprising a silane coupling agent attaching the second major surface of the film to the third major surface of the substrate.

Aspect 44. The laminate of aspect 43, wherein the silane coupling agent comprises an amine-functionalized silane coupling agent.

Aspect 45. The laminate of any one of aspects 42-44, wherein the film comprises a shear strength of about 1 MegaPascal or more in a Lap Shear Test after being held in a 65° C., 70% relative humidity environment for 10 days.

Aspect 46. The laminate of any one of aspects 42-44, wherein the film comprises a shear strength of about 2 MegaPascal or more in a Lap Shear Test after being held in a 65° C., 70% relative humidity environment for 10 days.

Aspect 47. The laminate of any one of aspects 42-44, wherein a shear strength of the laminate after being held in a 65° C., 70% relative humidity environment for 10 days is greater than a shear strength of the laminate as-formed, wherein shear strength is measured in a Lap Shear Test.

Aspect 48. The laminate of any one of aspects 42-47, wherein an absolute difference between a refractive index of the substrate at 589 nanometers and the refractive index of the film at 589 nanometers is about 0.01 or less.

Aspect 49. The laminate of any one of aspects 42-48, wherein a maximum absolute difference between a refractive index of the substrate and the refractive index of the film over optical wavelengths from 400 nanometers to about 700 nanometers is about 0.01 or less.

Aspect 50. The laminate of any one of aspects 42-49, wherein the substrate comprises a glass-based substrate and/or a ceramic-based substrate.

Aspect 51. The laminate of any one of aspects 42-50, wherein the substrate thickness is in a range from about 25 micrometers to about 2 millimeters.

Aspect 52. The laminate of aspect 51, wherein the substrate thickness is in a range from about 25 micrometers to about 300 micrometers.

Aspect 53. The laminate of any one of aspects 42-52, wherein the refractive index of the film at 589 nanometers is in a range from about 1.498 to about 1.502.

Aspect 54. The laminate of any one of aspects 42-53, wherein the combined weight of the two second blocks is in a range from about 13 weight % to about 30 weight % of the tri-block copolymer.

Aspect 55. The laminate of any one of aspects 42-54, wherein one or both of the second blocks is selected from a group consisting of polystyrene, poly(vinyl pyridine), poly (vinyl phenol), poly(ethylene terephthalate), polysulfone, parylene, poly(phenylene oxide), polyarylate, polycarbonate, poly(methyl methacrylate), polymethylacrylic acid, poly(acrylic acid), polymethacrylamide, polyacrylamide, polyacrylonitrile, and derivatives thereof.

Aspect 56. The laminate of aspect 55, wherein the glass transition temperature Tg of one or both of the second blocks is about 90° C. or more.

Aspect 57. The laminate of any one of aspects 53-56, wherein one or both of the second blocks comprise an aromatic-containing polymer.

Aspect 58. The laminate of any one of aspects 53-57, wherein one or both of the second blocks consists of polystyrene.

Aspect 59. The laminate of any one of aspects 42-58, wherein the two second blocks comprise the same material.

Aspect 60. The laminate of any one of aspects 42-59, wherein the first block is selected from a group consisting of polybutadiene, polybutylene, polyisobutylene, polyisoprene, poly(ethylene-co-butylene), poly(ethylene-co-butylene-co-styrene), poly(ethylene-co-propylene), and combinations thereof.

Aspect 61. The laminate of aspect 60, wherein the first block consists of a poly(ethylene-co-butylene) copolymer.

Aspect 62. The laminate of any one of aspects 42-61, wherein a first glass transition temperature Tg1 of the first block is about −20° C. or less.

Aspect 63. The laminate of any one of aspects 42-62, wherein the first functional group is selected from a group consisting of anhydrides, acrylates, isocyanates, maleates, and silanes.

Aspect 64. The laminate of aspect 63, wherein the first functional group consists of maleic anhydride.

Aspect 65. The laminate of aspect 63, wherein the first functional group consists of an ethoxysilane.

Aspect 66. The laminate of any one of aspects 42-65, wherein a weight of the first functional group is in a range from about 0.5 weight % to about 5 weight % of the tri-block copolymer.

Aspect 67. The laminate of aspect 66, wherein the weight of the first functional group is in a range from about 2 weight % to about 3 weight % of the tri-block copolymer.

Aspect 68. The laminate of any one of aspects 42-65, wherein a weight of the first functional group is in a range from about 0.5 weight % to about 2 weight % of the tri-block copolymer.

Aspect 69. The laminate of any one of aspects 42-68, wherein the tri-block copolymer comprises a plurality of tri-block copolymers, a first tri-block copolymer of the plurality of tri-block copolymers comprising a first combined weight of the two second blocks greater than a second combined weight of the two second blocks of a second tri-block copolymer of the plurality of tri-block copolymers.

Aspect 70. The laminate of any one of aspects 42-69, wherein the film further comprises a di-block copolymer comprising an additional first block and an additional second block, the additional first block comprises the same material as the first block of the tri-block copolymer, and the additional second block comprises the same material as at least one of the two second blocks of the tri-block copolymer.

Aspect 71. The laminate of aspect 70, wherein a mass ratio of a mass of the di-block copolymer to a mass of the tri-block copolymer is from about 5% to about 50%.

Aspect 72. The laminate of any one of aspects 42-71, wherein the film thickness is in a range from about 25 micrometers to about 200 micrometers.

Aspect 73. The laminate of aspect 72, wherein the film thickness is in a range from about 30 micrometers to about 80 micrometers.

Aspect 74. The laminate of any one of aspects 42-73, wherein the film comprises a color difference of about 0.5 or less after being held in a 60° C., 90% relative humidity environment for 120 hours.

Aspect 75. The laminate of any one of aspects 42-73, wherein the film comprises a color difference of about 0.5 or less after being held in a 60° C., 90% relative humidity environment for 240 hours.

Aspect 76. The laminate of any one of aspects 42-73, wherein the film comprises a color difference of about 1 or less after being held in a −25° C., 50% relative humidity environment for 120 hours.

Aspect 77. The laminate of any one of aspects 42-76, wherein an absolute difference in a CIE L* value between the film as-formed and the film is about 1 or less after being held in a −25° C., 90% relative humidity environment for 240 hours.

Aspect 78. The laminate of any one of aspects 42-76, wherein an absolute difference in a CIE L* value between the film as-formed and the film is about 1 or less after being held in a 60° C., 90% relative humidity environment for 240 hours.

Aspect 79. The laminate of any one of aspects 42-78, wherein an absolute difference in a CIE a* value between the film as-formed and the film is about 0.1 or less after being held in a 60° C., 90% relative humidity environment for 240 hours.

Aspect 80. The laminate of any one of aspects 42-79, wherein an absolute difference in a CIE b* value between the film as-formed and the film is about 0.7 or less after being held in a 60° C., 90% relative humidity environment for 240 hours.

Aspect 81. The laminate of any one of aspects 42-80, wherein the film consists of the tri-block copolymer and components thereof and an optional antioxidant.

Aspect 82. The laminate of any one of aspects 42-80, wherein the film further comprises an antioxidant.

Aspect 83. The laminate of any one of aspects 81-82, wherein a difference in CIE b* value between the laminate after being held in an 85° C. environment for 10 days and the laminate as-formed is about 0.10 or less.

Aspect 84. The laminate of any one of aspects 81-83, wherein the film comprises the antioxidant in a range from about 0.01 weight % to about 0.4 weight %.

Aspect 85. The laminate of any one of aspects 42-84, wherein:

the substrate comprises a central portion comprising a first central surface area and a second central surface area opposite the first central surface area, a central thickness defined between the first central surface area and the second central surface area is in a range from about 25 micrometers to about 80 micrometers, the central thickness is less than the substrate thickness, and the first central surface area is recessed from the third major surface; and the laminate further comprises an another film comprising a fifth major surface and a sixth major surface opposite the fifth major surface, the another film comprises the same block copolymer with the first functional group grafted on the first block as the film, the fifth major surface of the another film contacts the first central surface area, and the sixth major surface of the another film contacts the second major surface of the film.

Aspect 86. A method of forming a laminate comprising:

disposing a liquid over a release liner;

drawing an applicator across a free surface of the liquid;

heating the liquid to form a film comprising a first major surface and a second major surface opposite the first major surface, a film thickness defined between the first major surface and the second major surface, the film thickness in a range from about 5 micrometers to about 400 micrometers, the first major surface contacting the release liner;

disposing the second major surface of the film over a third major surface of a substrate, the substrate comprising a fourth major surface opposite the third major surface, a substrate thickness defined between the third major surface and the fourth major surface;

removing the release liner;

applying a first release layer over the first major surface of the film and a second release layer over the fourth major surface of the substrate;

placing the film and the substrate in a vacuum container;

heating the film and the substrate at a first temperature in a range from about 40° C. to about 100° C. for a first period of time in a range from about 10 minutes to about 8 hours; and heating the film and the substrate at a second temperature in a range from about 150° C. to about 250° C. at a gauge pressure in a range from about 1.0 MegaPascals to about 1.5 MegaPascals for a second period of time in a range from about 30 minutes to about 2 hours to form the laminate.

Aspect 87. The method of aspect 86, wherein the liquid comprises an acrylate-based polymer and/or a urethane-based polymer.

Aspect 88. The method of aspect 87, further comprising:

heating reactants, an initiator, and a solvent in an inert environment to a reaction temperature of about 50° C. or more; and maintaining the reaction temperature for a third period of time in a range from about 12 hours to about 24 hours to form the liquid.

Aspect 89. The method of aspect 86, wherein the liquid comprises a tri-block copolymer and a solvent, the tri-block copolymer comprising a first block positioned between two second blocks, the first block is grafted with a first functional group, the first block comprising a first glass transition temperature $Tg1$ of about 0° C. or less, the two second blocks each comprising a glass transition temperature $Tg$ of about 50° C. or more, and a combined weight of the two second blocks is in a range from about 10 weight % to about 50 weight % of the tri-block copolymer.

Aspect 90. A method of forming a laminate comprising:

extruding a film comprising a first major surface and a second major surface opposite the first major surface, a film thickness defined between the first major surface and the second major surface in a range from about 5 micrometers to about 400 micrometers;

disposing second major surface of the film over a third major surface of a substrate, the substrate comprising a fourth major surface opposite the third major surface, a substrate thickness defined between the third major surface and the fourth major surface;

applying a first release layer over the first major surface of the film and a second release layer over the fourth major surface of the substrate;

placing the film and the substrate in a vacuum container;

heating the film and the substrate at a first temperature in a range from about 40° C. to about 100° C. for a time in a range from about 10 minutes to about 8 hours; and heating the film and substrate at a second temperature in a range from about 150° C. to about 250° C. at a gauge pressure in a range from about 1.0 MegaPascals to about 1.5 MegaPascals for a time in a range from about 30 minutes to about 2 hours to form the laminate.

Aspect 91. A method of forming a laminate from a film comprising a first major surface and a second major surface opposite the first major surface, a film thickness defined between the first major surface and the second major surface in a range from about 5 micrometers to about 400 micrometers, the method comprising:

disposing second major surface of the film over a third major surface of a substrate, the substrate comprising a fourth major surface opposite the third major surface, a substrate thickness defined between the third major surface and the fourth major surface;

applying a first release layer over the first major surface of the film and a second release layer over the fourth major surface of the substrate;

placing the film and the substrate in a vacuum container;

heating the film and the substrate at a first temperature in a range from about 40° C. to about 100° C. for a time in a range from about 10 minutes to about 8 hours; and heating the film and substrate at a second temperature in a range from about 150° C. to about 250° C. at a gauge pressure in a range from about 1.0 MegaPascals to about 1.5 MegaPascals for a time in a range from about 30 minutes to about 2 hours to form the laminate.

Aspect 92. The method of any one of aspects 90-91, wherein the film comprises a tri-block copolymer comprising a first block positioned between two second blocks, the first block is grafted with a first functional group, the first block comprising a first glass transition temperature $Tg1$ of about 0° C. or less, the two second blocks each comprising a glass transition temperature $Tg$ of about 50° C. or more, and a combined weight of the two second blocks is in a range from about 10 weight % to about 50 weight % of the tri-block copolymer.

Aspect 93. The method of aspect 89 or aspect 92, wherein the combined weight of the two second blocks is in a range from about 13 weight % to about 30 weight %.

Aspect 94. The method of any one of aspects 89 or 92-93 inclusive, wherein one or both of the second blocks is selected from a group consisting of polystyrene, poly(vinyl pyridine), poly(vinyl phenol), poly(ethylene terephthalate), polysulfone, parylene, poly(phenylene oxide), polyarylate, polycarbonate, poly(methyl methacrylate), polymethylacrylic acid, poly(acrylic acid), polymethacrylamide, polyacrylamide, polyacrylonitrile, and derivatives thereof.

Aspect 95. The method of aspect 94, wherein the glass transition temperature $Tg$ of one or both of the second blocks is about 90° C. or more.

Aspect 96. The method of any one of aspects 94-95, wherein one or both of the second blocks comprise an aromatic-containing polymer.

Aspect 97. The method of any one of aspects 94-96, wherein one or both of the second blocks consists of polystyrene.

Aspect 98. The method of any one of aspects 94-97, wherein the two aromatic blocks comprise the same material.

Aspect 99. The method of any one of aspects 89 or 92-98 inclusive, wherein the first block is selected from a group consisting of polybutadiene, polybutylene, polyisobutylene, polyisoprene, poly(ethylene-co-butylene), poly(ethylene-co-butylene-co-styrene), poly(ethylene-co-propylene), and combinations thereof.

Aspect 100. The method of aspect 99, wherein the first block consists of a poly(ethylene-co-butylene) copolymer.

Aspect 101. The method of any one of aspects 89 or 92-100 inclusive, wherein the first functional group is selected from a group consisting of anhydrides, acrylates, isocyanates, maleates, and silanes.

Aspect 102. The method of aspect 100, wherein the first functional group consists of maleic anhydride.

Aspect 103. The method of aspect 100, wherein the first functional group consists of an ethoxysilane.

Aspect 104. The method of any one of aspects 89 or 92-103 inclusive, wherein a weight of the first functional group is in a range from about 0.5 weight % to about 5 weight % of the tri-block copolymer.

Aspect 105. The method of aspect 104, wherein the weight of the first functional group is in a range from about 2 weight % to about 3 weight % of the tri-block copolymer.

Aspect 106. The method of any one of aspects 89 or 92-103 inclusive, wherein a weight of the first functional group is in a range from about 0.5 weight % to about 2 weight % of the tri-block copolymer.

Aspect 107. The method of any one of aspects 89 or 92-106 inclusive, wherein the tri-block copolymer comprises a plurality of tri-block copolymers, a first tri-block copolymer of the plurality of tri-block copolymers comprising a first combined weight of the two second blocks greater than a second combined weight of the two second blocks of a second tri-block copolymer of the plurality of tri-block copolymers.

Aspect 108. The method of any one of aspects 89 or 92-106 inclusive, wherein the film further comprises a di-block copolymer comprising an additional first block and an additional second block, the additional first block comprises the same material as the first block of the tri-block copolymer, and the additional second block comprises the same material as at least one of the two second blocks of the tri-block copolymer.

Aspect 109. The method of aspect 108, wherein a mass ratio of a mass of the di-block copolymer to a mass of the tri-block copolymer is from about 5% to about 50%.

Aspect 110. The method of any one of aspects 89 or 92-109 inclusive, further comprising feeding an initial tri-block copolymer and a grafting material through an extruder to form the tri-block copolymer.

Aspect 111. The method of any one of aspects 89 or 92-110 inclusive, wherein the film consists of the tri-block copolymer and components thereof and an optional antioxidant.

Aspect 112. The method of any one of aspects 89 or 92-110 inclusive, wherein the film further comprises an antioxidant.

Aspect 113. The method of any one of aspects 108-112, wherein a difference in CIE b* value between the film after being held in an 85° C. environment for 10 days and the film as-formed is about 0.10 or less.

Aspect 114. The method of any one of aspects 108-113, wherein the film comprises the antioxidant in a range from about 0.01 weight % to about 0.4 weight % of the film.

Aspect 115. The method of any one of aspects 86-114, wherein the first temperature is in a range from about 60° C. to about 70° C. and the first period of time is in a range from about 20 minutes to about 45 minutes.

Aspect 116. The method of any one of aspects 86-115, wherein the second temperature is in a range from about 150° C. to about 230° C. and the second period of time is in a range from about 30 minutes to about 50 minutes.

Aspect 117. The method of any one of aspects 86-116, further comprising heating the film and the substrate at a first rate in a range from about 0.5° C./minute to about 5° C./minute to reach the first temperature.

Aspect 118. The method of any one of aspects 86-117, further comprising heating the film and the substrate at a second rate in a range from about 0.5° C./minute to about 5° C./minute to reach the second temperature and increasing a pressure on the film and the substrate at a third rate in a range from about 7 kiloPascals/minute to about 35 kiloPascals per minute.

Aspect 119. The method of any one of aspects 86-118, further comprising cooling the laminate at a fourth rate in a range from about 1° C./minute to about 10° C./minute and decreasing a pressure on the laminate at a fifth rate in a range from about 35 kiloPascals/minute to about 103 kiloPascals per minute.

Aspect 120. The method of any one of aspects 86-119, wherein the refractive index of the film at 589 nanometers is in a range from about 1.498 to about 1.502.

Aspect 121. The method of any one of aspects 86-120, wherein a glass transition temperature of the first block is about −20° C. or less.

Aspect 122. The method of any one of aspects 86-121, wherein the film thickness is in a range from about 25 micrometers to about 200 micrometers.

Aspect 123. The method of aspect 122, wherein the film thickness is in a range from about 30 micrometers to about 80 micrometers.

Aspect 124. The method of any one of aspects 86-123, further comprising a silane coupling agent attaching the second major surface of the film to the third major surface of the substrate.

Aspect 125. The method of any one of aspects 86-124, wherein the silane coupling agent comprises an amine-functionalized silane coupling agent.

Aspect 126. The method of any one of aspects 86-125, wherein the film comprises a shear strength of about 1 MegaPascal or more in a Lap Shear Test after being held in a 65° C., 70% relative humidity environment for 10 days.

Aspect 127. The method of any one of aspects 86-125, wherein the film comprises a shear strength of about 2 MegaPascal or more in a Lap Shear Test after being held in a 65° C., 70% relative humidity environment for 10 days.

Aspect 128. The method of any one of aspects 86-125, wherein a shear strength of the laminate after being held in a 65° C., 70% relative humidity environment for 10 days is greater than a shear strength of the laminate as-formed, wherein shear strength is measured in a Lap Shear Test.

Aspect 129. The method of any one of aspects 86-128, wherein an absolute difference between a refractive index of the substrate at 589 nanometers and the refractive index of the film at 589 nanometers is about 0.01 or less.

Aspect 130. The method of any one of aspects 86-129, wherein a maximum absolute difference between a refractive index of the substrate and the refractive index of the film over optical wavelengths from 400 nanometers to about 700 nanometers is about 0.01 or less.

Aspect 131. The method of any one of aspects 86-130, wherein the substrate comprises a glass-based substrate and/or a ceramic-based substrate.

Aspect 132. The method of any one of aspects 86-131, wherein the substrate thickness is in a range from about 25 micrometers to about 2 millimeters.

Aspect 133. The method of aspect 132, wherein the substrate thickness is in a range from about 25 micrometers to about 300 micrometers.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

BRIEF DESCRIPTION OF THE DRAWINGS

The above and other features and advantages of aspects of the present disclosure are better understood when the following detailed description is read with reference to the accompanying drawings, in which.

DETAILED DESCRIPTION

Figure 1:
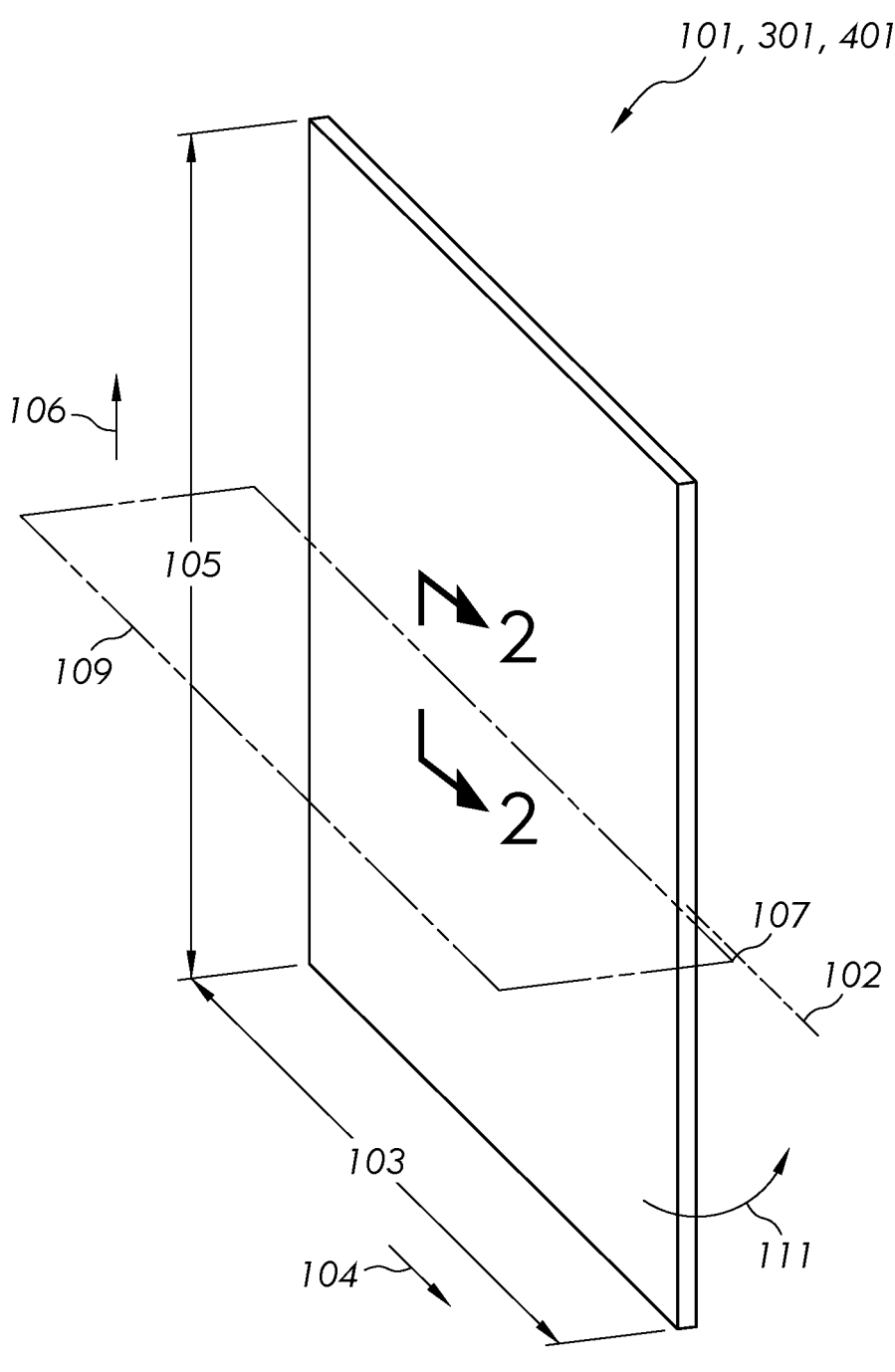
FIG. 1 is a schematic perspective view of an example laminate in a flat configuration in accordance with aspects of the disclosure, wherein a schematic perspective view of the folded configuration may appear as shown in FIG. 6.

Aspects will now be described more fully hereinafter with reference to the accompanying drawings in which example aspects are shown. Whenever possible, the same reference numerals are used throughout the drawings to refer to the same or like parts. However, claims may encompass many different aspects of various aspects and should not be construed as limited to the aspects set forth herein.

Figure 9:
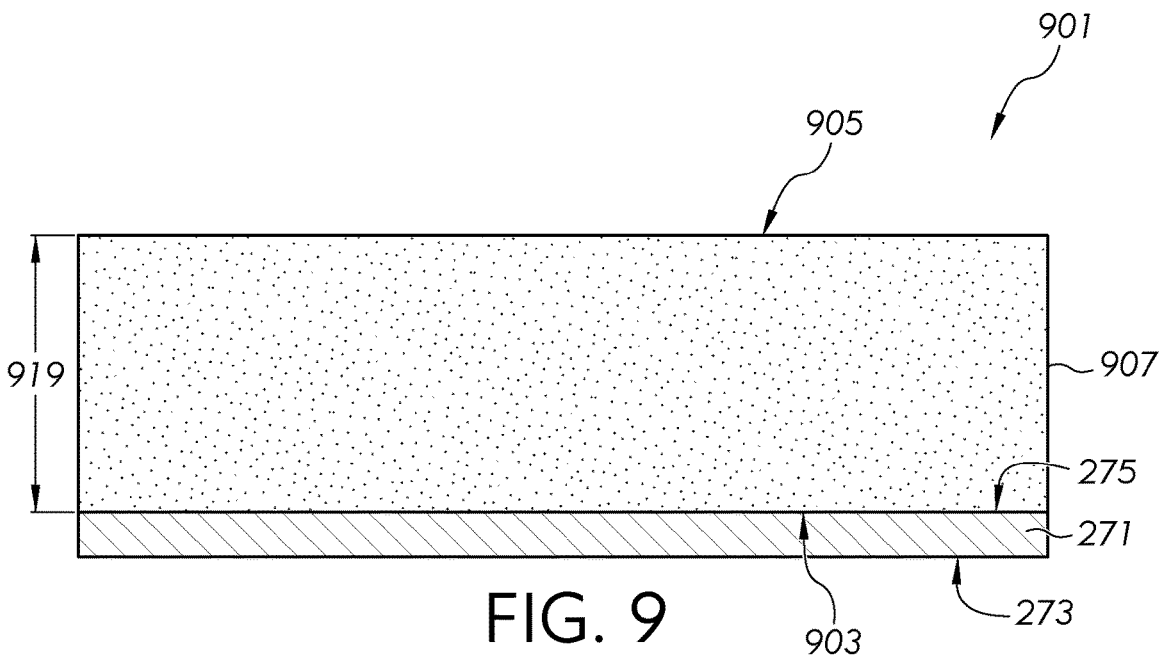
FIGS. 9-10 are cross-sectional views of films in accordance with aspects of the disclosure.
Figure 10:
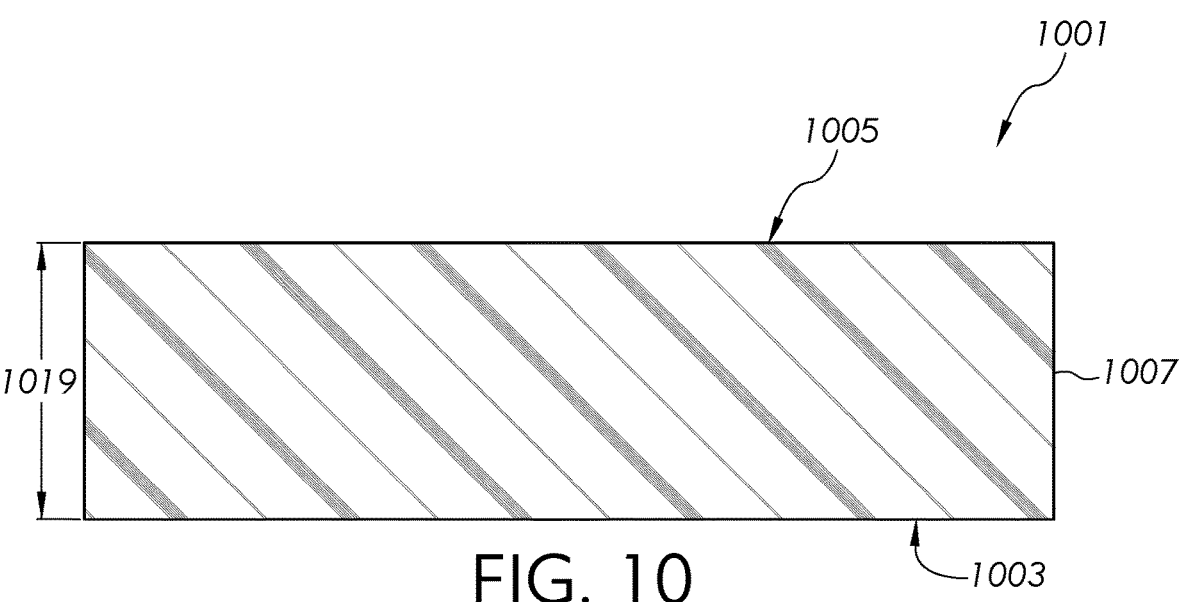

The films of aspects of the disclosure can be used, for example, in a film 901 and/or 1001 illustrated in FIGS. 9-10 and/or a laminate 101, 301, and/or 401 illustrated in FIGS. 1-4, respectively. However, it is to be understood that the films and/or laminates are not limited to such applications and can be used in other applications. Unless otherwise noted, a discussion of features of aspects of one film or laminate can apply equally to corresponding features of any aspect of the disclosure. For example, identical part numbers throughout the disclosure can indicate that, in some aspects, the identified features are identical to one another and that the discussion of the identified feature of one aspect, unless otherwise noted, can apply equally to the identified feature of any other aspect of the disclosure.

Aspects of the disclosure can comprise a film. As shown in FIG. 9, the film 901 can comprise a layer 907 comprising first major surface 903 and a second major surface 905 opposite the first major surface 903. In aspects, the first major surface 903 can comprise a planar surface. In aspects, the second major surface 905 can comprise a planar surface. In further aspects, the first major surface 903 can be parallel to the second major surface 905. The film 901 (e.g., the layer 907) comprises a film thickness 919 defined between the first major surface 903 and the second major surface 905 as the average distance therebetween. In aspects, the film thickness 919 can be about 5 micrometers (μm) or more, about 10 μm or more, about 25 μm or more, about 30 μm or more, about 40 μm or more, about 60 μm or more, about 80 μm or more, about 100 μm or more, about 400 μm or less, about 300 μm or less, about 250 μm or less, about 200 μm or less, about 180 μm or less, about 160 μm or less, or about 160 μm or less. In aspects, the film thickness 919 can be in a range from about 5 μm to about 400 μm, from about 5 μm to about 300 μm, from about 10 μm to about 300 μm, from about 10 μm to about 200 μm, from about 25 μm to about 200 μm, from about 25 μm to about 180 mm, from about 30 μm to about 180 μm, from about 40 μm to about 180 μm, from about 40 μm to about 160 μm, from about 60 μm to about 160 μm, from about 60 μm to about 140 μm, from about 80 μm to about 140 μm, from about 100 μm to about 140 μm, or any range or subrange therebetween. In aspects, the film thickness 919 can be about 100 μm or less, for example, in a range from about 25 μm to about 100 μm, from about 30 μm to about 80 μm, from about 40 μm to about 60 μm, or any range or subrange therebetween.

As shown in FIG. 10, the film 1001 can comprise a layer 1007 comprising a first major surface 1003 and a second major surface 1005 opposite the first major surface 1003. In aspects, the first major surface 1003 can comprise a planar surface. In aspects, the second major surface 1005 can comprise a planar surface. In further aspects, the first major surface 1003 can be parallel to the second major surface 1005. The film 1001 (e.g., the layer 1007) comprises a film thickness 1019 defined between the first major surface 1003 and the second major surface 1005 as the average distance therebetween. In aspects, the film thickness 1019 can be within one or more of the ranges discussed above for the film thickness 919.

In aspects, as shown in FIG. 9, the film 901 can comprise a release liner 271. The release liner 271 can comprise a fifth major surface 273 and a sixth major surface 275 opposite the fifth major surface. In further aspects, as shown, the first major surface 903 of the layer 907 can face the sixth major surface 275 of the release liner 271. In even further aspects, the first major surface 903 of the layer 907 can contact the sixth major surface 275 of the release liner 271. In even further aspects, as shown, the sixth major surface 275 of the release liner 271 can be coextensive with the first major surface 903 of the layer 907. In further aspects, the release liner can comprise a paper and/or a polymer. Exemplary aspects of paper comprise kraft paper, machine-finished paper, polycoated paper (e.g., polymer-coated, glassine paper, siliconized paper), or clay-coated paper. Exemplary aspects of polymers comprise polyesters (e.g., polyethylene terephthalate (PET)), fluorine-containing polymers (e.g., polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers), and polyolefins (e.g., low-density polyethylene (LDPE), high-density polyethylene (HDPE), polypropylene (PP)). In aspects, as shown in FIG. 10, the film 1001 may not comprise a release liner. In further aspects, as shown, the film 1001 can consist of the layer 1007. It is to be understood that film 1001 can comprise a release liner and/or that film 901 may not comprise a release liner in some aspects. In aspects, either of film 901 or film 1001 can comprise two release liners (e.g., release liner 271) contacting corresponding major surfaces of the layer 907 or 1007. Providing a release liner 271 can provide support for the layer and/or protect the first major surface of the layer from contamination to enable good adhesion in a laminate that the layer (e.g., film) can be incorporated into.

In aspects, as shown in FIG. 9, the layer 907 of the film 901 can comprise an adhesive. In further aspects, the layer 907 comprising the adhesive can comprise a polymer. Exemplary aspects of polymers for the adhesive include one or more of a silicone-based polymer, an acrylate-based polymer, an epoxy-based polymer, a thiol-containing polymer, a urethane-based polymer, and/or combinations thereof (e.g., urethane-acrylates). In even further aspects, the silicone-based polymer can comprise a silicone elastomer. Exemplary aspects of a silicone elastomer include PP2-OE50 available from Gelest and LS 8941 available from NuSil. Examples of epoxy-based polymers include bisphenol-based epoxy resins, novolac-based epoxies, cycloaliphatic-based epoxies, and glycidylamine-based epoxies. In further aspects, the layer 907 comprising the adhesive can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of polyolefins include low molecular weight polyethylene (LDPE), high molecular weight polyethylene (HDPE), ultrahigh molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene)). In even further aspects, the layer 907 can comprise one or more of the materials disclosed in "Polymer-based Portion, Adhesive, Foldable Apparatus, and Methods of Making" filed as U.S. Non-Provisional patent application Ser. No. 17/068,272 filed on Oct. 12, 2020. In aspects, the adhesive can comprise a tri-block copolymer, described below.

In aspects, as shown in FIG. 10, the layer 1007 of the film 1001 can comprise a polymer-based portion. In further aspects, the layer 1007 comprising the polymer-based portion can comprise a tri-block copolymer. As used herein, a tri-block copolymer refers to a polymer comprising three distinct blocks along a main chain of the polymer, where an adjacent pair of blocks comprise different monomers or sets of monomers and different glass transition temperatures (Tg). For example, a tri-block copolymer can be represented as A-B-A, where there are 3 blocks along the main chain with adjacent pairs of blocks A-B and B-A, where the A blocks and the B block comprise different monomers and/or sets of monomers and different glass transition temperatures. Throughout the disclosure, the middle block of the triblock copolymer will be referred to as the first block (e.g., B in the above example) while the terminal blocks will be referred to as second blocks (e.g., A's in the above example), although the second blocks may or may not comprise the same monomers, molecular weight, etc., as discussed below. It is to be understood, as discussed below, that a block of the tri-block copolymer can comprise more than one monomer type and can even comprise sub-blocks with adjacent pairs of sub-blocks comprising different monomers and/or sets of monomers. For example, as discussed below, the second block can comprise an ethylene-butylene copolymer, which can comprise a sub-block comprising ethylene monomers and another sub-block comprising butylene monomers adjacent to the sub-block comprising ethylene monomers.

In aspects, the tri-block copolymer can comprise a thermoplastic elastomer. As used herein, thermoplastic elastomers are both thermoplastic and elastomeric. Throughout the disclosure, a polymer is a thermoplastic if the viscosity of the polymer decreases above a predefined temperature (e.g., melting temperature) such that the polymer behaves as a viscous liquid that can be shaped using methods such as injection molding and/or extrusion and subsequently cooled as a shaped polymeric article. In contrast, a thermoset is a polymer that will decompose upon heating to a predefined temperature (e.g., decomposition temperature) rather than becoming a viscous liquid and cannot be subsequently cooled to form a shaped polymeric article. Throughout the disclosure, a polymer is elastomeric if it can recover at least 99% of its original dimension after being extended to a strain of at least 20% at a strain rate of 5% strain per minute at 23° C. Exemplary aspects of thermoplastic elastomers include, thermoplastic polyurethane, thermoplastic polyamide, poly (dichlorophosphazene), silicone-based rubber, and/or block copolymers (e.g., tri-block copolymers, di-block copolymers).

As used herein, the glass transition temperature, a storage modulus at a range of temperatures, a storage modulus (e.g., at a glassy plateau), and a loss modulus (e.g., at a glass plateau) are measured using Dynamic Mechanical Analysis (DMA) with an instrument, for example, the DMA 850 from TA Instruments. The samples for the DMA analysis comprise a film secured by a tension clamp. As used herein, the storage modulus refers to the in-phase component of a response of the polymer to the dynamic testing. Without wishing to be bound by theory, the in-phase component of the response is attributed to the elastic portion of a viscoelastic material. As used herein, the loss modulus refers to the out-of-phase component of a response to the polymer during the dynamic testing. Without wishing to be bound by theory, the loss modulus can correspond to the viscous component of a viscoelastic material. As used herein, the glass transition temperature corresponds to a maximum value of a tan delta, which is a ratio of the loss modulus to the storage modulus.

In aspects, the first block of the tri-block copolymer can comprise a first glass transition temperature (Tg1) of about 0° C. or less, about –10° C. or less, about –20° C. or less, about –30° C. or less, about –40° C. or less, about –140° C. or more, about –120° C. or more, about –100° C. or more, about –80° C. or more, or about –60° C. or more. In aspects, the first block of the tri-block copolymer can comprise a first glass transition temperature (Tg1) in a range from about –140° C. to about 0° C., from about –120° C. to about 0° C., from about –120° C. to about –10° C., from about –100° C. to about –10° C., from about –100° C. to about –20° C., from about –80° C. to about –20° C., from about –80° C. to about –30° C., from about –60° C. to about –30° C., from about –40° C. to about –60° C., or any range or subrange therebetween. Providing a polymer-based portion comprising low haze can enable good visibility through the polymer-based portion. Providing a first block of the tri-block copolymer with a first glass transition temperature (Tg1) outside (e.g., below) of an operating range (e.g., from about 0° C. to about 40° C., from about –20° C. to about 60° C.) can enable consistent properties across the operating range of the article (e.g., film, laminate).

In aspects, the first block can comprise and/or consist of polybutadiene, polybutylene, polyisobutylene, polyisoprene, poly(butadiene-co-isoprene), poly(ethylene-co-butylene), poly(ethylene-co-butylene-co-styrene), poly(ethylene-co-propylene), and/or combinations thereof. In further aspects, the first block can comprise poly(ethylene-co-butylene). In even further aspects, the first block comprising poly(ethylene-co-butylene) can comprise a sub-block comprising ethylene monomers and another sub-block comprising butylene monomers. In even further aspects, the first block comprising poly(ethylene-co-butylene) can comprise an alternating and/or random copolymer of ethylene and butylene monomers.

In aspects, one or both of the second blocks of the tri-block copolymer can comprise a first glass transition temperature (Tg1) of about 50° C. or more, about 70° C. or more, about 90° C. or more, about 100° C. or more, about 220° C. or less, about 160° C. or less, about 140° C. or less, about 120° C. or less, or about 110° C. or less. In aspects, one or both of the second blocks of the tri-block copolymer can comprise a first glass transition temperature (Tg1) in a range from about 50° C. to about 220° C., from about 50° C. to about 160° C., from about 70° C. to about 160° C., from about 70° C. to about 140° C., from about 90° C. to about 140° C., from about 90° C. to about 120° C., from about 100° C. to about 120° C., from about 110° C. to about 120° C., or any range or subrange therebetween. Providing a second block of the tri-block copolymer with a glass transition temperature outside (e.g., above) of an operating range (e.g., from about 0° C. to about 40° C., from about −20° C. to about 60° C.) can enable consistent properties across the operating range of the article (e.g., film, laminate).

In aspects, one or both of the second blocks can comprise one or more of polystyrene, poly(vinyl pyridine), poly(vinyl phenol), poly(ethylene terephthalate), polysulfone, parylene, poly(phenylene oxide), polyarylate, polycarbonate, poly(methyl methacrylate), polymethylacrylic acid, poly(acrylic acid), polymethacrylamide, polyacrylamide, polyacrylonitrile, and derivatives thereof. In aspects, one or both of the second blocks can comprise an aromatic-containing polymer. Exemplary aspects of aromatic-containing polymers include polystyrene, poly(vinyl pyridine), poly (vinyl phenol), poly(ethylene terephthalate), polysulfone, polyarylate, and polycarbonate. In further aspects, one or both of the second blocks can comprise polystyrene. In further aspects, the two second blocks can comprise the same material. In further aspects, a second block of the tri-block copolymer can be different from an another second block of the tri-block copolymer. Without wishing to be bound by theory, a second block comprising an aromatic-containing polymer can increase a glass-transition temperature of the second block, increase a modulus, and/or increase a rigidity of the tri-block copolymer.

In aspects, the tri-block copolymer can comprise styrenic block copolymers, thermoplastic co-polyesters, and thermoplastic co-amides. Exemplary aspects of styrenic block copolymers include styrene-(butadiene)-styrene, styrene-(butadiene-isoprene)-styrene, styrene-(butylene)-styrene, styrene-(isobutylene)-styrene, styrene-(ethylene-butylene)-styrene, styrene-(ethylene-butylene-styrene)-styrene, styrene-(ethylene-propylene)-styrene, and styrene-(isoprene)-styrene tri-block copolymers with the second block indicated in parenthesis for clarity. For example, commercially available styrene-(isoprene)-styrene, styrene-(butadiene)-styrene, styrene-(butadiene-isobutylene)-styrene, styrene-(ethylene-butylene)-styrene, and styrene-(ethylene-propylene)-styrene are commercially available from Kraton.

In aspects, a combined weight of the two second blocks in the tri-block copolymer can be about 10 weight % (wt %) or more, about 13 wt % or more, about 15 wt % or more, about 20 wt % or less, about 50 wt % or less, about 40 wt % or less, about 30 wt % or less, or about 25 wt % or less. In aspects, a combined weight of the two second blocks in the tri-block copolymer can be in a range from about 10 wt % to about 50 wt %, from about 10 wt % to about 40 wt %, from about 13 wt % to about 40 wt %, from about 13 wt % to about 30 wt %, from about 15 wt % to about 30 wt %, from about 15 wt % to about 25 wt %, from about 20 wt % to about 25 wt %, or any range or subrange therebetween. Providing a total weight of the two second blocks within one or more of the above-mentioned ranges can provide a small absolute difference between a refractive index of the tri-block copolymer (e.g., film) and a substrate (e.g., glass-based substrate, ceramic-based substrate).

In aspects, the first block of the tri-block copolymer can be grafted with a first functional group. In further aspects, the first functional group can comprise and/or consist of anhydrides, acrylates, isocyanates, maleates, silanes, and/or combinations thereof. Exemplary aspects of anhydride functional groups include maleic anhydride, succinic anhydride, acetic anhydride, alkyl anhydrides (e.g., ethanoic anhydride, propanoic anhydride), and combinations thereof. Exemplary aspects of acrylate functional groups include acrylate, alkyl acrylates (e.g., methyl acrylate, ethyl acrylate, butyl acrylate), methacrylate, alkyl methacrylates (e.g., methyl methacrylate, ethyl methacrylate, butyl methacrylate), cyanoacrylate, alkyl cyanoacrylate (e.g., methyl cyanoacrylate, ethyl cyanoacrylate), and combinations thereof. Exemplary aspects of isocyanate functional groups include isocyanate, alkyl isocyanate (e.g., methyl isocyanate), diisocyanate, alkyl diisocyanate (e.g., hexamethylene diisocyanate), methylene diphenyl diisocyanate, toluene diisocyanate, isophorone diisocyanate, and combinations thereof. Exemplary aspects of maleate functional groups include maleic acid, maleic anhydride, alkyl maleates (e.g., dimethyl maleate), and combinations thereof. Exemplary aspects of silane functional groups include alkoxy silanes (e.g., methoxysilanes, ethoxysilanes) and can be combined with other functional groups including those discussed above or those discussed with reference to silane coupling agents below. In further aspects, the first functional group can comprise and/or consist of maleic anhydride. In further aspects, the first functional group can comprise an ethoxy silane. In aspects, the first functional group can exclude hydrogen, bisphenols, and/or fluorine-containing functional groups. In aspects, the first functional group can exclude alkenes and/or alkynes. In aspects, a weight of the first functional group to the tri-block copolymer can be about 0.1 wt % or more, about 0.2 wt % or more, about 0.5 wt % or more, about 1 wt % or more, about 2 wt % or more, about 10 wt % or less, about 8 wt % or less, about 5 wt % or less, about 3 wt % or less, or about 2 wt % or less. In aspects, a weight of the first functional group to the tri-block copolymer can be in a range from about 0.1 wt % to about 10 wt %, from about 0.1 wt % to about 8 wt %, from about 0.2 wt % to about 8 wt %, from about 0.2 wt % to about 5 wt %, from about 0.5 wt % to about 5 wt %, from about 0.5 wt % to about 2 wt %, from about 1 wt % to about 2 wt %, or any range or subrange therebetween. In further aspects, the first functional group can be a silane (e.g., ethoxysilane), an anhydride (e.g., maleic anhydride), and/or a maleate (e.g., maleic anhydride). In aspects, a weight of the first functional group can be about 1 wt % or more, for example, in a range from about 1 wt % to about 5 wt %, from about 2 wt % to about 3 wt %, or any range or subrange therebetween. In further aspects, the first functional group can be an anhydride and/or a maleate (e.g., maleic anhydride). Providing the tri-block copolymer comprising the first block grafted with the first functional group can improve adhesion of the film (e.g., tri-block copolymer) with a substrate (e.g., glass-based substrate, ceramic-based substrate).

Throughout the disclosure, a "normal functional group" of a polymer (e.g., block) refers to a functional group that would be present in one or more monomer(s) of the polymer (e.g., block) after polymerization. For example, a normal functional group of polybutadiene would be an alkene, and a normal functional group of poly(methyl methacrylate) would be a methacrylate. In aspects, the first functional group can be different from a normal functional group of the first block.

In aspects, the tri-block copolymer can comprise a plurality of tri-block copolymers. The plurality of tri-block copolymers can comprise a first tri-block copolymer comprising a first combined weight of the two second blocks of the first tri-block copolymer. The plurality of tri-block copolymers can comprise a second combined weight of the two second blocks of the second tri-block copolymer. In further aspects, the first combined weight can be greater than the second combined weight. In even further aspects, the first block of the first tri-block copolymer can comprise the same material as the first block of the second tri-block copolymer, and/or the two second blocks of the first tri-block copolymer can comprise the same material as the corresponding second block of the two second blocks of the second tri-block copolymer. Providing more than one type of tri-block copolymer can enable fine-tuning of the refractive index of the resulting layer (e.g., film).

In aspects, the layer can comprise a di-block copolymer in combination with the tri-block copolymer. In further aspects, the di-block copolymer can comprise an additional first block and an additional second block. In even further aspects, the additional first block can comprise the same material as the first block of the tri-block copolymer, and/or the additional second block can comprise the same material as at least one of the two second blocks of tri-block copolymer. In still further aspects, a mass ratio of a mass of the di-block copolymer to a mass of the tri-block copolymer can be about 1% or more, about 5% or more, about 10% or more, about 20% or more, about 70% or less, 50% or less, about 40% or less, or about 30% or less. In still further aspects, a mass ratio of a mass of the di-block copolymer to a mass of the tri-block copolymer can be in a range from about 1% to about 70%, from about 5% to about 70%, from about 5% to about 50%, from about 5% to about 40%, from about 10% to about 40%, from about 10% to about 30%, from about 20% to about 30%, or any range or subrange therebetween. Providing a di-block copolymer in combination with the tri-block copolymer can increase a flexibility and/or impact resistance of the resulting layer (e.g., film, laminate). Providing a di-block copolymer comprising materials corresponding to the materials of the first block and one or both of the two second blocks can enable increased flexibility without substantially modifying the optical properties of the layer (e.g., film, laminate).

Throughout the disclosure a film or composition that "consists essentially of" a list of components includes the listed components and optional additional components that do not materially affect the basic characteristics of the film or composition. Throughout the disclosure, a film or composition that "consists of" a list of components includes only the listed components. In aspects, the layer of the film can consist essentially of (e.g., consist of) the tri-block copolymer. In aspects, the layer of the film can consist essentially of (e.g., consist of) the tri-block copolymer and the di-block copolymer. In aspects, the layer of the film can consist of the tri-block copolymer and components thereof. As used herein, components of the tri-block copolymer refer to the first block, the two second blocks, sub-blocks of these blocks, and combinations thereof (e.g., a di-block copolymer comprising the first block and one of the second blocks). For example, a layer consisting of a tri-block copolymer comprising a first block and two second blocks as well as a di-block copolymer comprising an additional first block comprising the same material as the first block and an additional second block comprising the same material as at least one of the second blocks consists of the tri-block copolymer and components thereof because the di-block copolymer is a combination of the first block and one of the second blocks of the tri-block copolymer.

In aspects, the layer (e.g., film) can comprise a silane coupling agent. In further aspects, the silane coupling agent can comprise an anhydride-functionalized silane, an amine-functionalized silane, a chlorine-functionalized silane, a cyano-functionalized silane, an epoxy-functionalized silane, a hydroxyl-functionalized silane, a thiol-functionalized silane, and combinations thereof. In further aspects, the silane coupling agent can comprise an amine functional group. In further aspects, the silane coupling agent can comprise (3-triethoxysilyl) propylsuccinic anhydride, (3-mercaptopropyl) trimethoxysilane, and/or 2-(3,4-epoxy-cyclohexyl)ethyltrimethoxysilane. Exemplary aspects of amino-functionalized silanes include (3-aminopropyl) trimethoxysilane, (3-aminopropyl)triethoxysilane, (3-aminopropyl)methyldimethoxysilane, (3-aminopropyl)methyldiethoxysilane, m-aminophenyltrimethoxysilane, p-aminophenyltrimethoxysilane, 3-(m-aminophenoxy) propyltrimethoxysilane, 3-(m-aminophenoxy) propyltriethoxysilane, N-(2-aminoethyl)-3-aminopropyltrimethoxysilane, N-(2-aminoethyl)-3-aminopropyltriethoxysilane, N-(6-aminohexyl)aminomethyltrimethoxysilane, N-(6-aminohexyl)aminomethyltriethoxysilane, N-2-aminoethyl-11-aminoundecyltrimethoxysilane, N-2-aminoethyl-11-aminoundecyltriethoxysilane, aminoethylaminomethylphenethyltrimethoxysilane, aminoethylaminomethylphenethyltriethoxysilane, N-3-(aminopolypropylenoxy)aminopropyltrimethoxysilane, N-3-(aminopolypropylenoxy)aminopropyltriethoxysilane, (3-trimethoxysilylpropyl)diethylenetriaminesilane, (3-triethoxysilylpropyl)diethylenetriaminesilane, 4-amino-3,3-dimethylbutyltrimethoxysilane, and 4-amino-3,3-dimethylbutyltriethoxysilane.

Exemplary aspects of chloro-functionalized silanes include 3-chloropropyltrimethoxysilane and 3-chloropropyltriethoxysilane. Exemplary aspects of cyano-functionalized silanes include 3-isocyanatopropyltrimethoxysilane and 3-isocyanatopropyltriethoxysilane Exemplary aspects of epoxy-functionalized silanes include 2-(3,4-epoxycyclohexyl)ethyltrimethoxysilane, 2-(3,4-epoxycyclohexyl)ethyltriethoxysilane, 3-(2,3-epoxypropoxy)propyltrimethoxysilane, 5,6-epoxyhexyltriethoxy silane, 2-(2,4-epoxycyclohexyl)ethyltrimethoxysilane, 2-(2,4-epoxycyclohexyl)ethyltriethoxysilane, (3-glycidoxypropyl) trimethoxysilane, and (3-glycidoxypropyl)triethoxysilane. Exemplary aspects of hydroxyl-functionalized silanes include N,N'-bis(2-hydroxyethyl)-N,N' bis(trimethoxysilylpropyl)ethylenediamine, N,N'-bis(2-hydroxyethyl)-N,N' bis (triethoxysilylpropyl)ethylenediamine, N,N-bis(2-hydroxyethyl)-3-aminopropyltrimethoxysilane, N,N-bis(2-hydroxyethyl)-3-aminopropyltriethoxysilane, 2,2-bis(3-trimethyoxysilylpropoxymethyl)butanol, and 2,2-bis(3-triethyoxysilylpropoxymethyl) butanol. Exemplary aspects of thiol-functionalized silanes include 3-mercaptopropylmethyldimethoxysilane, 3-mercaptopropylmethyldiethoxysilane, 3-mercaptopropyltriethoxysilane. 3-mercaptopropyltrimethoxysilane, 3-mercaptopropyltrimethoxysilane, 3-mercaptopropyltriethoxy-silane, and 11-mercaptoundecyltrimethoxysilane. In even further aspects, the silane coupling agent can comprise an amine-functionalized silane coupling agent. In further aspects, the composition can comprise the silane coupling agent in a weight % (wt %) of about 0.1 wt % or more, about 0.2 wt % or more, about 0.5 wt % or more, about 5 wt % or less, about 2 wt % or less, or about 1 wt % or less. In further aspects, the composition can comprise the silane coupling agent in a weight % (wt %) ranging from about 0.1 wt % to about 5 wt %, from about 0.1 wt % to about 2 wt %, from about 0.2 wt % to about 2 wt %, from about 0.2 wt % to about 1 wt %, from about 0.5 wt % to about 1 wt %, or any range or subrange therebetween. Providing a silane coupling agent can increase an adhesion of the layer (e.g., film) to a substrate (e.g., glass-based substrate, ceramic-based substrate, the rest of a laminate) and improve the durability of the film and/or laminate. Throughout the disclosure, "free silane" refers to a silane-containing compound not bonded to the polymer (e.g., grafted or otherwise reacted with the polymer). In aspects, the film can comprise be substantially free of free silane by comprising 0.1 wt % of free silane. In further aspects, the film can be free of free silane.

In aspects, the layer (e.g., film) can comprise a catalyst. Without wishing to be bound by theory, a catalyst can increase a rate of the curing (e.g., polymerization, reaction), and the catalyst may avoid permanent chemical change as a result of the curing. In aspects, the catalyst can comprise one or more platinum group metals, for example, ruthenium, rhodium, palladium, osmium, iridium, and/or platinum. In aspects, the catalyst can comprise a platinum-based Karstedt's catalyst solution. Exemplary aspects of platinum-based catalysts include chloroplatinic acid, platinum-fumarate, colloidal platinum, metallic platinum, and/or platinum-nickel nanoparticles.

In aspects, the layer (e.g., film) can comprise a photoinitiator. As used herein, a photoinitiator is a compound sensitive to one or more wavelengths that upon absorbing light comprising the one or more wavelengths undergoes a reaction to produce one or more radicals or ionic species that can initiate a reaction. In further aspects, the photoinitiator may be sensitive to one or more wavelengths of ultraviolet (UV) light. Example aspects of photoinitiators sensitive to UV light include without limitation benzoin ethers, benzil ketals, dialkoxyacetophenones, hydroxyalkylphenones, aminoalkylphenones, acylphosphine oxides, thioxanthones, hydroxyalkylketones, and thoxanthanamines. In further aspects, the photoinitiator may be sensitive to one or more wavelengths of visible light. Example aspects of photoinitiators sensitive to visible light include without limitation 5,7-diiodo-3-butoxy-6-fluorone, bis(4-methoxybenzoyl) diethylgermanium, bis(2,4,6-trimethylbenzoyl)-phenylphosphineoxide, 3-methyl-4-aza-6-helicene, and thiocyanide borates. In further aspects, the photoinitiator may be sensitive to a wavelength that other components of the layer (e.g., film) are substantially transparent at. In further aspects, the photoinitiator can initiate a cationic reaction (e.g., cationic polymerization). Example aspects of photoinitiators producing one or more ions include without limitation triarylsulfonium hexfluoroantimonate, triphenylsulfonium hexafluoroantimonate, and bis(4-tert-butylphenyl) iodonium perfluoro-1-butanesulfonate. Commercially available photoinitiators include without limitation the Irgacure product line from Ciba Specialty Chemical. Exemplary aspects of photoinitiators include acetophenone-based compounds, for example, dimethoxyphenyl acetophenone. In aspects, the composition can comprise the photoinitiator in a weight % (wt %) of about 0.1 wt % or more, about 0.2 wt % or more, about 0.5 wt % or more, about 6 wt % or less, about 4 wt % or less, about 3 wt % or less, about 2 wt % or less, or about 1 wt % or less. In aspects, the composition can comprise the silane coupling agent in a weight % (wt %) ranging from about 0.1 wt % to about 6 wt %, from about 0.1 wt % to about 4 wt %, from about 0.1 wt % to about 3 wt %, from about 0.1 wt % to about 2 wt %, from about 0.2 wt % to about 2 wt %, from about 0.2 wt % to about 1 wt %, from about 0.5 wt % to about 1 wt %, or any range or subrange therebetween. In aspects, the layer (e.g., film) can be substantially free of fluorine-based compounds. As used herein, the layer (e.g., film) can be substantially free of fluorine-based compounds while containing a trace amount of fluorine in a minor component (e.g., about 6 wt % or less of a photoinitiator) of the composition corresponding to an overall wt % of fluorine of about 0.25 wt % or less. In further aspects, the layer (e.g., film) can be free of fluorine-based compounds.

In aspects, the layer (e.g., film) can comprise an antioxidant. In further aspects, the antioxidant can comprise a phenolic-based compound or a phosphite-based compound. Exemplary aspects of antioxidants comprising phenolic-based compounds available include pentaerythritol tetrakis (3-(3,5-di-tert-butyl-4-hydroxyphenyl)proprionate (e.g., Irganox 1010 (BASF)), thiodiethylene bis[3-(3,5-di-ter-butyl-4-hydroxy-phenyl)]propionate (e.g., Irganox 1035 (BASF)), octadecyl-3-(3,5-di-tert-butyl-4-hydroxyphenyl) propionate (e.g., Irganox 1076 (BASF)), benzenepropanoic acid (e.g., Irganox 1135 (BASF)), 3,3',3',5,5',5'-hexa-tert-butyl-a,a',a'-(mesitylene-2,4,6-triyl)tri-p-cresol (e.g., Irganox 1330 (BASF)), (1,1-di-tert-butyl)-4-hydroxyphenyl)methyl)ethylphosphonate (e.g., Irganox 1425 (BASF)), 4,6-bis[octylthiomethyl]-o-crsol (e.g., Irganox 1520 (BASF)), 1,3,5-tris[3,5-di-tert-butyl-4-hydroxybenzyl)-1,3, 5-triazine-2,4,5(1H,3H,5H)-trione (e.g., Irganox 3114 (BASF)), 2,6-di-tert-butyl-4-(4,6-bis(octothiol)-1,3,5-tri-azin-2-ylamino)phenol (e.g., Irganox 565 (BASF)), and 2',3-bis[3-(3,5-di-tert-butyl-4-hydroxyphenyl)propionyl]propionohydrazine (e.g., Irganox MD-1024 (BASF)). Exemplary aspects of antioxidants comprising phosphite-based compounds include 2,2',2"-nitrolo(triethyl-tris[3,3',5,5'-terta-tert-butyl-1,1'-biphenyl-2,2'-diyl])phosphile (e.g., Irgafos 12 BASF), bis[2,4,-di-tert-butylphenol]pentalerthythiol diphosphate (e.g., Irgafos 126 (BASF), tris[2,4-ditert-butylphenyl]phosphite (e.g., Irgafos 168 (BASF)), bis[2,4-di-tert-butyl-6-methylphenyl]-ethyl-phosphite (e.g., Irgafos 38 (BASF)), trisnonylphenyl phosphite (e.g., Weston 399 (Addivant)), 3,9-bis(octadecyloxy)-2,4,8,10-tetraoxa-3,9-diphosphaspiroundecane (e.g., Weston 618 (Addivant)) [1,3, 2-dioxaphosphorinane, 5-butyl-5-ethyle-2-(2,4,6-tris[1,1-dimethylethyl]phenoxy)-1,3,2-dioxaphosphinane] (e.g., Ultranox 641 (SI Group)), 2,2'-ethyidene-bis[4,6,-di-tert-butylphenyl]fluorophosphate (e.g., Ethenox 398 (SI Group)), and 2,2'-Methylene-bis[4,6-di-tert-butylphenyl]-2-ethylhexyl phosphite (e.g., ADK STAB HP-10 (Adeka)). In further aspects, a weight of the antioxidant can be about 0.01 wt % or more, about 0.1 wt % or more, about 0.2 wt % or more, about 0.5 wt % or less, about 0.4 wt % or less, or about 0.3 wt % or less. In further aspects, a weight of the antioxidant can be in a range from about 0.01 wt % to about 0.5 wt %, from about 0.1 wt % to about 0.5 wt %, from about 0.1 wt % to about 0.4 wt %, from about 0.2 wt % to about 0.3 wt %, or any range or subrange therebetween. In further aspects, a weight of the antioxidant can be in a range from about 0.01 wt % to about 0.3 wt %, from about 0.01 wt % to about 0.2 wt %, or any range or subrange therebetween.

Providing an antioxidant can improve a color of the film and/or laminate, for example by decreasing yellowing as the film and/or laminate ages.

Throughout the disclosure, an index of refraction may be a function of a wavelength of light passing through a material. Throughout the disclosure, for light of a first wavelength, an index of refraction of a material is defined as the ratio between the speed of light in a vacuum and the speed of light in the corresponding material. Without wishing to be bound by theory, an index of refraction of a material can be determined using a ratio of a sine of a first angle to a sine of a second angle, where light of the first wavelength is incident from air on a surface of the material at the first angle and refracts at the surface of the material to propagate light within the material at a second angle. The first angle and the second angle are both measured relative to a normal of a surface of the material. As used herein, the refractive index is measured in accordance with ASTM E1967-19, where the first wavelength comprises 589 nm. In aspects, an index of refraction of the layer (e.g., tri-block copolymer) of the film may be about 1.4 or more, about 1.45 or more, about 1.48 or more, about 1.49 or more, about 1.50 or more, about 1.51 or more, about 1.6 or less, about 1.55 or less, about 1.54 or less, about 1.53 or less, or about 1.52 or less. In aspects, the index of refraction of the layer (e.g., tri-block copolymer) of the film can be in a range from about 1.4 to about 1.6, from about 1.45 to about 1.6, from about 1.45 to about 1.55, from about 1.48 to about 1.55, from about 1.48 to about 1.54, from about 1.48 to about 1.53, from about 1.49 to about 1.53, from about 1.49 to about 1.52, from about 1.49 to about 1.51, or any range or subrange therebetween. In further aspects, the refractive index of the layer (e.g., tri-block copolymer) of the film can be in a range from about 1.49 to about 1.51, from about 1.495 to about 1.51, from about 1.495 to about 1.505, from about 1.498 to about 1.505, from about 1.498 to about 1.502, from about 1.499 to about 1.502, from about 1.499 to about 1.501, or any range or subrange therebetween.

As used herein, "optically transparent" or "optically clear" means an average transmittance of 70% or more in the wavelength range of 400 nm to 700 nm through a 1.0 mm thick piece of material, wherein the thickness is measured along the path length of light travelling through the piece of material. As used herein, an average transmittance of a material is measured by averaging over optical wavelengths in a range from 400 nm to 700 nm through a 1.0 mm thick piece of the material, which comprises measuring the transmittance of whole number wavelengths from about 400 nm to about 700 nm and averaging the measurements. Unless specified otherwise, "transmittance" of a material refers to the average transmittance of the material. In aspects, an "optically transparent material" or an "optically clear material" may have an average transmittance of 75% or more, 80% or more, 85% or more, or 90% or more, 92% or more, 94% or more, 96% or more in the wavelength range of 400 nm to 700 nm through a 1.0 mm thick piece of the material. In aspects, the layer (e.g., tri-block copolymer) of the film can be optically transparent. In further aspects, the layer (e.g., tri-block copolymer) of the film can comprise an average transmittance measured over optical wavelengths in a range from 400 nm to 700 nm of about 90% or more, about 91% or more, about 92% or more, about 93% or more, 100% or less, about 96% or less, about 95% or less, or about 94% or less. In further aspects, the layer (e.g., tri-block copolymer) of the film can comprise an average transmittance measured over optical wavelengths in a range from 400 nm to 700 nm in a range from about 90% to 100%, from about 90% to about 96%, from about 91% to about 96%, from about 91% to about 95%, from about 92% to about 95%, from about 92% to about 94%, from about 93% to about 94%, or any range or subrange therebetween.

The polymer-based portion can comprise a haze as a function of an angle of illumination relative to a direction normal to a surface of the polymer-based portion. As used herein, haze refers to transmission haze that is measured in accordance with ASTM E430. Haze can be measured using a haze meter supplied by BYK Gardner under the trademark HAZE-GUARD PLUS, using an aperture over the source port. The aperture has a diameter of 8 mm. A CIE C illuminant is used as the light source for illuminating the sample. Unless indicated otherwise, haze is measured at about 0° relative to an angle of incidence normal to a surface of the polymer-based portion. In aspects, the haze at about 0° and/or 10° relative to an angle of incidence normal to the surface of the polymer-based portion measured through a 1.0 millimeter (mm) thick piece of the layer (e.g., tri-block copolymer) of the film can be about 1% or less, about 0.5% or less, about 0.2% or less, about 0.1% or less, or about 0.01% or more, or about 0.05% or more. In aspects, the haze at about 0° and/or 10° relative to an angle of incidence normal to the surface of the layer (e.g., tri-block copolymer) of the film measured through a 1.0 mm thick piece of the layer (e.g., tri-block copolymer) of the film can be in a range from 0% to about 1%, from 0% to 0.5%, from 0% to 0.2%, from about 0.01% to about 0.2%, from about 0.05% to about 0.2%, from about 0.05% to about 0.1%, or any range or subrange therebetween. In aspects, the haze at about 20° relative to an angle of incidence normal to the surface of the layer (e.g., tri-block copolymer) of the film can be within one or more of the ranges specified above for 0° and/or 10°.

Throughout the disclosure, the layer (e.g., film) can comprise a shear strength in a Lap Shear Test based on ASTM D1002. As used herein, the Lap Shear test uses a laminate comprising two glass-based substrates comprising a width of 25 mm, a thickness of 200 μm, and an overlap of 4 mm with the layer (e.g., film) positioned therebetween attaching the glass-based substrates to each other. The laminate is formed by placing a 25 mm by 4 mm layer (e.g., film without any release liner) between the glass-based substrates in a mold and is subjected to hot-pressing at a temperature from 180° C. to 230° C. for 5 minutes with a gauge pressure of 0.4 MegaPascals (MPa). The shear strength is measured using a tensile testing machine, for example, an Instron 3400 or Instron 6800, with pneumatic grips holding the glass-based substrates. In aspects, a shear strength of the layer (e.g., film) in the Lap Shear Test can be about 1 MegaPascal (MPa) or more, about 2 MPa or more, about 3 MPa or more, about 20 MPa or less, about 10 MPa or less, or about 5 MPa or less. In aspects, a shear strength of the layer (e.g., film) in the Lap Shear Test can be in a range from about 1 MPa to about 2 MPa, from about 1 MPa to about 10 MPa, from about 2 MPa to about 10 MPa, from about 2 MPa to about 5 MPa, from about 3 MPa to about 5 MPa, or any range or subrange therebetween. In aspects, the layer (e.g., film) as-formed can comprise a shear strength in the Lap Shear Test within one or more the ranges set forth above. In aspects, the layer (e.g., film) after being held at 25° C. for 1 day can comprise a shear strength in the Lap Shear Test within one or more the ranges set forth above. In aspects, the layer (e.g., film) after being held at about 25° C. for 10 days can comprise a shear strength in the Lap Shear Test within one or more the ranges set forth above. In aspects, the layer (e.g., film) after being held in 65° C., 50% relative humidity environment for 10 days can comprise a shear strength in the Lap Shear Test within one or more the ranges set forth above. In aspects, the layer (e.g., film) after being held in 65° C., 70% relative humidity environment for 10 days can comprise a shear strength in the Lap Shear Test within one or more the ranges set forth above. In aspects, a shear strength of the layer (e.g., film) can increase after being held in 65° C., 50% relative humidity environment for 10 days (e.g., compared to as-formed, after being held at 25° C. for 1 day, and/or being held at 25° C. for 5 days).

Throughout the disclosure, the layer (e.g., film) can comprise CIE (L*, a*, b*) color coordinates measured using a D65 illuminant at an observer angle of 10° using a colorimeter (e.g., tristimulus colorimeter) and/or spectrophotometer, for example, CR-400 Chroma Meter (Konica Minolta) or a TR 520 Spectrophotometer (Lazar Scientific). Throughout the disclosure, a color difference is measured as $\sqrt{((L^*_1-L^*_2)^2+(a^*_2-a^*_1)^2+(b^*_2-b^*_1)^2)}$, where subscript 1 refers to the CIE color coordinates of the reference (as-formed) layer (e.g., film) and subscript 2 refers to the CIE color coordinates of the layer (e.g., film) after being held in a predetermined environment for a predetermined period of time. In aspects, the color difference of the layer (e.g., film) can be about 2 or less, about 1 or less, about 0.8 or less, about 0.5 or less, about 0.35 or less, about 0.1 or more, about 0.2 or more, or about 0.25 or more. In aspects, the color difference of the layer (e.g., film) can be in a range from about 0.1 to about 2, from about 0.1 to about 1, from about 0.2 to about 1, from about 0.2 to about 0.8, from about 0.2 to about 0.5, from about 0.2 to about 0.35, from about 0.25 to about 0.35, or any range or subrange therebetween. In aspects, the layer (e.g., film) can comprise a color difference within one or more of the above ranges after being held in a 25° C. environment for 5 days. In aspects, the layer (e.g., film) can comprise a color difference within one or more of the above ranges after being held in a 25° C. environment for 10 days. In aspects, the layer (e.g., film) can comprise a color difference within one or more of the above ranges after being held in a 60° C., 90% relative humidity environment for 5 days. In aspects, the layer (e.g., film) can comprise a color difference within one or more of the above ranges after being held in a 60° C., 90% relative humidity environment for 10 days. In aspects, the layer (e.g., film) can comprise a color difference within one or more of the above ranges after being held in an 85° C., 50% relative humidity environment for 5 days. In aspects, the layer (e.g., film) can comprise a color difference within one or more of the above ranges after being held in an 85° C., 50% relative humidity environment for 10 days. In aspects, the layer (e.g., film) can comprise a color difference within one or more of the above ranges after being held in a −25° C., 50% relative humidity environment for 5 days. In aspects, the layer (e.g., film) can comprise a color difference within one or more of the above ranges after being held in a −25° C., 50% relative humidity environment for 10 days. In aspects, the layer (e.g., film) can comprise a color difference within one or more of the above ranges after being cycled between −25° C. and 105° C. environments every 30 minutes for 5 days. In aspects, the layer (e.g., film) can comprise a color difference within one or more of the above ranges after being cycled between −25° C. and 105° C. environments every 30 minutes for 10 days.

In aspects, the layer (e.g., film) can comprise an absolute difference in a CIE L* value, $|L^*_1-L^*_2|$, where subscript 1 refers to the CIE color coordinates of the reference (as-formed) layer (e.g., film) and subscript 2 refers to the CIE color coordinates of the layer (e.g., film) after being held in a predetermined environment for a predetermined period of time. In further aspects, the absolute difference in the CIE L* value can be about 5 or less, about 2 or less, about 1.5 or less, about 1 or less, about 0.7 or less, about 0.01 or more, about 0.1 or more, about 0.2 or more, or about 0.5 or more. In further aspects, the absolute difference in the CIE L* value can be in a range from about 0.01 to about 5, from about 0.01 to about 2, from about 0.1 to about 2, from about 0.1 to about 1, from about 0.1 to about 0.7, from about 0.2 to about 0.7, from about 0.2 to about 0.5, or any range or subrange therebetween. In aspects, the layer (e.g., film) can comprise a CIE L* value of about 85 or more, about 89 or more, about 90 or more, 100 or less, about 95 or less, or about 92 or less. In aspects, the layer (e.g., film) can comprise a CIE L* value in a range from about 85 to 100, from about 89 to 100, from about 89 to about 95, from about 90 to about 95, from about 90 to about 92, or any range or subrange therebetween. In aspects, the layer (e.g., film) can comprise a CIE L* value and/or an absolute difference in a CIE L* value within one or more of the corresponding ranges above after being held in a 25° C. environment for 5 days. In aspects, the layer (e.g., film) can comprise a CIE L* value and/or an absolute difference in a CIE L* value within one or more of the corresponding ranges above after being held in a 25° C. environment for 10 days. In aspects, the layer (e.g., film) can comprise a CIE L* value and/or an absolute difference in a CIE L* value within one or more of the corresponding ranges above after being held in a 60° C., 90% relative humidity environment for 5 days. In aspects, the layer (e.g., film) can comprise a CIE L* value and/or an absolute difference in a CIE L* value within one or more of the corresponding ranges above after being held in a 60° C., 90% relative humidity environment for 10 days. In aspects, the layer (e.g., film) can comprise a CIE L* value and/or an absolute difference in a CIE L* value within one or more of the corresponding ranges above after being held in an 85° C., 50% relative humidity environment for 5 days. In aspects, the layer (e.g., film) can comprise a CIE L* value and/or an absolute difference in a CIE L* value within one or more of the corresponding ranges above after being held in an 85° C., 50% relative humidity environment for 10 days. In aspects, the layer (e.g., film) can comprise a CIE L* value and/or an absolute difference in a CIE L* value within one or more of the corresponding ranges above after being held in a −25° C., 50% relative humidity environment for 5 days. In aspects, the layer (e.g., film) can comprise a CIE L* value and/or an absolute difference in a CIE L* value within one or more of the corresponding ranges above after being held in a −25° C., 50% relative humidity environment for 10 days. In aspects, the layer (e.g., film) can comprise a CIE L* value and/or an absolute difference in a CIE L* value within one or more of the corresponding ranges above after being cycled between −25° C. and 105° C. environments every 30 minutes for 5 days. In aspects, the layer (e.g., film) can comprise a CIE L* value and/or an absolute difference in a CIE L* value within one or more of the corresponding ranges above after being cycled between −25° C. and 105° C. environments every 30 minutes for 10 days.

In aspects, the layer (e.g., film) can comprise an absolute difference in a CIE a* value, $|a^*_1-a^*_2|$, where subscript 1 refers to the CIE color coordinates of the reference (as-formed) layer (e.g., film) and subscript 2 refers to the CIE color coordinates of the layer (e.g., film) after being held in a predetermined environment for a predetermined period of time. In further aspects, the absolute difference in the CIE a* value can be about 0.2 or less, about 0.15 or less, about 0.1 or less, about 0.08 or less, about 0.01 or more, about 0.02 or more, or about 0.5 or more. In further aspects, the absolute difference in the CIE a* value can be in a range from about 0.01 to about 0.2, from about 0.01 to about 0.15, from about 0.02 to about 0.15, from about 0.02 to about 0.1, from about 0.05 to about 0.1, from about 0.05 to about 0.08, or any range or subrange therebetween. In aspects, the layer (e.g., film) can comprise a CIE a* value of about 0.05 or more, about 0.1 or more, about 0.15 or more, 0.4 or less, about 0.3 or less, or about 0.25 or less. In aspects, the layer (e.g., film) can comprise a CIE a* value in a range from about 0.05 to about 0.4, from about 0.1 to about 0.4, from about 0.15 to about 0.4, from about 0.15 to about 0.3, from about 0.15 to about 0.25, or any range or subrange therebetween. In aspects, the layer (e.g., film) can comprise a CIE a* value and/or an absolute difference in a CIE a* value within one or more of the corresponding ranges above after being held in a 25° C. environment for 5 days. In aspects, the layer (e.g., film) can comprise a CIE a* value and/or an absolute difference in a CIE a* value within one or more of the corresponding ranges above after being held in a 25° C. environment for 10 days. In aspects, the layer (e.g., film) can comprise a CIE a* value and/or an absolute difference in a CIE a* value within one or more of the corresponding ranges above after being held in a 60° C., 90% relative humidity environment for 5 days. In aspects, the layer (e.g., film) can comprise a CIE a* value and/or an absolute difference in a CIE a* value within one or more of the corresponding ranges above after being held in a 60° C., 90% relative humidity environment for 10 days. In aspects, the layer (e.g., film) can comprise a CIE a* value and/or an absolute difference in a CIE a* value within one or more of the corresponding ranges above after being held in an 85° C., 50% relative humidity environment for 5 days. In aspects, the layer (e.g., film) can comprise a CIE a* value and/or an absolute difference in a CIE a* value within one or more of the corresponding ranges above after being held in an 85° C., 50% relative humidity environment for 10 days. In aspects, the layer (e.g., film) can comprise a CIE a* value and/or an absolute difference in a CIE a* value within one or more of the corresponding ranges above after being held in a −25° C., 50% relative humidity environment for 5 days. In aspects, the layer (e.g., film) can comprise a CIE a* value and/or an absolute difference in a CIE a* value within one or more of the corresponding ranges above after being held in a −25° C., 50% relative humidity environment for 10 days. In aspects, the layer (e.g., film) can comprise a CIE a* value and/or an absolute difference in a CIE a* value within one or more of the corresponding ranges above after being cycled between −25° C. and 105° C. environments every 30 minutes for 5 days. In aspects, the layer (e.g., film) can comprise a CIE a* value and/or an absolute difference in a CIE a* value within one or more of the corresponding ranges above after being cycled between −25° C. and 105° C. environments every 30 minutes for 10 days.

In aspects, the layer (e.g., film) can comprise an absolute difference in a CIE b* value, $|b*_1 - b*_2|$, where subscript 1 refers to the CIE color coordinates of the reference (as-formed) layer (e.g., film) and subscript 2 refers to the CIE color coordinates of the layer (e.g., film) after being held in a predetermined environment for a predetermined period of time. In further aspects, the absolute difference in the CIE b* value can be about 1 or less, about 0.7 or less, about 0.5 or less, about 0.3 or less, about 0.01 or more, about 0.1 or more, about 0.15 or more, or about 0.2 or more. In further aspects, the absolute difference in the CIE b* value can be in a range from about 0.01 to about 1, from about 0.01 to about 0.7, from about 0.1 to about 0.7, from about 0.1 to about 0.5, from about 0.15 to about 0.5, from about 0.15 to about 0.3, from about 0.2 to about 0.3 or any range or subrange therebetween. In aspects, the layer (e.g., film) can comprise a CIE b* value of about 1 or more, about 1.5 or more, about 1.7 or more, 3 or less, about 2.5 or less, about 2.2 or less, or about 2 or less. In aspects, the layer (e.g., film) can comprise a CIE b* value in a range from about 1 to about 3, from about 1.5 to about 3, from about 1.5 to about 2.5, from about 1.7 to about 2.5, from about 1.7 to about 2.2, from about 1.7 to about 2, or any range or subrange therebetween. In aspects, the layer (e.g., film) can comprise a CIE b* value and/or an absolute difference in a CIE b* value within one or more of the corresponding ranges above after being held in a 25° C. environment for 5 days. In aspects, the layer (e.g., film) can comprise a CIE b* value and/or an absolute difference in a CIE b* value within one or more of the corresponding ranges above after being held in a 25° C. environment for 10 days. In aspects, the layer (e.g., film) can comprise a CIE b* value and/or an absolute difference in a CIE b* value within one or more of the corresponding ranges above after being held in a 60° C., 90% relative humidity environment for 5 days. In aspects, the layer (e.g., film) can comprise a CIE b* value and/or an absolute difference in a CIE b* value within one or more of the corresponding ranges above after being held in a 60° C., 90% relative humidity environment for 10 days. In aspects, the layer (e.g., film) can comprise a CIE b* value and/or an absolute difference in a CIE b* value within one or more of the corresponding ranges above after being held in an 85° C., 50% relative humidity environment for 5 days. In aspects, the layer (e.g., film) can comprise a CIE b* value and/or an absolute difference in a CIE b* value within one or more of the corresponding ranges above after being held in an 85° C., 50% relative humidity environment for 10 days. In aspects, the layer (e.g., film) can comprise a CIE b* value and/or an absolute difference in a CIE b* value within one or more of the corresponding ranges above after being held in a −25° C., 50% relative humidity environment for 5 days. In aspects, the layer (e.g., film) can comprise a CIE b* value and/or an absolute difference in a CIE b* value within one or more of the corresponding ranges above after being held in a −25° C., 50% relative humidity environment for 10 days. In aspects, the layer (e.g., film) can comprise a CIE b* value and/or an absolute difference in a CIE b* value within one or more of the corresponding ranges above after being cycled between −25° C. and 105° C. environments every 30 minutes for 5 days. In aspects, the layer (e.g., film) can comprise a CIE b* value and/or an absolute difference in a CIE b* value within one or more of the corresponding ranges above after being cycled between −25° C. and 105° C. environments every 30 minutes for 10 days.

In aspects, a difference in a CIE a* value between the film and/or the laminate after being held in an 85° C., 50% relative humidity environment for 10 days and the film and/or the laminate as-formed can be about −0.1 or more, about −0.06 or more, about 0 or less, about −0.01 or less, or about −0.02 or less. In aspects a difference in a CIE a* value between the film and/or the laminate after being held in an 85° C., 50% relative humidity environment for 10 days and the film and/or the laminate as-formed can be in a range from about −0.1 to about 0, from about −0.06 to about 0, from about −0.06 to about −0.01, from about −0.06 to about −0.02, or any range or subrange therebetween.

In aspects, a difference in a CIE b* value between the film and/or the laminate after being held in an 85° C., 50% relative humidity environment for 10 days and the film and/or the laminate as-formed can be about −0.2 or more, about −0.15 or more, about −0.1 or more, about 0.1 or less, about 0.05 or less, or about 0 or less, or about −0.01 or less.

In aspects a difference in a CIE b* value between the film and/or the laminate after being held in an 85° C., 50% relative humidity environment for 10 days and the film and/or the laminate as-formed can be in a range from about −0.2 to about 0.1, from about −0.15 to about 0.1, from about −0.15 to about 0.05, from about −0.10 to about 0.05, from about −0.10 to about 0, from about −0.05 to about 0, from about −0.05 to about −0.01, or any range or subrange therebetween. In aspects a difference in a CIE b* value between the film and/or the laminate after being held in an 85° C., 50% relative humidity environment for 10 days and the film and/or the laminate as-formed can be less than 0, for example, in a range from about −0.2 to about −0.01 or less, from about −0.15 to about −0.01 or less, from about −0.1 to about −0.01 or less, or any range or subrange therebetween.

Figure 13:
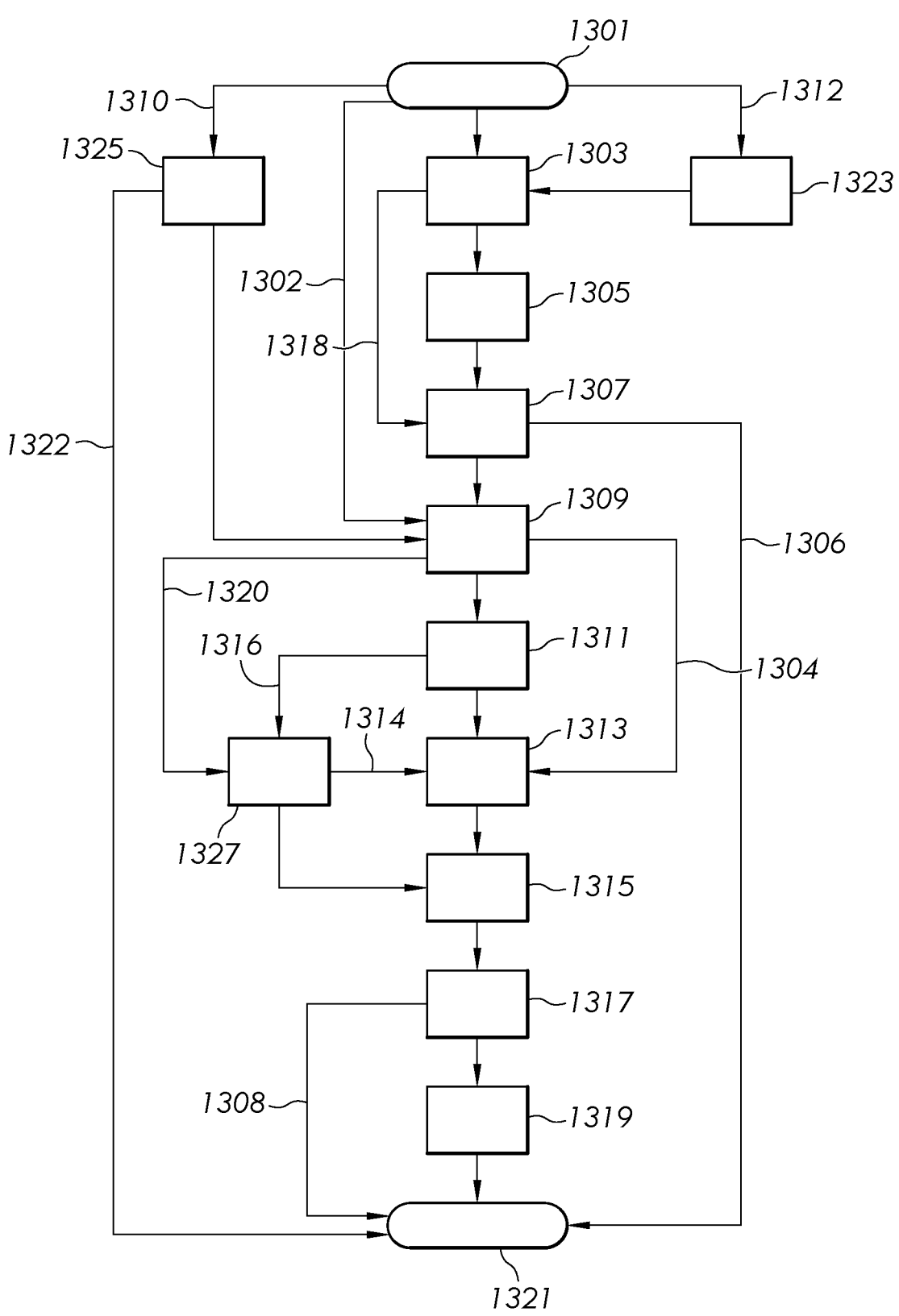
FIG. 13 is a flow chart illustrating example methods making a laminate in accordance with aspects of the disclosure.

Aspects of methods of making the films 901 and/or 1001 in accordance with aspects of the disclosure will be discussed with reference to the flow chart in FIG. 13 and example method steps illustrated in FIGS. 14-17. With reference to the flow chart of FIG. 13, methods can start at step 1301. In aspects, step 1301 can comprise providing film-forming material(s) or precursors (e.g., reactants) thereof, for example, by purchasing reactants to form film-forming materials, by forming the film-forming material(s) through chemical synthesis, or by purchasing the film-forming material(s).

In methods, methods can comprise forming a film 901 comprising an adhesive layer. In further aspects, the film-forming material can comprise an acrylate-based polymer and/or a urethane-based polymer and/or the precursors can comprise acrylate-functionalized materials and/or urethane-functionalized materials. In aspects, after step 1301, methods can proceed to step 1323 comprising reacting reactants to form the film-forming material(s). In further aspects, step 1323 can comprise heating the precursor materials (e.g., reactants), including an initiator (e.g., photo-initiator, catalyst), and a solvent in an inert environment to a reaction temperature of about 50° C. or more and maintaining the reaction temperature for a third period of time. As used herein, an inert environment comprising diatomic nitrogen, argon, helium, neon, krypton, xenon, and/or radon. The inert environment can be substantially free of water (e.g., water vapor) and/or free of water (e.g., water vapor). Solvents can comprise one or more of a polar solvent (e.g., water, an alcohol, an acetate, acetone, formic acid, dimethylformamide, acetonitrile, dimethyl sulfoxone, nitromethane, ethylene carbonate, propylene carbonate, poly(ether ether ketone)) or a non-polar solvent (e.g., pentane, 1,4-dioxane, chloroform, dichloromethane, diethyl ether, hexane, heptane, benzene, toluene, xylene). Example aspects of alcohols include methanol, ethanol, propanol, butanol, cyclohexanol, hexanol, octanol, ethylene glycol, and propylene glycol. Example aspects of acetate include ethyl acetate, propyl acetate, and butyl acetate. In further aspects, the solvent can comprise butyl acetate, propyl acetate, and/or acetonitrile. In further aspects, step 1323 can further comprise removing the solvent after the third period of time, for example, using increased temperature and/or reduced pressure (e.g., vacuum, rotary evaporator).

In further aspects, the reaction temperature can be about 50° C. or more, about 60° or more, about 70° C. or more, about 200° C. or less, about 160° C. or less, about 120° C. or less, or about 100° or less. In further aspects, the reaction temperature can be in a range from about 50° C. to about 200° C., from about 50° C. to about 160° C., from about 60° C. to about 160° C., from about 60° C. to about 120° C., from about 70° C. to about 120° C., from about 70° C. to about 100° C., or any range or subrange therebetween. In further aspects, the reaction temperature can be maintained by an electrical resistance heater, an oil bath, or a salt bath that a reaction vessel is in contact with. In further aspects, the third period of time can be about 12 hours or more, about 14 hours or more, about 16 hours or more, about 24 hours or less, about 21 hours or less, or about 18 hours or less. In further aspects, the third period of time can be in a range from about 12 hours to about 24 hours, from about 12 hours to about 21 hours, from about 14 hours to about 21 hours, from about 14 hours to about 18 hours, from about 16 hours to about 18 hours, or any range or subrange therebetween. It is to be understood that step 1323 can comprise heating at a first temperature for a first period of time followed by heating at a second temperature for a second period of time, wherein the second temperature can be greater than the first temperature, the first temperature and second temperature can be within one or more of the ranges discussed above for the reaction temperature, and a combined time of the first period of time and the second period of time can be within one or more of the ranges discussed above for the reaction temperature. Providing a long (e.g., about 12 hours or more) reaction time can provide a high extent or reaction, increasing homogeneity of the resulting film as well as improving mechanical and/or optical properties of the resulting film.

Figure 14:
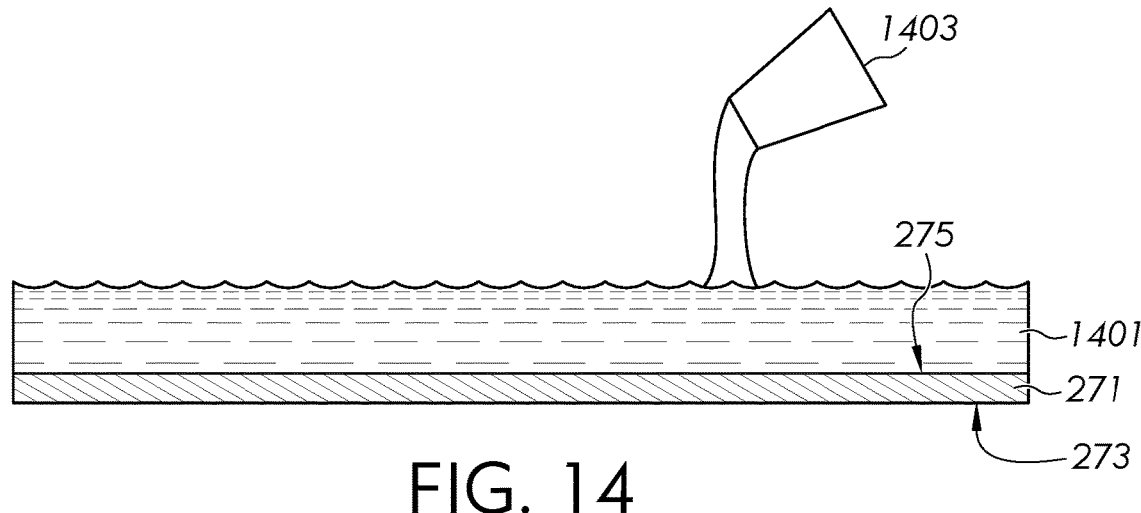
FIGS. 14-25 schematically illustrate steps in methods of making a laminate.

In aspects, after step 1323 or step 1301, methods can proceed to step 1303 comprising disposing a liquid 1401 over a release liner 271, as shown in FIG. 14. In further aspects, as shown, step 1303 can comprise dispensing the liquid 1401 from a container 1403 (e.g., conduit, flexible tube, micropipette, or syringe) over the sixth major surface 275 of the release liner 271. In further aspects, the liquid 1401 can comprise the film-forming material and a solvent, which can already be present with the film-forming material (e.g., from step 1323) and/or can be added in step 1303. In further aspects, the liquid 1401 can consist of the film-forming material, for example, being substantially solvent-free and/or solvent-free. As used herein, solvent refers to material other than the film-forming material of the resulting film and precursors thereof that react to form the film-forming material. As used herein, a liquid is "substantially free of solvent" or "substantially solvent-free" if it contains 2 wt % or less of solvent. As used herein, a liquid is "free of solvent" or "solvent-free" if it comprises 0.5 wt % or less of solvent. Providing a liquid that is substantially free of solvent or substantially solvent-free can decrease processing time and/or provide a more uniform (e.g., homogeneous) film. Further, providing a composition that is substantially free of solvent or solvent-free can reduce (e.g., decrease, eliminate) the use of rheology modifiers and increase composition homogeneity, which can increase the optical transparency (e.g., transmittance) of the resulting coating.

Figure 15:
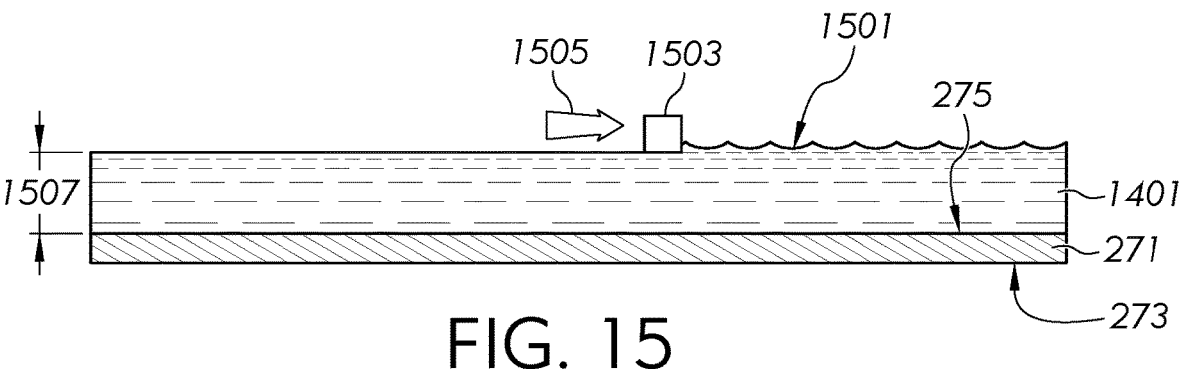

In aspects, after step 1303, methods can proceed to step 1305 comprising drawing an applicator 1503 across a free surface 1501 of the liquid 1401, as shown in FIG. 15. In further aspects, as shown, the applicator 1503 can comprise a bar, blade, or other material across the free surface 1501 of the liquid 1401 to set a uniform thickness 1507 of the liquid 1401 on the release liner 271. In even further aspects, the uniform thickness 1507 can be within one or more of the ranges discussed above for the film thickness 919. In further aspects, as shown, the applicator can be drawn across the free surface 1501 of the liquid 1401 in a direction 1505, for example, in a smooth motion.

Figure 16:
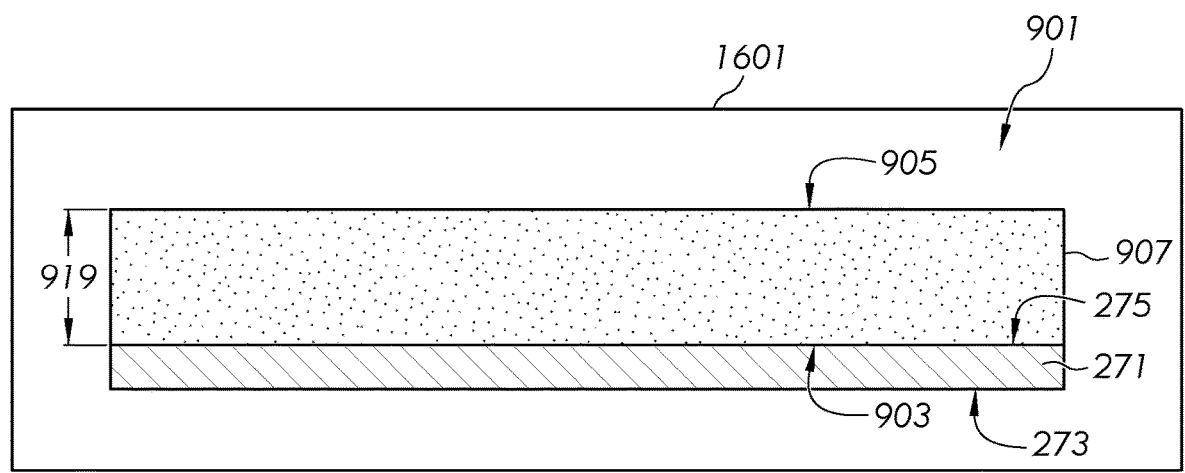
Figure 17:
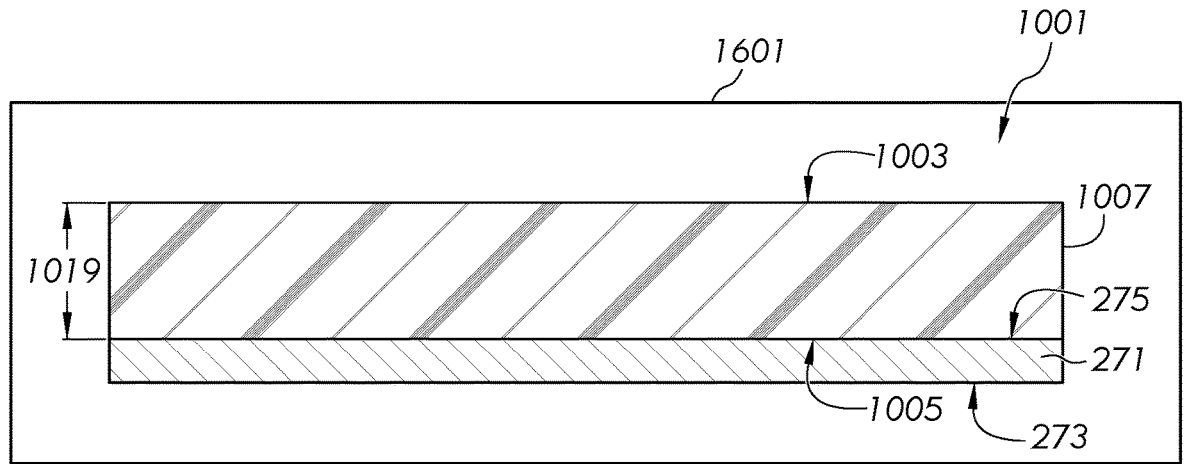

In aspects, after step 1305 or step 1303, methods can proceed to step 1307 comprising curing the liquid to form a film. In further aspects, as shown in FIG. 16, step 1307 can comprise heating the liquid 1401 to form the film 901, for example, by placing the liquid 1401 in an oven 1601 maintained at an elevated temperature. In even further aspects, the elevated temperature can be within one or more of the ranges discussed above for the reaction temperature discussed above. In even further aspects, the liquid can be heated for a period of time of about 30 minutes or more, about 1 hour or more, about 2 hours or more, about 24 hours or less, about 18 hours or less, about 12 hours or less, about 8 hours or less, about 6 hours or less, or about 4 hours or less. In even further aspects, the liquid can be heated for a period of time in a range from about 30 minutes to about 24 hours, from about 30 minutes to about 18 hours, from about 1 hour to about 18 hours, from about 1 hour to about 12 hours, from about 2 hours to about 12 hours, from about 2 hours to about 8 hours, from about 2 hours to about 6 hours, from about 2 hours to about 4 hours, or any range or subrange therebetween.

In aspects, after step 1307, methods can proceed to step 1321 whereupon methods can be complete as the film 901 has been formed. In aspects, methods can comprise additional steps, discussed below, including forming a laminate using the film. In aspects, methods can proceed sequentially through steps 1301, 1303, 1305, 1307, and 1321, following arrow 1306 from step 1307 to step 1321. In aspects, methods can follow arrow 1312 to add step 1323 between steps 1301 and 1303, for example, to form the film-forming materials by reacting precursors (e.g., reactants). In aspects, methods can follow arrow 1318 to skip step 1305 by going from step 1303 to step 1307, for example if a substantially uniform thickness of the liquid is achieved through gravity or using other methods. Any of the above options may be combined to make a foldable apparatus in accordance with aspects of the disclosure. It is to be understood that the above methods can be used to form an adhesive (e.g., film 901) and/or a polymer-based portion (e.g., film 1001).

In methods, methods can comprise forming a film 1001 comprising a polymer-based portion. In further aspects, the film-forming material can comprise a tri-block material that can comprise a first block grafted with a first functional group, as described above. In aspects, after step 1301, methods can proceed to step 1103, as described above, for example, if the tri-block copolymer is already grafted with the first functional group, wherein step 1303 further comprises forming a liquid by dissolving the tri-block copolymer in a solvent. In further aspects, methods can proceed as discussed above for the adhesive, where an example of step 1307 shown in FIG. 17 comprises heating the liquid to form a film 1001 by placing the liquid in an oven 1601.

In aspects, after step 1301, methods can proceed to step 1325, following arrow 1310, comprising extruding the film-forming material into a film (e.g., film 1001) with or without a release liner. In further aspects, the film (e.g., film 1001) can comprise a film thickness (e.g., film thickness 1019) within one or more of the ranges discussed above for the film thickness 919. In further aspects, the extruding the film-forming materials can comprise feeding an initial tri-block copolymer and a grafting material through an extruder to form the tri-block copolymer. Without wishing to be bound by theory, reactive extrusion can be used to graft a first functional group of the grafting material to the first block of the tri-block copolymer. In further aspects, the film can consist of the tri-block material and/or components thereof. In aspects, after step 1325, methods can proceed to step 1321, following arrow 1322, whereupon methods can be complete as the film 1001 has been formed. It is to be understood that extrusion can also be used to form a layer of a film (e.g., a layer 907 of film 901) comprising an adhesive.

Example composition ranges of films in some aspects of the disclosure are presented in Table 1. R1 is the broadest of the ranges in Table 1. R2-R3 consist of the tri-block copolymer. R4-R6 comprise the tri-block polymer and the di-block copolymer with an optional silane coupling agent in R4. R1 and R4 can comprise an antioxidant. Again, it is to be understood that other ranges or subranges discussed above for these components can be used in combination with any of the ranges presented in Table 1.

TABLE 1

| Composition ranges (wt %) of aspects of films | | | | | | |
|---|---|---|---|---|---|---|
| Range | R1 | R2 | R3 | R4 | R5 | R6 |
| Tri-block: first portion | 20-90 | 50-90 | 70-87 | 20-80 | 45-85 | 65-80 |
| Tri-block: second portion | 5-50 | 10-50 | 13-30 | 5-50 | 8-45 | 8-30 |
| Di-block: first portion | 0-30 | 0 | 0 | 5-60 | 5-30 | 5-15 |
| Di-block: Second portion | 0-30 | 0 | 0 | 1-35 | 1-10 | 1-5 |
| Silane Coupling Agent | 0-5 | 0 | 0 | 0-5 | 0 | 0 |
| Antioxidant | 0-0.5 | 0 | 0 | 0.1-0.3 | 0 | 0 |

Figure 2:
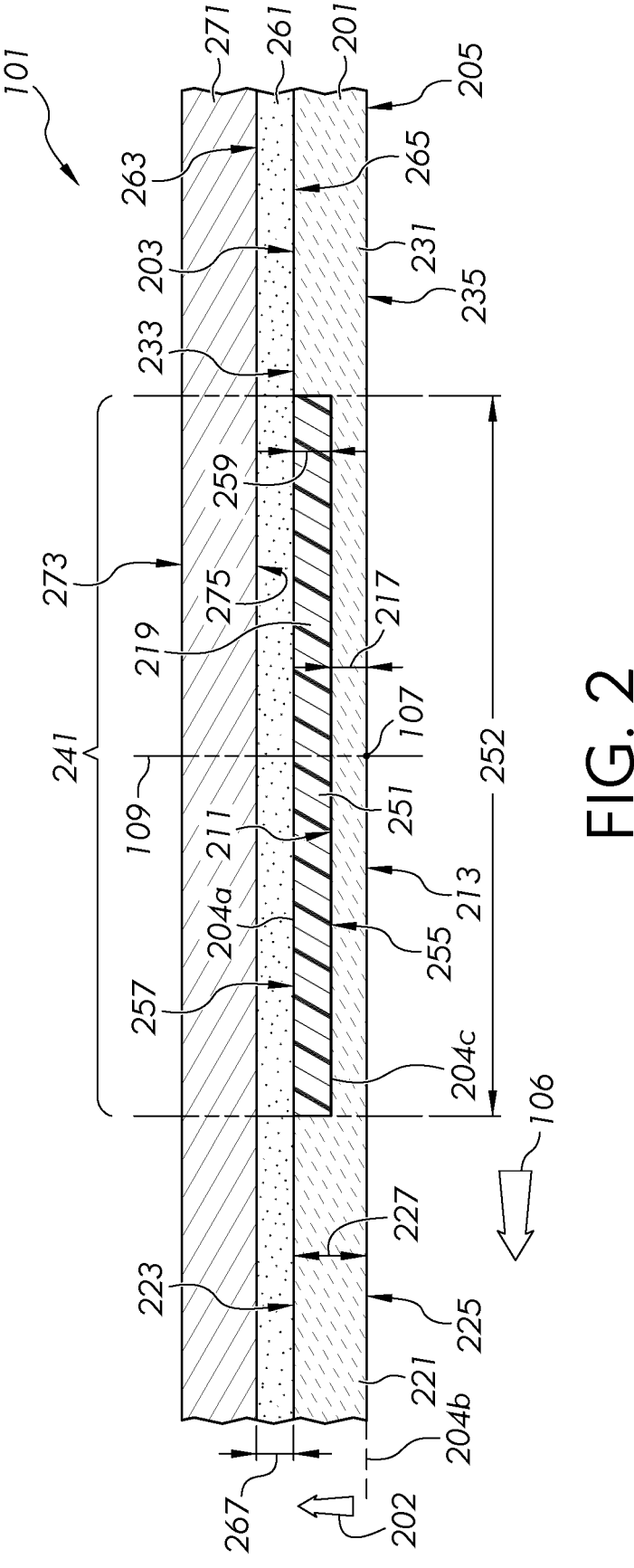
FIGS. 2-4 are cross-sectional views of laminates along line 2-2 of FIG. 1 in accordance with aspects of the disclosure.
Figure 3:
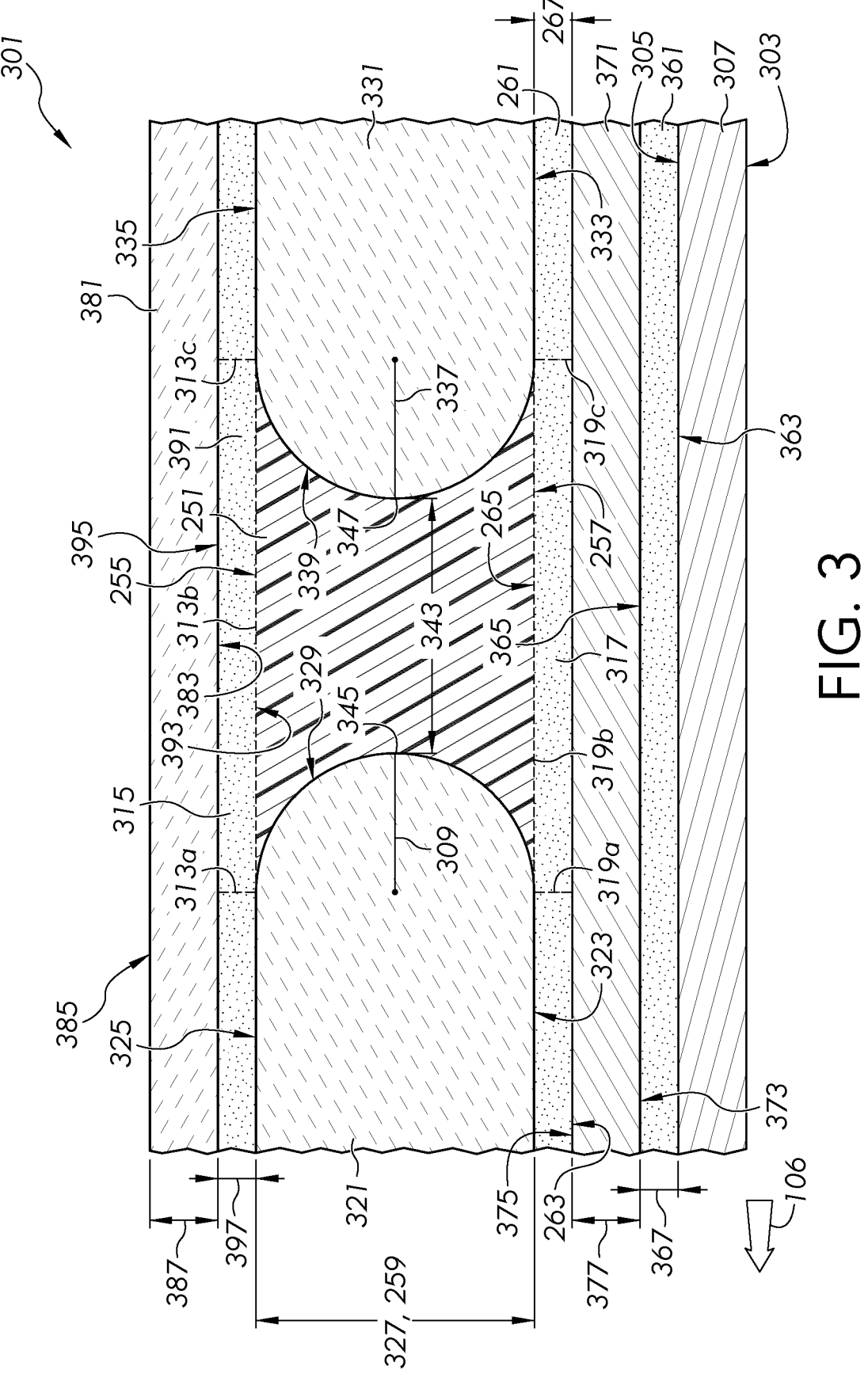
Figure 4:
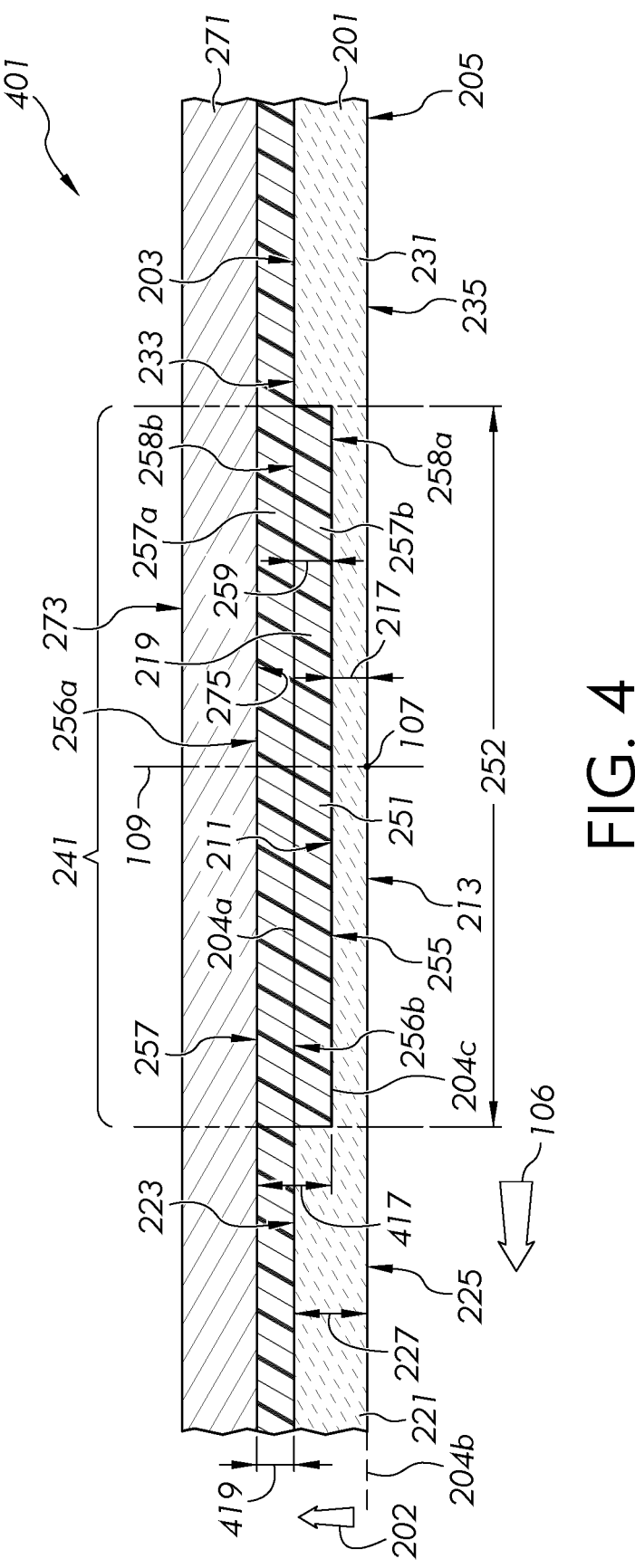
Figure 7:
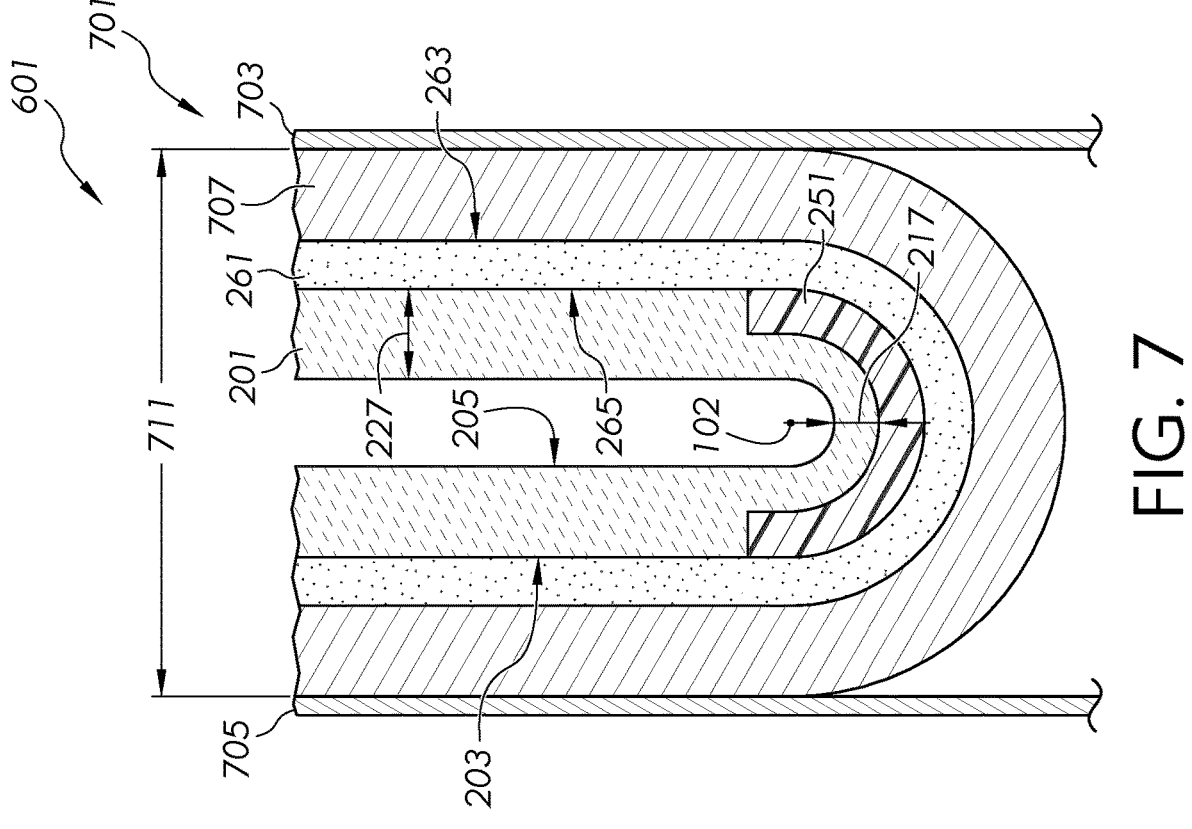
FIG. 7-8 are cross-sectional views of the example laminate in the folded configuration along line 7-7 of FIG. 6 in accordance with aspects of the disclosure.
Figure 6:
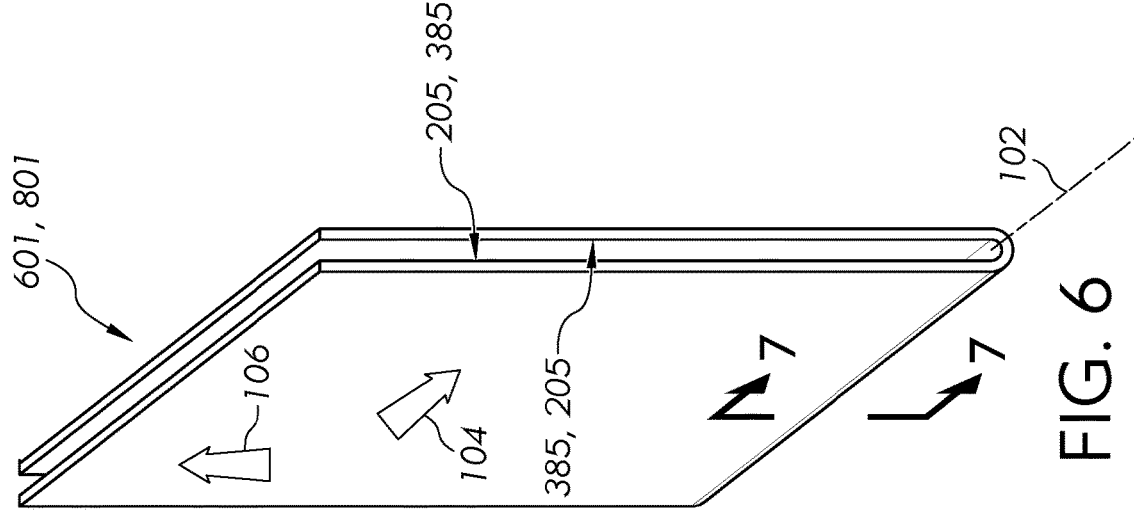
FIG. 6 is a schematic perspective view of another example laminate in a folded configuration in accordance with aspects of the disclosure, wherein a schematic perspective view of the flat configuration may appear as shown in FIG. 1.
Figure 8:
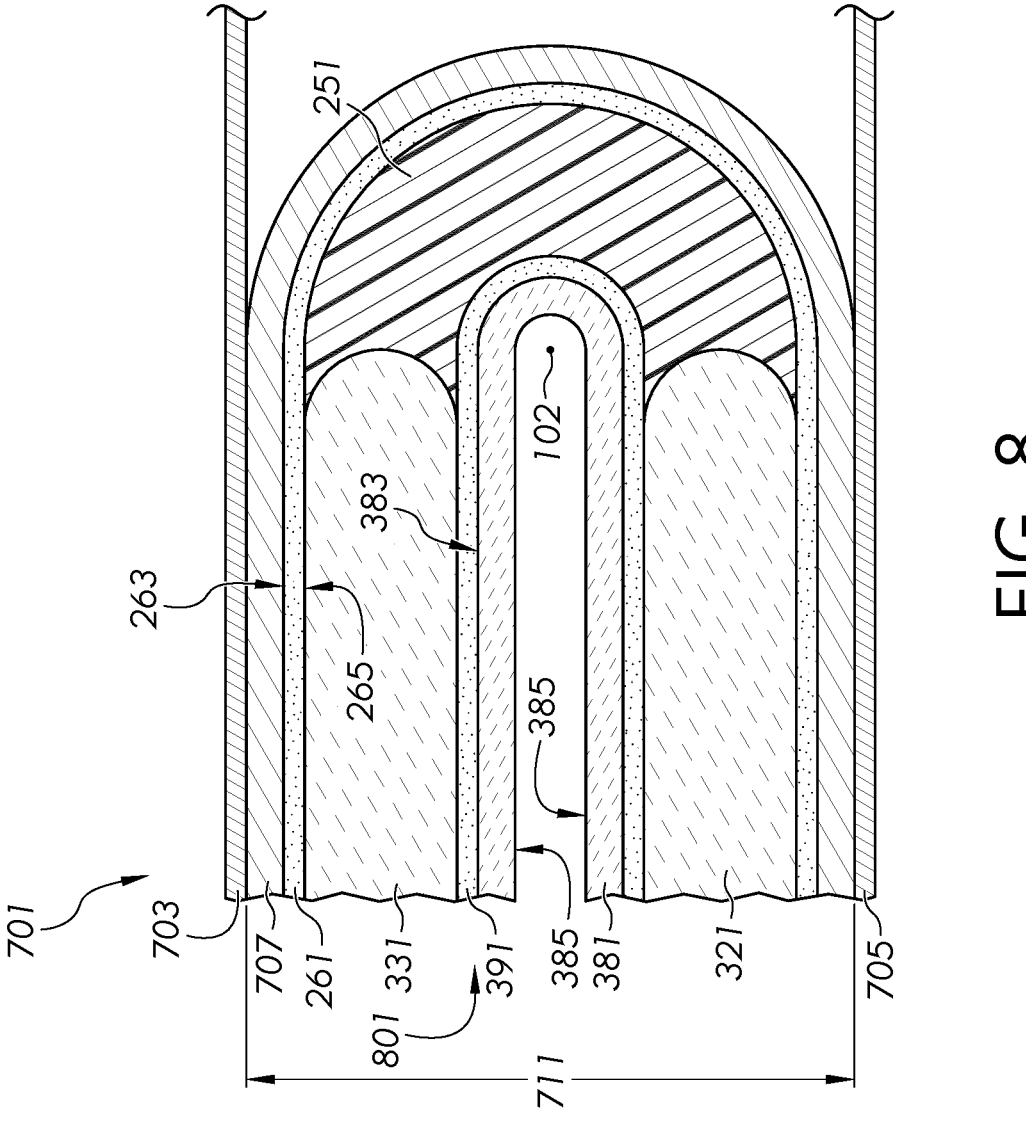

FIGS. 1-4 schematically illustrate example aspects of a laminate 101, 301, and/or, 401 in an unfolded (e.g., flat configuration) in accordance with aspects of the disclosure while FIGS. 6-8 schematically illustrate example of aspects of a laminate 601 and/or 801 in a folded configuration in accordance with aspects of the disclosure. Laminates of the disclosure comprise a substrate. As shown in FIGS. 2 and 4, the laminate 101 and 401 can comprise a substrate 201. As shown in FIG. 3, the laminate 301 can comprise a substrate 371, a first portion 321, and a second portion 331. In aspects, the substrate 201 and/or 371, the first portion 321, and/or the second portion 331 can comprise a glass-based substrate and/or a ceramic-based substrate having a pencil hardness of 8H or more, for example, 9H or more. As used herein, pencil hardness is measured using ASTM D 3363-20 with standard lead graded pencils. Additionally, the substrate may comprise a glass-based substrate and/or a ceramic-based substrate to enhance puncture resistance and/or impact resistance.

In aspects, the substrate 201 and/or 371, the first portion 321, and/or the second portion 331 can comprise a glass-based substrate. As used herein, "glass-based" includes both glasses and glass-ceramics, wherein glass-ceramics have one or more crystalline phases and an amorphous, residual glass phase. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion-exchange of larger ions for smaller ions in the surface of the substrate, as discussed below. However, other strengthening methods, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In aspects, glass-based material can comprise an alkali-containing glass or an alkali-free glass, either of which may be free of lithia or not. In aspects, the glass material can be alkali-free and/or comprise a low content of alkali metals (e.g., $R_2O$ of about 10 mol % or less, wherein $R_2O$ comprises $Li_2O$ $Na_2O$, $K_2O$ or the more expansive list provided below). In one or more aspects, a glass-based material may comprise, in mole percent (mol %): $SiO_2$ in a range from about 40 mol % to about 80%, $Al_2O_3$ in a range from about 5 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. In aspects, a glass-based substrate may optionally further comprise in a range from 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. "Glass-ceramics" include materials produced through controlled crystallization of glass. In aspects, glass-ceramics have about 1% to about 99% crystallinity. Examples of suitable glass-ceramics may include $Li_2O$—$Al_2O_3$—$SiO_2$ system (i.e., LAS-System) glass-ceramics, MgO—$Al_2O_3$—$SiO_2$ system (i.e., MAS-System) glass-ceramics, ZnOx$Al_2O_3$x$nSiO_2$ (i.e., ZAS system), and/or glass-ceramics that include a predominant crystal phase including β-quartz solid solution, β-spodumene, cordierite, petalite, and/or lithium disilicate. The glass-ceramic substrates may be strengthened using chemical strengthening processes. In one or more aspects, MAS-System glass-ceramic substrates may be strengthened in $Li_2SO_4$ molten salt, whereby an exchange of $2Li^+$ for $Mg_2^+$ can occur.

In aspects, the substrate 201 and/or 371, the first portion 321, and/or the second portion 331 can comprise a ceramic-based substrate. As used herein, "ceramic-based" includes both ceramics and glass-ceramics, wherein glass-ceramics have one or more crystalline phases and an amorphous, residual glass phase. Ceramic-based materials may be strengthened (e.g., chemically strengthened). In aspects, a ceramic-based material can be formed by heating a glass-based material to form ceramic (e.g., crystalline) portions. In further aspects, ceramic-based materials may comprise one or more nucleating agents that can facilitate the formation of crystalline phase(s). In aspects, the ceramic-based materials can comprise one or more oxides, nitrides, oxynitrides, carbides, borides, and/or silicides. Example aspects of ceramic oxides include zirconia ($ZrO_2$), zircon ($ZrSiO_4$), an alkali metal oxide (e.g., sodium oxide ($Na_2O$)), an alkali earth metal oxide (e.g., magnesium oxide (MgO)), titania ($TiO_2$), hafnium oxide ($Hf_2O$), yttrium oxide ($Y_2O_3$), iron oxides, beryllium oxides, vanadium oxide ($VO_2$), fused quartz, mullite (a mineral comprising a combination of aluminum oxide and silicon dioxide), and spinel ($MgAl_2O_4$). Example aspects of ceramic nitrides include silicon nitride ($Si_3N_4$), aluminum nitride (AlN), gallium nitride (GaN), beryllium nitride ($Be_3N_2$), boron nitride (BN), tungsten nitride (WN), vanadium nitride, alkali earth metal nitrides (e.g., magnesium nitride ($Mg_3N_2$)), nickel nitride, and tantalum nitride. Example aspects of oxynitride ceramics include silicon oxynitride, aluminum oxynitride, and a SiAlON (a combination of alumina and silicon nitride and can have a chemical formula, for example, $Si_{12-m-n}Al_{m+n}$ $O_nN_{16-n}$, $Si_{6-n}Al_nO_nN_{8-n}$, or $Si_{2-n}Al_n$ $O_{1-n}N_{2-n}$, where m, n, and the resulting subscripts are all non-negative integers). Example aspects of carbides and carbon-containing ceramics include silicon carbide (SiC), tungsten carbide (WC), an iron carbide, boron carbide ($B_4C$), alkali metal carbides (e.g., lithium carbide ($Li_4C_3$)), alkali earth metal carbides (e.g., magnesium carbide ($Mg_2C_3$)), and graphite. Example aspects of borides include chromium boride ($CrB_2$), molybdenum boride ($MO_2B_5$), tungsten boride ($W_2B_5$), iron boride, titanium boride, zirconium boride ($ZrB_2$), hafnium boride ($HfB_2$), vanadium boride ($VB_2$), Niobium boride ($NbB_2$), and lanthanum boride ($LaB_6$). Example aspects of silicides include molybdenum disilicide ($MoSi_2$), tungsten disilicide ($WSi_2$), titanium disilicide ($TiSi_2$), nickel silicide (NiSi), alkali earth silicide (e.g., sodium silicide (NaSi)), alkali metal silicide (e.g., magnesium silicide ($Mg_2Si$)), hafnium disilicide ($HfSi_2$), and platinum silicide (PtSi).

Throughout the disclosure, an elastic modulus (e.g., Young's modulus) of the substrate 201 and/or 371, the first portion 321, and/or the second portion 331 (e.g., glass-based material, ceramic-based material) is measured using indentation methods in accordance with ASTM E2546-15. In aspects, the substrate 201 and/or 371, the first portion 321, and/or the second portion 331 can comprise an elastic modulus of about 10 GigaPascals (GPa) or more, about 50 GPa or more, about 60 GPa or more, about 70 GPa or more, about 100 GPa or less, or about 80 or less. In aspects, the substrate 201 and/or 371, the first portion 321, and/or the second portion 331 can comprise an elastic modulus in a range from about 10 GPa to about 100 GPa, from about 50 GPa to about 100 GPa, from about 50 GPa to about 80 GPa, from about 60 GPa to about 80 GPa, from about 70 GPa ta about 80 GPa, or any range or subrange therebetween.

As shown in FIGS. 2 and 4, the substrate 201 can comprise a third major surface 203 and a fourth major surface 205 opposite the third major surface 203. As shown in FIG. 2, the third major surface 203 can extend along a first plane 204a. As further shown in FIGS. 2 and 4, the substrate 201 can comprise the fourth major surface 205 extending along a second plane 204b. In aspects, as shown, the second plane 204b can be parallel to the first plane 204a. As used herein, a substrate thickness 227 can be defined between the third major surface 203 and the fourth major surface 205 as a distance between the first plane 204a and the second plane 204b. In aspects, the substrate thickness 227 can be about 10 micrometers (μm) or more, about 25 μm or more, about 40 μm or more, about 60 μm or more, about 80 μm or more, about 100 μm or more, about 125 μm or more, about 150 μm or more, about 3 millimeters (mm) or less, about 2 mm or less, about 1 mm or less, about 800 μm or less, about 500 μm or less, about 300 μm or less, about 200 μm or less, about 180 μm or less, or about 160 μm or less. In aspects, the substrate thickness 227 can be in a range from about 10 μm to about 3 mm, from about 10 μm to about 2 mm, from about 25 μm to about 2 mm, from about 40 μm to about 2 mm, from about 60 μm to about 2 mm, from about 80 μm to about 2 mm, from about 100 μm to about 2 mm, from about 100 μm to about 1 mm, from about 100 μm to about 800 μm, from about 100 μm to about 500 μm, from about 125 μm to about 500 μm, from about 125 μm to about 300 μm, from about 125 μm to about 200 μm, from about 150 μm to about 200 μm, from about 150 μm to about 160 μm, or any range or subrange therebetween. In aspects, the substrate thickness 227 can be in a range from about 80 μm to about 2 mm, from about 80 μm to about 1 mm, from about 80 μm to about 500 μm, from about 80 μm to about 300 μm, from about 200 μm to about 2 mm, from about 200 μm to about 1 mm, from about 200 μm to about 500 μm, from about 500 μm to about 2 mm, from about 500 μm to about 1 mm, or any range or subrange therebetween. In aspects, the substrate thickness can be about 300 μm or less, for example, from about 10 μm to about 300 μm, from 25 μm to about 300 μm, from about 25 μm to about 200 μm, from about 25 μm to about 180 μm, from about 40 μm to about 180 μm, from about 40 μm to about 160 μm, from about 60 μm to about 160 μm, from about 80 μm to about 160 μm, or any range or subrange therebetween.

In aspects, as shown in FIGS. 2 and 4, the substrate 201 can comprise a first portion 221 and a second portion 231 with a central portion 241 positioned therebetween. In further aspects, the first portion 221 and/or the second portion 231 can comprise the substrate thickness 227. In further aspects, as shown, the first portion 221 can comprise a first surface area 223 comprising a portion of the third major surface 203 and a second surface area 225 comprising a portion of the fourth major surface 205 opposite the first surface area 223. In further aspects, the second portion 231 can comprise a third surface area 233 comprising a portion of the third major surface 203 and a fourth surface area 235 comprising a portion of the fourth major surface 205 opposite the third surface area 233. In further aspects, as shown, the central portion 241 can comprise a third central surface area 211 positioned between the first surface area 223 and the third surface area 233. In even further aspects, as shown, the third central surface area 211 can extend along a third plane 204c. In even further aspects, as shown, the central portion 241 can comprise a fourth central surface area 213 comprising a portion of the fourth major surface 205 opposite the third central surface area 211 and positioned between the second surface area 225 and the fourth surface area 235. In even further aspects, as shown, a central thickness 217 can be defined between the third central surface area 211 and the fourth central surface area 213, for example as the distance between the third plane 204c and the second plane 204b. In still further aspects, as shown, the central thickness 217 is less than the substrate thickness 227 to provide a recess 219 that can be defined between the first plane 204a and the third central surface area 211. In still further aspects, although not shown, the laminate can comprise the substrate 201 comprising a second recess opposite the recess 219. In still further aspects, the central thickness can be about 0.5% or more, about 1% or more, about 2% or more, about 5% or more, about 13% or less, about 10% or less, or about 5% or less the substrate thickness 227. In aspects, the central thickness 217 as a percentage of the substrate thickness 227 can be in a range from about 0.5% to about 13%, from about 0.5% to about 10%, from about 0.5% to about 5%, from about 1% to about 13%, from about 1% to about 10%, from about 1% to about 5%, from about 2% to about 13%, from about 2% to about 10%, from about 2% to about 5%, from about 5% to about 13%, from about 5% to about 10%, or any range or subrange therebetween. In further aspects, the central thickness 217 can be within one or more of the ranges for the substrate thickness while being less than the substrate thickness. In further aspects, the central thickness 217 can be about 10 μm or more, about 25 μm or more, about 50 μm or more, about 80 μm or more, about 220 μm or less, about 125 μm or less, about 100 μm or less, about 80 μm or less, about 60 μm or less, or about 40 μm or less. In even further aspects, the central thickness 217 can be in a range from about 10 μm to about 220 μm, from about 10 μm to about 125 μm, from about 10 μm to about 100 μm, from about 10 μm to about 80 μm, from about 25 μm to about 80 μm, from about 25 μm to about 60 μm, from about 50 μm to about 60 μm, or any range or subrange therebetween. In further aspects, the central thickness 217 can be greater than about 80 μm, for example, about 80 μm or more, about 100 μm or more, about 125 μm or more, about 220 μm or less, about 175 μm or less, or about 150 μm or less. In even further aspects, the central thickness 217 can be in a range from about 80 μm to about 220 μm, from about 80 μm to about 175 μm, from about 80 μm to about 150 μm, from about 100 μm to about 150 μm, from about 125 μm to about 150 μm, or any range or subrange therebetween. In further aspects, the central thickness 217 can be less than about 80 μm, for example, in a range from about 10 μm to about 80 μm, from about 25 μm to about 60 μm, from about 10 μm to about 50 μm, from about 25 μm to about 50 μm, from about 10 μm to about 40 μm, from about 25 μm to about 40 μm, or any range or subrange therebetween.

In further aspects, as shown in FIGS. 2 and 4, a width 252 of the central portion 241 can be defined as the minimum distance between the first portion 221 and the second portion 231. In aspects, the width 252 of the central portion 241 can be about 1 times or more, about 1.4 times or more, about 1.5 times or more, about 2 times or more, about 3 times or less, about 2.5 times or less, or about 2 times or less the minimum parallel plate distance of the foldable apparatus. In aspects, the width 252 of the central portion 252 as a multiple of the minimum parallel plate distance can be in a range from about 1.4 times to about 3 times, from about 1.5 times to about 2.5 times, from about 1.5 times to about 2 times, from about 2 times to about 2.5 times, or any range or subrange therebetween. Without wishing to be bound by theory, the length of a bent arc portion in a circular configuration between parallel plates can be about 0.8 times the parallel plate distance. In aspects, the width 252 of the central portion 241 can be about 1 mm or more, about 2 mm or more, about 4 mm or more, about 5 mm or more, about 10 mm or more, about 20 mm or more, about 40 mm or more, about 200 mm or less, about 100 mm or less, or about 60 mm or less. In aspects, the width 252 of the central portion 241 can be in a range from about 1 mm to about 200 mm, from about 5 mm to about 200 mm, from about 10 mm to about 175 mm, from about 20 mm to about 150 mm, from about 30 mm to about 125 mm, from about 40 mm to about 100 mm, from about 50 mm to about 90 mm, from about 60 mm to about 80 mm, from about 5 mm to about 60 mm, from about 20 mm to about 60 mm, from about 40 mm to about 60 mm, or any range or subrange therebetween. In aspects, the width 252 of the central portion 241 can be in a range from about 1 mm to about 100 mm, from about 1 mm to about 60 mm, from about 1 mm to about 40 mm, from about 2 mm to about 30 mm, from about 5 mm to about 20 mm, from about 10 mm to about 20 mm, or any range or subrange therebetween. In aspects, the width 252 of the central portion 252 can be in a range from about 1 mm to about 20 mm, from about 2 mm to about 10 mm, from about 2 mm to about 5 mm, or any range or subrange therebetween. In aspects, the width 252 of the central portion 252 can be in a range from about the minimum parallel plate distance to about 200 mm, from about the minimum parallel plate distance to about 100 mm, from about minimum parallel plate distance to about 60 mm, from about the minimum parallel plate distance to about 40 mm, from about the minimum parallel plate distance to about 30 mm, from about minimum parallel plate distance to about 20 mm, a range from about 1.5 times the minimum parallel plate distance to about 200 mm, from about 1.5 times the minimum parallel plate distance to about 100 mm, from about 1.5 times the minimum parallel plate distance to about 60 mm, from about 1.5 times the minimum parallel plate distance to about 40 mm, from about 1.5 times the minimum parallel plate distance to about 30 mm, from about 1.5 times the minimum parallel plate distance to about 30 mm, or any range or subrange therebetween. By providing a width of the central portion within one of the ranges recited in this paragraph, folding of the foldable apparatus without failure can be facilitated.

In aspects, as shown in FIGS. 2 and 4, the central portion 241 may not comprise a transition portion, providing a step transition between the substrate thickness 227 and the central thickness 217. In aspects, although not shown, the central portion can comprise a first transition portion and/or a second transition portion. The first transition portion can attach the first portion to a region of the central portion comprising the central thickness. A thickness of the first transition portion can be defined between the second plane and the third central surface area. A thickness of the second transition portion can be defined between the second plane and the third central surface area. In further aspects, the thickness of the first transition portion and/or the second transition portion can continuously increase from the central thickness to the substrate thickness. In aspects, although not shown, the thickness of the first transition portion can increase at a constant rate from the central thickness to the substrate thickness. In aspects, although not shown, the thickness of the first transition portion and/or the second transition portion may increase more slowly near the central thickness and/or the substrate thickness than in the middle of the first transition portion and/or the second transition portion.

As shown in FIG. 3, the substrate 371 can comprise a third major surface 373 and a fourth major surface 375 opposite the third major surface 373. The third major surface 373 can extend along a first plane (e.g., similar to first plane 204*a* in FIGS. 2 and 4). The substrate 371 can comprise the fourth major surface 375 extending along a second plane (e.g., similar to second plane 204*b* in FIGS. 2 and 4). A substrate thickness 377 can be defined as an average distance between the third major surface 373 and the fourth major surface 375 of the substrate 371. In aspects, the substrate thickness 377 can be within one or more of the ranges discussed above for the substrate thickness 227.

In aspects, the substrate 201 or 371, the first portion 321, and/or second portion 331 may comprise a glass-based substrate and/or ceramic-based substrate where one or more portions of the substrate may comprise a compressive stress region. In aspects, the compressive stress region may be created by chemically strengthening the substrate. Chemically strengthening may comprise an ion exchange process, where ions in a surface layer are replaced by—or exchanged with—larger ions having the same valence or oxidation state. Methods of chemically strengthening will be discussed later. Without wishing to be bound by theory, chemically strengthening the substrate, first portion, and/or second portion can enable small (e.g., smaller than about 10 mm or less) bend radii because the compressive stress from the chemical strengthening can counteract the bend-induced tensile stress on the outermost surface of the substrate. A compressive stress region may extend into a portion of the substrate for a depth called the depth of compression. As used herein, depth of compression means the depth at which the stress in the chemically strengthened substrates described herein changes from compressive stress to tensile stress. Depth of compression may be measured by a surface stress meter or a scattered light polariscope (SCALP, wherein values reported herein were made using SCALP-5 made by Glasstress Co., Estonia) depending on the ion exchange treatment and the thickness of the article being measured. Where the stress in the substrate is generated by exchanging potassium ions into the substrate, a surface stress meter, for example, the FSM-6000 (Orihara Industrial Co., Ltd. (Japan)), is used to measure depth of compression. Unless specified otherwise, compressive stress (including surface CS) is measured by surface stress meter (FSM) using commercially available instruments, for example, the FSM-6000, manufactured by Orihara. Surface stress measurements rely upon the accurate measurement of the stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Where the stress is generated by exchanging sodium ions into the substrate, and the article being measured is thicker than about 75 $\mu$m, SCALP is used to measure the depth of compression and central tension (CT). Where the stress in the substrate is generated by exchanging both potassium and sodium ions into the glass, and the article being measured is thicker than about 75 $\mu$m, the depth of compression and CT are measured by SCALP. Without wishing to be bound by theory, the exchange depth of sodium may indicate the depth of compression while the exchange depth of potassium ions may indicate a change in the magnitude of the compressive stress (but not the change in stress from compressive to tensile). The refracted near-field (RNF; the RNF method is described in U.S. Pat. No. 8,854,623, entitled "Systems and methods for measuring a profile characteristic of a glass sample", which is incorporated herein by reference in its entirety) method also may be used to derive a graphical representation of the stress profile. When the RNF method is utilized to derive a graphical representation of the stress profile, the maximum central tension value provided by SCALP is utilized in the RNF method. The graphical representation of the stress profile derived by RNF is force balanced and calibrated to the maximum central tension value provided by a SCALP measurement. As used herein, "depth of layer" (DOL) means the depth that the ions have exchanged into the substrate (e.g., sodium, potassium). Through the disclosure, when the central tension cannot be measured directly by SCALP (as when the article being measured is thinner than about 75 $\mu$m) the maximum central tension can be approximated by a product of a maximum compressive stress and a depth of compression divided by the difference between the thickness of the substrate and twice the depth of compression, wherein the compressive stress and depth of compression are measured by FSM.

In aspects, the substrate 201 or 371 may be chemically strengthened to form a first compressive stress region extending to a first depth of compression from the third major surface 203 or 373. In further aspects, the first compressive stress region can extend from one or more portions of the third major surface 203 comprising the first surface area 223 and/or the third surface area 233. In aspects, the substrate 201 or 371 may be chemically strengthened to form a second compressive stress region extending to a second depth of compression from the fourth major surface 205 or 375. In further aspects, the second compressive stress region can extend from one or more portions of the fourth major surface 205 comprising the second surface area 225 and/or the fourth surface area 235. In even further aspects, the first depth of compression (e.g., from the third major surface 203 or 373) and/or second depth of compression (e.g., from the fourth major surface 205 or 375) as a percentage of the substrate thickness 227 or 377 can be about 1% or more, about 5% or more, about 10% or more, about 30% or less, about 25% or less, or about 20% or less. In even further aspects, the first depth of compression and/or the second depth of compression as a percentage of the substrate thickness 227 or 377 can be in a range from about 1% to about 30%, from about 1% to about 25%, from about 5% to about 25%, from about 5% to about 20%, from about 10% to about 20%, or any range or subrange therebetween. In aspects, the first depth of compression and/or the second depth of compression can be about 1 μm or more, about 10 μm or more, about 50 μm or more, about 200 μm or less, about 150 μm or less, or about 100 μm or less. In aspects, the first depth of compression and/or the second depth of compression can be in a range from about 1 μm to about 200 μm, from about 1 μm to about 150 μm, from about 10 μm to about 150 μm, from about 50 μm to about 150 μm, from about 50 μm to about 100 μm, or any range or subrange therebetween. In aspects, the first depth of compression can be greater than, less than, or substantially the same as the second depth of compression. By providing a glass-based substrate and/or a ceramic-based substrate comprising a first depth of compression and/or a second depth of compression in a range from about 1% to about 30% of the first thickness, good impact and/or puncture resistance can be enabled.

In aspects, the first compressive stress region can comprise a maximum first compressive stress. In aspects, the second compressive stress region can comprise a maximum second compressive stress. In further aspects, the maximum first compressive stress and/or the maximum second compressive stress can be about 100 MegaPascals (MPa) or more, about 300 MPa or more, about 500 MPa or more, about 700 MPa or more, about 1,500 MPa or less, about 1,200 MPa or less, about 1,000 MPa or less, or about 900 MPa or less. In further aspects, the maximum first compressive stress and/or the maximum second compressive stress can be in a range from about 100 MPa to about 1,500 MPa, from about 100 MPa to about 1,200 MPa, from about 300 MPa to about 1,200 MPa, from about 300 MPa to about 1,000 MPa, from about 500 MPa to about 1,000 MPa, from about 700 MPa to about 1,000 MPa, from about 700 MPa to about 900 MPa, or any range or subrange therebetween. Providing a maximum first compressive stress and/or a maximum second compressive stress in a range from about 100 MPa to about 1,500 MPa can enable good impact and/or puncture resistance.

In aspects, the substrate 201 or 371 may be chemically strengthened to form a first central compressive stress region extending to a first central depth of compression from the third central surface area 211. In aspects, the substrate 201 or 371 may be chemically strengthened to form a second central compressive stress region extending to a second central depth of compression from the fourth central surface area 213. In further aspects, the first central depth of compression and/or the second central depth of compression can be about 1 μm or more, about 10 μm or more, about 30 μm or more, about 50 μm or more, about 200 μm or less, about 150 μm or less, about 100 μm or less, or about 60 μm or less. In further aspects, the first central depth of compression and/or the second central depth of compression can be in a range from about 1 μm to about 200 μm, from about 1 μm to about 150 μm, from about 10 μm to about 150 μm, from about 10 μm to about 100 μm, from about 30 μm to about 100 μm, from about 30 μm to about 60 μm, from about 50 μm to about 60 μm, or any range or subrange therebetween. In further aspects, the first central depth of compression and/or the second central depth of compression as a percentage of the central thickness 217 can be within one or more of the ranges discussed above for the first depth of compression as a percentage of the substrate thickness 227 and/or 377. In further aspects, the first central compressive stress region can comprise a maximum first central compressive stress. In further aspects, the second central compressive stress region can comprise a maximum second central compressive stress. In even further aspects, the maximum first central compressive stress and/or the maximum second central compressive stress can be within one or more of the ranges discussed above for the maximum first compressive stress and/or the maximum second compressive stress.

In aspects, as shown in FIG. 3, the laminate 301 can comprise a first portion 321 and a second portion 331. In further aspects, as shown, the first portion 321 can comprise a first surface area 323 opposite a second surface area 325. In further aspects, as shown, the second portion 331 can comprise a third surface area 333 opposite a fourth surface area 335. In further aspects, as shown, the first surface area 323 and/or the third surface area 333 can extend along a third plane, and/or the second surface area 325 and/or the fourth surface area 335 can extend along a fourth plane. In even further aspects, a portion thickness 327 can be defined between the third plane and the fourth plane and can be within one or more of the ranges discussed above for the substrate thickness 227.

In further aspects, as shown in FIG. 3, the first portion 321 can comprise a first edge surface area 329 extending between the first surface area 323 and the second surface area 325, and/or the second portion 331 can comprise a second edge surface area 339 extending between the third surface area 333 and the fourth surface area 335. In even further aspects, as shown in FIG. 3, the first edge surface area 329 and/or the second edge surface area 339 can comprise a first outwardly convex curved edge surface and/or a second outwardly convex curved edge surface, respectively. In still further aspects, the first edge surface area 329 and/or the second edge surface area 339 can comprise a cross-sectional profile taken perpendicular to the edge surface that is the shape of an arc of a circle, although other shapes, for example, ellipses, are possible. In yet further aspects, the first outwardly convex curved edge surface and/or the second outwardly convex curved edge surface can be characterized by a first radius of curvature 309 and/or a second radius of curvature 337, respectively. In still yet further aspects, the first radius of curvature 309 and/or the second radius of curvature 337 as a percentage of the portion thickness 327 can be about 30% or more, about 40% or more, about 45% or more, about 49% or more, about 70% or less, about 60% or less, about 55% or less, or about 51% or less. In even further aspects, the first radius of curvature 309 and/or the second radius of curvature 337 as a percentage of the portion thickness 327 can in a range from about 30% to about 70%, from about 30% to about 60%, from about 30% to about 55%, from about 30% to about 51%, from about 40% to about 70%, from about 40% to about 60%, from about 40% to about 55%, from about 40% to about 51%, from about 45% to about 70%, from about 45% to about 60%, from about 45% to about 55%, from about 45% to about 51%, from about 49% to about 70%, from about 49% to about 60%, from about 49% to about 55%, from about 49% to about 51%, or any range or subrange therebetween. In further aspects, although not shown, the first edge surface area and/or the second edge surface area can comprise linear (e.g., planar) edge surfaces, namely, a first linear edge surface and/or a second linear edge surface, respectively.

In further aspects, as shown in FIG. 3, a minimum distance 343 between the first portion 321 and the second portion 331 can be defined as the minimum distance between an outer peripheral portion 345 of the first edge surface area 329 of the first portion 321 and an outer peripheral portion 347 of the second edge surface area 339 of the second portion 331 when the laminate 301 is in the flat configuration shown in FIG. 3. In aspects, the minimum distance 343 between the first portion 221 and the second portion 231 can be about 1 times or more, about 1.4 times or more, about 1.5 times or more, about 2 times or more, about 3 times or less, about 2.5 times or less, or about 2 times or less the minimum parallel plate distance of the foldable apparatus. In aspects, the minimum distance 343 as a multiple of the minimum parallel plate distance can be in a range from about 1.4 times to about 3 times, from about 1.4 times to about 2.5 times, from about 1.4 times to about 2 times, from about 1.5 times to about 3 times, from about 1.5 times to about 2.5 times, from about 1.5 times to about 2 times, from about 2 times to about 3 times, from about 2 times to about 2.55 times, or any range or subrange therebetween. Without wishing to be bound by theory, the length of a bent arc portion in a circular configuration between parallel plates can be about 0.8 times the parallel plate distance. In aspects, the minimum distance 343 can be about 1 mm or more, about 2 mm or more, about 4 mm or more, about 5 mm or more, about 10 mm or more, about 20 mm or more, about 40 mm or more, about 200 mm or less, about 100 mm or less, or about 60 mm or less. In aspects, the minimum distance 343 can be in a range from about 1 mm to about 200 mm, from about 5 mm to about 200 mm, from about 10 mm to about 175 mm, from about 20 mm to about 150 mm, from about 30 mm to about 125 mm, from about 40 mm to about 100 mm, from about 50 mm to about 90 mm, from about 60 mm to about 80 mm, from about 5 mm to about 60 mm, from about 10 mm to about 60 mm, from about 20 mm to about 60 mm, from about 40 mm to about 60 mm, or any range or subrange therebetween. In aspects, the minimum distance 343 can be in a range from about 1 mm to about 100 mm, from about 1 mm to about 60 mm, from about 1 mm to about 40 mm, from about 1 mm to about 30 mm, from about 2 mm to about 30 mm, from about 2 mm to about 20 mm, from about 5 mm to about 20 mm, from about 10 mm to about 20 mm, or any range or subrange therebetween. In aspects, the minimum distance 343 can be in a range from about 1 mm to about 20 mm, from about 1 mm to about 10 mm, from about 2 mm to about 10 mm, from about 2 mm to about 5 mm, or any range or subrange therebetween. In aspects, the minimum distance 343 can be in a range from about the minimum parallel plate distance to about 200 mm, from about the minimum parallel plate distance to about 100 mm, from about minimum parallel plate distance to about 60 mm, from about the minimum parallel plate distance to about 40 mm, from about the minimum parallel plate distance to about 30 mm, from about minimum parallel plate distance to about 20 mm, a range from about 1.5 times the minimum parallel plate distance to about 200 mm, from about 1.5 times the minimum parallel plate distance to about 100 mm, from about 1.5 times the minimum parallel plate distance to about 60 mm, from about 1.5 times the minimum parallel plate distance to about 40 mm, from about 1.5 times the minimum parallel plate distance to about 30 mm, from about 1.5 times the minimum parallel plate distance to about 30 mm, or any range or subrange therebetween. By providing a minimum distance between the first portion and the second portion, folding of the foldable apparatus without failure can be facilitated.

In further aspects, the first portion 321 and/or the second portion 331 can comprise a polymer-based portion comprising a Young's modulus of about 3 GigaPascals (GPa) or more. Exemplary aspects of materials for a polymer-based first portion and/or polymer-based second portion include but are not limited to blends, nanoparticle, and/or fiber composites of one or more of styrene-based polymers (e.g., polystyrene (PS), styrene acrylonitrile (SAN), styrene maleic anhydride (SMA)), phenylene-based polymer (e.g., polyphenylene sulfide (PPS)), polyvinylchloride (PVC), polysulfone (PSU), polyphthalmide (PPA), polyoxymethylene (POM), polylactide (PLA), polyimides (PI), polyhydroxybutyrate (PHB), polyglycolides (PGA), polyethyleneterephthalate (PET), and/or polycarbonate (PC).

In further aspects, the first portion 321 and/or the second portion 331 can comprise a glass-based substrate or a ceramic-based substrate. In even further aspects, the first portion 321 can be chemically strengthened to form a fifth compressive stress region extending to a fifth depth of compression from the first surface area 323, the second surface area 325, and/or the first edge surface area 329. In even further aspects, the second portion 331 can be chemically strengthened to form a sixth compressive stress region extending to a sixth depth of compression from the third surface area 333, the fourth surface area 335, and/or the second edge surface area 339. In still further aspects, the fifth depth of compression and/or sixth depth of compression can be within one or more of the ranges discussed above for the first depth of compression. In still further aspects, the fifth depth of compression and/or sixth depth of compression as a percentage of the portion thickness 327 can be within one or more of the ranges discussed above for the first depth of compression as a percentage of the substrate thickness. In still further aspects, the fifth compressive stress can comprise a maximum fifth compressive stress, and/or the sixth compressive stress region can comprise a maximum sixth compressive stress. In yet further aspects, the maximum fifth compressive stress and/or the maximum sixth compressive stress can be within one or more of the ranges discussed above for the maximum first compressive stress.

In aspects, as shown in FIGS. 2 and 4, the laminate 101 can comprise a release liner 271 although other substrates (e.g., a glass-based substrate and/or a ceramic-based substrate discussed throughout the application) may be used in further aspects rather than the illustrated release liner 271. In aspects, as shown in FIG. 3, the laminate 301 can comprise a display device 307 comprising a sixth major surface 303 and a seventh major surface 305 opposite the sixth major surface 303. In aspects, as shown in FIG. 3, the laminate 301 can comprise an additional substrate 381 comprising an additional thickness 387 defined between a fifth major surface 383 and a sixth major surface 385 opposite the fifth major surface 383. In further aspects, the additional substrate 381 can be similar to, identical to, or within the corresponding ranges for substrate 201 and/or 371 discussed above. It is to be understood that any of the foldable apparatus of the disclosure can comprise an additional substrate 381 (e.g., a glass-based substrate and/or a ceramic-based substrate), a release liner 271, and/or a display device 307.

In aspects, as shown in FIGS. 2-3, the laminate 101 and/or 301 can comprise an adhesive layer 261. In further aspects, the adhesive layer 261 can comprise the layer 907 of the film 901 comprising an adhesive, as shown in FIG. 9. With reference to the laminates of the disclosure, "layer" and "film" are used interchangeably to the extent that a film described above (see FIGS. 9-10) without a release liner, if present, could be used as the layer. In even further aspects, the adhesive layer 261 can comprise the tri-block copolymer with the first block grafted with a first functional group discussed above. In further aspects, the adhesive layer 261 can comprise a shear strength, refractive index, transmittance, haze, color difference, CIE L* value, absolute difference in CIE L* value, CIE a* value, absolute difference in CIE a* value, CIE b* value, and/or absolute difference in CIE b* value within one or more of the corresponding range under one or more of the conditions discussed above for the layer (e.g., film). In further aspects, the adhesive layer can be optically transparent and/or comprise an optically clear adhesive (OCA). In further aspects, as shown in FIGS. 2-3, the adhesive layer 261 can comprise an adhesive thickness 267 defined as the minimum distance between a first major surface 263 of the adhesive layer 261 and a second major surface 265 of the adhesive layer 261 opposite the first major surface 263 that can be within one or more of the ranges discussed above for the film thickness 919.

In aspects, the adhesive layer 261 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and polyether ether ketone (PEEK). Example aspects of polyolefins include low molecular weight polyethylene (LDPE), high molecular weight polyethylene (HDPE), ultrahigh molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene). In further aspects, the adhesive layer 261 can comprise an optically clear adhesive. In even further aspects, the optically clear adhesive can comprise one or more optically transparent polymers: an acrylic (e.g., polymethylmethacrylate (PMMA)), an epoxy, silicone, and/or a polyurethane. Examples of epoxies include bisphenol-based epoxy resins, novolac-based epoxies, cycloaliphatic-based epoxies, and glycidylamine-based epoxies. In even further aspects, the optically clear adhesive can comprise, but is not limited to, acrylic adhesives, for example, 3M 8212 adhesive, or an optically transparent liquid adhesive, for example, a LOCTITE optically transparent liquid adhesive. Exemplary aspects of optically clear adhesives comprise transparent acrylics, epoxies, silicones, and polyurethanes. For example, the optically transparent liquid adhesive could comprise one or more of LOCTITE AD 8650, LOCTITE AA 3922, LOCTITE EA E-05MR, LOCTITE UK U-09LV, which are all available from Henkel.

In aspects, as shown in FIG. 2, the second major surface 265 of the adhesive layer 261 (e.g., layer 907 of film 901) can be disposed over and face the substrate 201 (e.g., the third major surface 203 of substrate 201). In further aspects, as shown, the adhesive layer 261 can be attached (e.g., bonded, contact) to the substrate 201 by the second major surface 265 of the adhesive layer 261 (e.g., layer 907 of film 901) being attached to the third major surface 203 of the substrate 201. In aspects, as shown in FIG. 3, the first major surface 263 of the adhesive layer 261 (e.g., layer 907 of film 901) can be disposed over and face the substrate 371 (e.g., the fourth major surface 375 of the substrate 371). In further aspects, as shown, the adhesive layer 261 can be attached (e.g., bonded, contact) to the substrate 371 by the first major surface 263 of the adhesive layer 261 (e.g., layer 907 of film 901) being attached to the fourth major surface 375 of the substrate 371. In aspects, as shown in FIG. 3, the second major surface 265 of the adhesive layer 261 can face the first surface area 323 of the first portion 321 and/or the third surface area 333 of the second portion 331, further aspects, as shown, the adhesive layer 261 can be attached (e.g., bonded, contact) to the first portion 321 and/or the second portion 331 by the second major surface 265 of the adhesive layer 261 (e.g., layer 907 of film 901) being attached to the first surface area 323 of the first portion 321 and/or the third surface area 333 of the second portion 331, respectively.

In aspects, as shown in FIGS. 2-4, the laminate 101, 301, and/or 401 can comprise a polymer-based portion 251. In further aspects, the polymer-based portion 251 can comprise the layer 1007 of the film 1001 comprising a polymer-based portion, as shown in FIG. 10. In even further aspects, the polymer-based portion 251 can comprise the tri-block copolymer with the first block grafted with a first functional group discussed above. In further aspects, the polymer-based portion 251 can comprise a shear strength, refractive index, transmittance, haze, color difference, CIE L* value, absolute difference in CIE L* value, CIE a* value, absolute difference in CIE a* value, CIE b* value, and/or absolute difference in CIE b* value within one or more of the corresponding range under one or more of the conditions discussed above for the layer (e.g., film). In further aspects, as shown in FIG. 2, the polymer-based portion 251 can comprise a thickness 259 defined as the minimum distance between a first major surface 255 of the polymer-based portion 251 and a second major surface 257 of the polymer-based portion 251 opposite the first major surface 255 (e.g., in the direction 202 of the substrate thickness 227) that can be within one or more of the ranges discussed above for the film thickness 1019. In even further aspects, as shown in FIGS. 2 and 4, the thickness 259 can correspond to the minimum distance between the third central surface area 211 and the first plane 204a. In further aspects, as shown in FIG. 4, the polymer-based portion can comprise a minimum thickness 419 between the first plane 204a and a second major surface 257 (e.g., in the direction 202 of the substrate thickness 227) that can be within one or more of the ranges discussed above for the film thickness 1019. In further aspects, as shown in FIG. 4, the polymer-based portion 251 can comprise a polymer thickness 417 corresponding to an average thickness of the polymer-based portion 251 between the first major surface 255 of the polymer-based portion 251 and a second major surface 257 (e.g., in the direction 202 of the substrate thickness 227) averaged over the third central surface area 211. In even further aspects, as shown, the polymer thickness 417 can be substantially equal to a maximum distance between the first major surface 255 and the second major surface 257 in the direction 202 of the substrate thickness 227. In even further aspects, the polymer thickness 417 can be in a range from about 50 μm to about 300 μm, from about 75 μm to about 200 μm, from about 100 μm to about 150 μm, or any range or subrange therebetween.

In further aspects, the thickness 259 and/or polymer thickness 417 of the polymer-based portion 251 can be a whole-number multiple of the film thickness 1019 corresponding to a plurality of films being stacked to form the polymer-based portion 251.

In aspects, as shown in FIG. 4, the polymer-based portion 251 can comprise a second portion 257*b* of the polymer-based portion 251 positioned in the recess 219 and contacting the first major surface 256*b* of a different film (e.g., film 1001, another film). For example, the second portion 257*b* can comprise the film (e.g., film 1001), and the first portion 257*a* can comprise another film, where the film (e.g., film 1001) of the second portion 257*b* can comprise the same block copolymer with the first functional group grafted on the first block as the film (e.g., film 1001) as the first portion 257*a*, or vice versa. In further aspects, as shown, the second portion 257*b* can comprise a fifth major surface 258*a* corresponding to a first major surface 255 of the polymer-based portion 251 contacting the third central surface area 211 and opposite a sixth major surface 258*b*. In further aspects, as shown, the first portion 257*a* can comprise a film comprising a first major surface 256*a* corresponding to the second major surface 257 of the polymer-based portion 251 and opposite a second major surface 256*b*, where the second major surface 256*b* can contact the sixth major surface 258*b*. In aspects, the polymer-based portion 251 can present as a monolithic structure. In aspects, as shown, the second major surface 256*b* of the first portion 257*a* can contact the fourth major surface 205.

In aspects, the polymer-based portion 251 comprises a polymer (e.g., optically transparent polymer). In further aspects, the polymer-based portion 251 can comprise one or more of an optically transparent: an acrylic (e.g., polymethylmethacrylate (PMMA)), an epoxy, silicone, and/or a polyurethane. Examples of epoxies include bisphenol-based epoxy resins, novolac-based epoxies, cycloaliphatic-based epoxies, and glycidylamine-based epoxies. In further aspects, the polymer-based portion 251 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and/or polyether ether ketone (PEEK). Example aspects of polyolefins include low molecular weight polyethylene (LDPE), high molecular weight polyethylene (HDPE), ultrahigh molecular weight polyethylene (UHMWPE), and polypropylene (PP). Example aspects of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example aspects of elastomers include rubbers (e.g., polybutadiene, polyisoprene, chloroprene rubber, butyl rubber, nitrile rubber), polyurethanes, and block copolymers (e.g., styrene-butadiene, high-impact polystyrene, polydichlorophosphazene) comprising one or more of polystyrene, polydichlorophosphazene, and/or poly(5-ethylidene-2-norbornene). In aspects, the polymer-based portion 251 can further comprise nanoparticles, for example, carbon black, carbon nanotubes, silica nanoparticles, or nanoparticles comprising a polymer. In aspects, the polymer-based portion can further comprise fibers to form a polymer-fiber composite.

In aspects, as shown in FIGS. 2 and 4, the first major surface 255 of polymer-based portion 251 (e.g., layer 1007 of film 1001) can face the third central surface area 211 of the substrate 201. In further aspects, as shown, the polymer-based portion 251 can be attached (e.g., bonded, contact) to the substrate 201 by the first major surface 255 of the polymer-based portion 251 (e.g., layer 1007 of film 1001) being attached to the third central surface area 211 of the substrate 201. In aspects, as shown in FIG. 2, the first major surface 255 of the polymer-based portion 251 can face and/or be attached to the second major surface 265 of the adhesive layer 261. In aspects, as shown in FIG. 3, the second major surface 257 of the polymer-based portion 251 can face the fourth major surface 375 of the substrate 371. In further aspects, as shown, the second major surface 257 of the polymer-based portion 251 can face and/or be attached to the second major surface 265 of the adhesive layer 261. In aspects, as shown in FIG. 3, polymer-based portion 251 can be attached (e.g., bonded, contact) to the first portion 321 and/or the second portion 331.

In aspects, as shown in FIG. 3, the laminate 301 can comprise a second adhesive layer 391 and/or a third adhesive layer 361. In further aspects, the second adhesive layer 391 can comprise a second thickness 397 defined as a minimum distance between a sixth major surface 393 of the second adhesive layer 391 and a seventh major surface 395 of the second adhesive layer 391 opposite the sixth major surface 393. In even further aspects, the second thickness 397 can be within one or more of the ranges discussed above for the film thickness 919. In even further aspects, as shown, the sixth major surface 393 of the second adhesive layer 391 can face and/or be attached to the first major surface 255 of the polymer-based portion 251. In even further aspects, as shown, the sixth major surface 393 of the second adhesive layer 391 can face and/or be attached to the second surface area 325 of the first portion 321 and/or the fourth surface area 335 of the second portion 331. In even further aspects, as shown, the seventh major surface 395 of the second adhesive layer 391 can face and/or be attached to the fifth major surface 383 of the additional substrate 381. In further aspects, the third adhesive layer 361 can comprise a third thickness 367 defined as a minimum distance between a sixth major surface 363 of the third adhesive layer 361 and a seventh major surface 365 of the third adhesive layer 361 opposite the sixth major surface 363. In even further aspects, the third thickness 367 can be within one or more of the ranges discussed above for the film thickness 919. In even further aspects, as shown, the seventh major surface 365 of the third adhesive layer 361 can face and/or be attached to the third major surface 373 of the substrate 371. In even further aspects, as shown, the sixth major surface 363 of the third adhesive layer 361 can face and/or be attached to the seventh major surface 305 of the display device 307.

In further aspects, as shown in FIG. 3, the adhesive layer 261 can occupy a central region 317 defined by dashed portions 319*a*-*c* and the fourth major surface 375 of the substrate 371. Although not shown, the polymer-based portion 251 can occupy the central region 317 defined by dashed portion 319*a*-*c* and the fourth major surface 375 of the substrate 371 such that the second major surface 257 of the polymer-based portion 251 can face and/or be attached to the fourth major surface 375 of the substrate 371. In further aspects, the second adhesive layer 391 can occupy a central region 315 defined by dashed portions 313*a*-*c* and the fifth major surface 383 of the additional substrate 381. In further aspects, although not shown, the polymer-based portion 251 can occupy a central region 315 defined by dashed portion 313*a*-*c* and the fifth major surface 383 of the additional substrate 381 such that the second major surface

257 of the polymer-based portion 251 can face and/or be attached to the fifth major surface 383 of the additional substrate 381.

In aspects, although not shown, a laminate similar to laminate 101 can comprise the adhesive layer 261 within the recess 219 instead of the polymer-based portion 251, which can be in the location of the polymer-based portion 251 shown in FIG. 2 in addition to the region shown for the adhesive layer 261. In aspects, as shown in FIG. 4, the laminate 401 can be similar to laminate 101 but comprise the polymer-based portion 251 occupying the space (e.g., completely filling the space) of the adhesive layer 261 of FIG. 2 between the third major surface 203 and the sixth major surface 275 of the release liner 271. In aspects, although not shown, the laminate 101 shown in FIG. 2 can comprise a display device 307 instead of the release liner 271 shown. In aspects, although not shown, a laminate similar to laminate 301 can comprise the polymer-based portion 251, which can be in the location of the adhesive layer 261 and/or the second adhesive layer 391 shown in FIG. 3 in addition to the region shown for the polymer-based portion 251.

In aspects, although not explicitly shown, the laminate can comprise a silane coupling agent attaching the second major surface of the adhesive layer (e.g., film) to the third major surface of the substrate. For example, with reference to FIG. 2, a silane coupling agent can be positioned at an interface between the first major surface 255 of the polymer-based portion 251 and the third central surface area 211 of the substrate 201, and/or a silane coupling agent can be positioned at an interface between the second major surface 265 of the adhesive layer 261 and the third major surface 203 of the substrate 201. In aspects, although not explicitly shown, the laminate can comprise a silane coupling agent attaching a surface of the polymer-based portion (e.g., film) to a substrate (e.g., substrate 201, substrate 371, first portion 321, second portion 331). For example, with reference to FIG. 3, a silane coupling agent can be positioned at an interface between the polymer-based portion 251 and the first portion 321 and/or the second portion 331. In further aspects, the silane coupling agent can comprise one or more of the silane coupling agents discussed above with reference to the film. In even further aspects, the silane coupling agent can comprise an amine-functionalized silane coupling agent.

The substrate 201 or 371 can comprise a second index of refraction. In aspects, an index of refraction of the substrate 201 or 371 may be about 1.4 or more, about 1.45 or more, about 1.49 or more, about 1.50 or more, about 1.53 or more, about 1.6 or less, about 1.55 or less, about 1.54 or less, or about 1.52 or less. In aspects, the index of refraction of the substrate 201 or 371 can be in a range from about 1.4 to about 1.6, from about 1.45 to about 1.6, from about 1.45 to about 1.55, from about 1.49 to about 1.55, from about 1.50 to about 1.55, from about 1.53 to about 1.55, from about 1.49 to about 1.54, from about 1.49 to about 1.52, or any range or subrange therebetween. Throughout the disclosure, a magnitude of a difference between two values or an absolute difference between two values is the absolute value of the difference between the two values. In aspects, an absolute difference between the first refractive index of the layer (e.g., adhesive layer 261, polymer-based portion 251, layer 907 and/or 1007, and/or film 901 and/or 1001) and the second refractive index of the substrate 201 or 371 can be about 0.01 or less, about 0.008 about 0.005 or less, about 0.004 or less, about 0.001 or more, about 0.002 or more, or about 0.003. In aspects, an absolute difference between the first refractive index of the layer (e.g., adhesive layer 261, polymer-based portion 251, layer 907 and/or 1007, and/or film 901 and/or 1001) and the second refractive index of the substrate 201 or 371 can be in a range from about 0.001 to about 0.01, from about 0.001 to about 0.008, from about 0.002 to about 0.008, from about 0.002 to about 0.005, from about 0.003 to about 0.005, from about 0.003 to about 0.004, or any range or subrange therebetween. In aspects, the first surface refractive index can be greater than the central refractive index. In further aspects, the difference between the first refractive index of the layer (e.g., adhesive layer 261, polymer-based portion 251, layer 907 and/or 1007, and/or film 901 and/or 1001) and the second refractive index of the substrate 201 or 371 can be measured at 589 nm and can be within one or more of the above ranges. In further aspects, the first refractive index of the layer (e.g., adhesive layer 261, polymer-based portion 251, layer 907 and/or 1007, and/or film 901 and/or 1001) and the second refractive index of the substrate 201 or 371 can be averaged over optical wavelengths from 400 nm to 700 nm (analogous to transmittance) and can be within or more of the above ranges.

Throughout the disclosure, with reference to FIG. 1, the width 103 of the laminate 101, 301, and/or 401 is considered the dimension of the laminate taken between opposed edges of the laminate in a direction 104 of a fold axis 102 of the laminate, wherein the direction 104 also comprises the direction of the width 103. Furthermore, throughout the disclosure, the length 105 of the laminate 101, 301, and/or 401 is considered the dimension of the laminate 101, 301, and/or 401 taken between opposed edges of the laminate in a direction 106 perpendicular to the fold axis 102 of the laminate. In aspects, as shown in FIGS. 1-2, the laminate of any aspects of the disclosure can comprise a fold plane 109 that includes the fold axis 102 and the direction 202 of the substrate thickness 227 when the laminate is in the flat configuration (e.g., see FIG. 1). The fold plane 109, in some aspects, may comprise a central axis 107 of the laminate, which can be positioned at the fourth major surface 205 as shown in FIG. 2. In aspects, the laminate can be folded in a direction 111 (e.g., see FIG. 1) about the fold axis 102 extending in the direction 104 of the width 103 to form a folded configuration (e.g., see FIGS. 6-8). As shown, the laminate may include a single fold axis to allow the laminate to comprise a bifold wherein, for example, the laminate may be folded in half. In further aspects, the laminate may include two or more fold axes. For example, providing two fold axes can allow the laminate to comprise a trifold.

FIGS. 6-8 schematically illustrate example aspects of the laminate 601 and/or 801 in accordance with aspects of the disclosure in the folded configuration. Although not shown, the laminate can be folded such that the substrate (e.g., substrate 201, additional substrate 381) is on the outside of the folded laminate. A user would view a device containing the laminate through the substrate (e.g., substrate 201, additional substrate 381) and, thus, would be viewing from the side of the fourth major surface 205 of the substrate 201 and/or the sixth major surface 385 of the additional substrate 381. Alternatively, as shown in FIG. 7, the laminate 601 can be folded such that the substrate 201 is on the inside of the folded laminate. A user would view a device containing the laminate 601 through the substrate 201 and, thus, would be viewing from the side of the fourth major surface 205 of the substrate 201.

As used herein, "foldable" includes complete folding, partial folding, bending, flexing, or multiple capabilities. As used herein, the terms "fail," "failure" and the like refer to breakage, destruction, delamination, or crack propagation. A substrate (e.g., substrate, laminate, film) achieves a parallel plate distance of "X" or has a parallel plate distance of "X" if it resists failure when the substrate is held at a parallel plate distance of "X" for 24 hours at about 60° C. and about 90% relative humidity.

Figure 5:
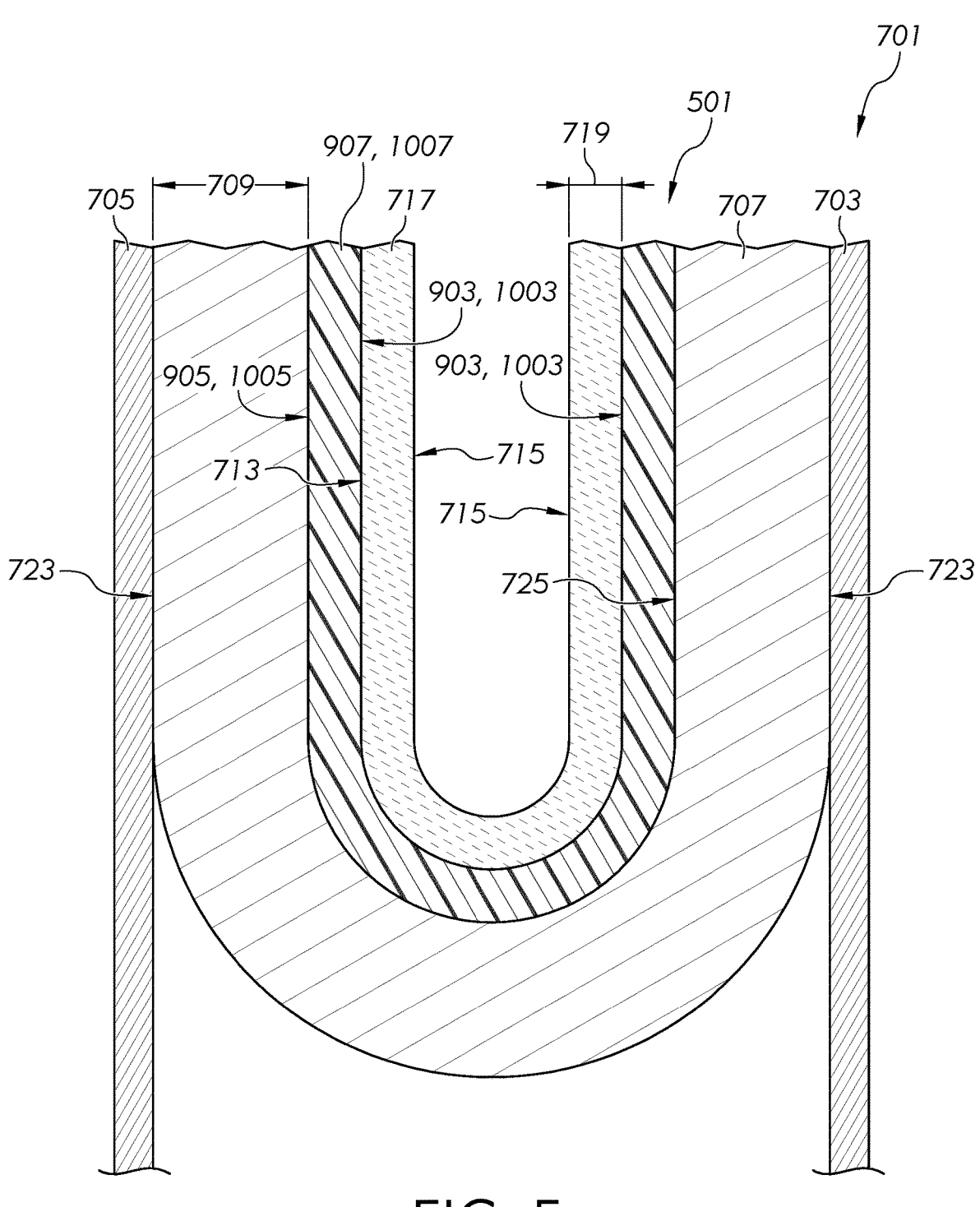
FIG. 5 is a cross-sectional view of a test apparatus for determining a parallel plate distance in accordance with aspects of the disclosure.

As used herein, the "parallel plate distance" of a laminate is measured with the following test configuration and process using a parallel plate apparatus 701 (see FIGS. 7-8) that comprises a pair of parallel rigid stainless-steel plates 703 and 705 comprising a first rigid stainless-steel plate 703 and a second rigid stainless-steel plate 705. When measuring the "parallel plate distance" for the laminate 101, as shown in FIG. 7, the laminate 101 of FIG. 2 is modified to form laminate 601 by replacing the material beyond the first major surface 263 of the adhesive layer 261, namely, replacing the release liner 271, with the sheet of poly(ethylene terephthalate) 707 comprising a thickness 709 of 100 µm (see FIG. 5). When measuring the "parallel plate distance" for the laminate 301, as shown in FIG. 8, the laminate 301 is modified to form laminate 801 by replacing the material beyond the first major surface 263 of the adhesive layer 261, namely replacing the substrate 371, the third adhesive layer 361, and the display device 307, with the sheet of poly (ethylene terephthalate) 707 comprising the thickness 709 of 100 µm (see FIG. 5). As shown in FIGS. 7-8, the modified laminate 601 and/or 801 is placed between the pair of parallel rigid stainless-steel plates 703 and 705. As shown in FIG. 7, the laminate 601 is placed between the pair of parallel rigid stainless-steel plates 703 and 705 such that the fourth major surface 205 of the substrate 201 is on the inside of the bend (e.g., facing one another) while the 100 µm thick sheet of poly(ethylene terephthalate) 707 faces and/or contacts the pair of parallel rigid stainless-steel plates 703 and 705. As shown in FIG. 8, the laminate 801 is placed between the pair of parallel rigid stainless-steel plates 703 and 705 such that the additional substrate 381 is on the inside of the bend (e.g., facing itself) while the 100 µm thick sheet of poly(ethylene terephthalate) 707 faces and/or contacts the pair of parallel rigid stainless-steel plates 703 and 705. The distance between the parallel plates is reduced at a rate of 50 µm/second until the parallel plate distance 711 is equal to the "parallel plate distance" to be tested. Then, the parallel plates are held at the parallel plate distance to be tested for 24 hours at about 60° C. and about 90% relative humidity. As used herein, the "minimum parallel plate distance" is the smallest parallel plate distance that the substrate (e.g., substrate, laminate, coating) can withstand without failure under the conditions and configuration described above.

For the films 901 and/or 1001 shown in FIGS. 9-10, the parallel plate distance is measured by substituting the adhesive layer 261 with one of the films 901, 1001 to be tested to form the modified laminate 501. The parallel plate distance is measured with a first major surface 903, 1003 of the film 901, 1001 attached to a third major surface 713 of a glass-based substrate 717 and a second major surface 905, 1005 of the film 901, 1001 attached to a sixth major surface 725 of a sheet of poly(ethylene terephthalate) 707 that is formed into a laminate by hot pressing at 180° C. for 1 hour. The glass-based substrate 717 comprises a thickness 719 of 30 µm defined as an average thickness between the third major surface 713 and a fourth major surface 715 opposite the third major surface 713. The sheet of poly(ethylene terephthalate) 707 comprises a thickness of 100 µm defined as an average thickness of the sixth major surface 725 and a fifth major surface 723 opposite the sixth major surface 725. For determining a parallel plate distance for a film (e.g., films 901 and/or 1001), the 30 µm thick glass-based substrate comprises a composition, nominally, in mol % of: 69.1

$SiO_2$; 10.2 $Al_2O_3$; 15.1 $Na_2O$; 0.01 $K_2O$; 5.5 MgO; 0.09 $SnO_2$. The laminate formed from the film is then configured in a parallel plate apparatus 701 with the 100 µm thick sheet of poly(ethylene terephthalate) 707 contacting a pair of parallel rigid stainless-steel plates 703 and 705.

For laminates 101, 301, and/or 401 shown in FIGS. 2-4, the parallel plate distance is measured by substituting the material beyond the layer contacting the third major surface 203 (FIGS. 2 and 4) or the first surface area 323 (FIG. 3) with the sheet of poly(ethylene terephthalate) 707 comprising the thickness 709 of 100 µm. For example, with reference to FIG. 2, the release liner 271 is removed and replaced with the sheet of poly(ethylene terephthalate) 707 comprising the thickness 709 of 100 µm since the release liner is beyond the adhesive layer 261 that is the material contacting the third major surface 203. For example, with reference to FIG. 3, the display device 307, third adhesive layer 361, and the substrate 371 are removed and replaced with the sheet of poly(ethylene terephthalate) 707 comprising the thickness 709 of 100 µm since these materials are beyond the adhesive layer 261 that is the material contacting the first surface area 223. The laminate modified as described in this paragraph is then configured in a parallel plate apparatus 701 with the sheet of poly(ethylene terephthalate) 707 contacting a pair of parallel rigid stainless-steel plates 703 and 705. For example, the modified laminate 601 shown in FIG. 6 corresponds to the laminate 101 shown in FIG. 2, and the modified laminate 801 corresponds to the laminate 301 shown in FIG. 3.

In aspects, the laminate with the film 901, 1001 can achieve a parallel plate distance of 100 mm or less, 50 mm or less, 20 mm or less, or 10 mm or less. In further aspects, the laminate can achieve a parallel plate distance of 10 millimeters (mm), or 7 mm, or 5 mm, 4 mm, 3 mm, 2 mm, or 1 mm. In aspects, the laminate with the film can comprise a parallel plate distance of about 10 mm or less, about 7 mm or less, about 5 mm or less, about 4 mm or less, about 1 mm or more, about 2 mm or more, or about 3 mm or more. In aspects, the laminate with the film can comprise a parallel plate distance in a range from about 1 mm to about 10 mm, from about 2 mm to about 10 mm, from about 13 mm to about 10 mm, from about 3 mm to about 7 mm, from about 3 mm to about 5 mm, from about 3 mm to about 4 mm, or any range or subrange therebetween.

In aspects, the laminate can withstand a cyclic bending test. As used herein, the cyclic bending test comprises placing a testing apparatus comprising the material to be tested in the parallel plate apparatus 701 (see FIGS. 5 and 7-8) and bending the laminate comprising the laminate, as described above for the parallel plate test, to achieve a predetermined parallel plate distance, between plates 703, 705 a predetermined number of times at 23° C. with a relative humidity of 50%. The testing apparatus comprises attaching the adhesive layer 261 of the laminate to be tested to a poly(ethylene terephthalate) sheet 707 comprising the thickness 709 of 100 µm as discussed above for the parallel plate distance, where the sheet 707 faces the pair of rigid stainless-steel plates 703, 705. In aspects, the laminate can withstand 2,000 bending cycles at a parallel plate distance of 3 millimeters. In further aspects, the laminate can withstand 20,000 bending cycles at a parallel plate distance of 3 millimeters. In even further aspects, the laminate can withstand 200,000 bending cycles at a parallel plate distance of 3 millimeters. In aspects, the laminate can withstand 2,000 bending cycles at a parallel plate distance of 4 millimeters. In further aspects, the laminate can withstand 20,000 bending cycles at a parallel plate distance of 4 millimeters. In even further aspects, the laminate can withstand 200,000 bending cycles at a parallel plate distance of 4 millimeters.

The laminate may have an impact resistance defined by the capability of the laminate to avoid failure at a pen drop height (e.g., 5 centimeters (cm) or more, 8 cm or more, 10 cm or more, 12 cm or more, 15 cm or more), when measured according to the "Pen Drop Test." As used herein, the "Pen Drop Test" is conducted such that samples are tested with the load (i.e., from a pen dropped from a certain height) imparted to an outer surface (e.g., fourth major surface 205 of the substrate 201 shown in FIGS. 2 and 4, sixth major surface 385 of the additional substrate 381 shown in FIG. 3) of the film and/or laminate configured as in the parallel plate test. During testing, the laminate is placed on an aluminum plate (6063 aluminum alloy, as polished to a surface roughness with 400 grit paper). No tape is used on the side of the sample resting on the aluminum plate.

Figure 26:
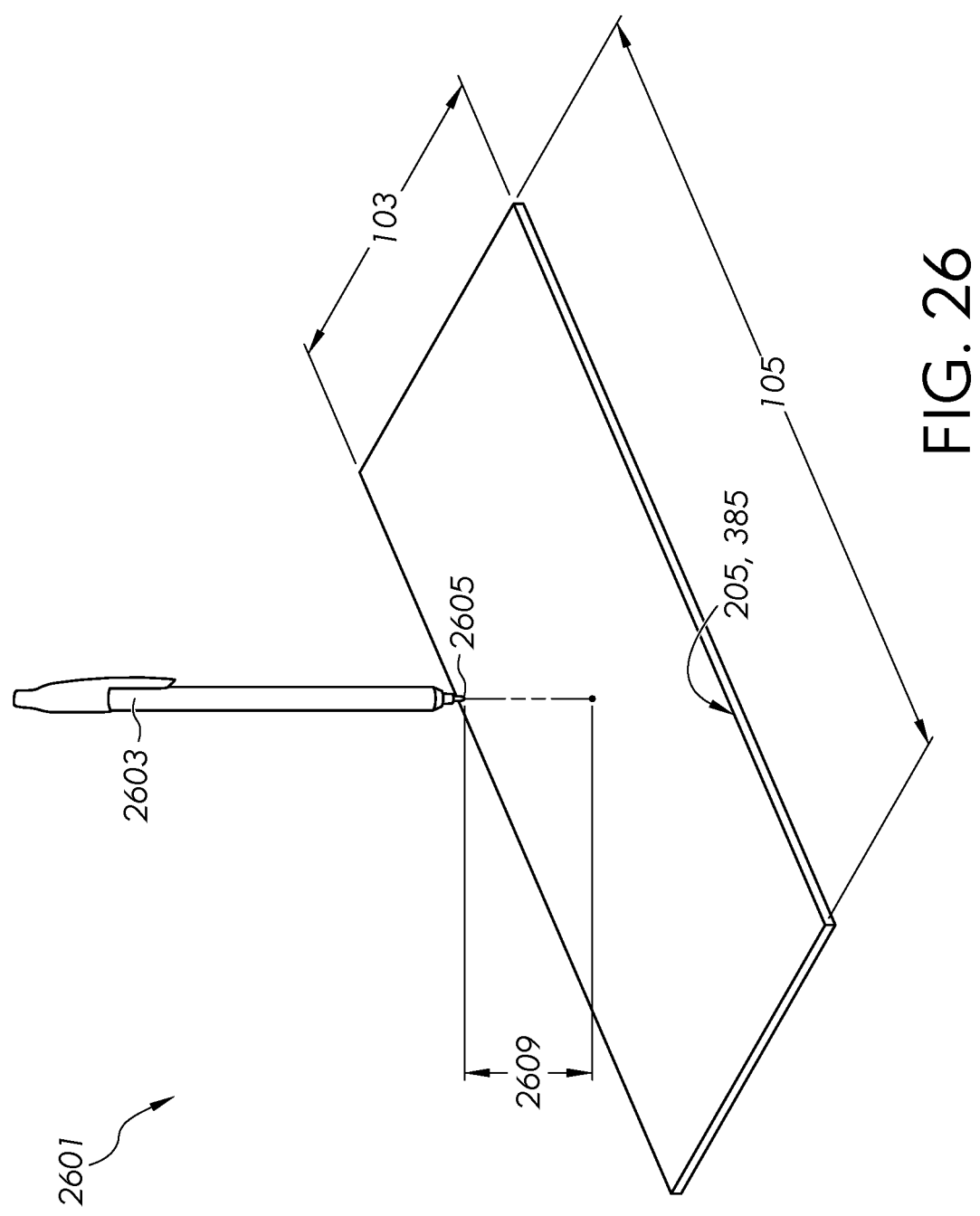
FIG. 26 is a schematic perspective view of a pen drop apparatus.

Referring to FIG. 26, in the Pen Drop test 2601, the pen 2603 employed is a BIC Easy Glide Pen, Fine comprising a tungsten carbide ballpoint tip 2605 of 0.7 mm (0.68 mm) diameter, and a weight of 5.73 grams (g) including the cap. The ballpoint pen 2603 is held at a predetermined height 2609 from an outer surface (e.g., fourth major surface 205 of the substrate 201 shown in FIGS. 2 and 4, sixth major surface 385 of the additional substrate 381 shown in FIG. 3) of the laminate. A tube (not shown) is used for the Pen Drop Test 2601 to guide the ballpoint pen 2603 to the outer surface (e.g., fourth major surface 205, sixth major surface 385) of the sample, and the tube is placed in contact with the outer surface of the laminate so that the longitudinal axis of the tube is substantially perpendicular to the outer surface of the laminate. The tube has an outside diameter of 1 inch (2.54 cm), an inside diameter of nine-sixteenths of an inch (1.4 cm) and a length of 90 cm. An acrylonitrile butadiene ("ABS") shim (not shown) is employed to hold the ballpoint pen 2603 at a predetermined height 2609 for each test. After each drop, the tube is relocated relative to the outer surface of the sample to be tested to guide the ballpoint pen 2603 to a different impact location on the outer surface of the sample to be tested. It is to be understood that the Pen Drop Test 2601 can be used for any of the laminates and/or films of aspects of the disclosure.

When performing the Pen Drop test on a laminate (e.g., laminates 101, 301, and/or 401 shown in FIGS. 2-4), as described for determining the parallel plate distance, the laminate (e.g., laminate 101 of FIG. 2) is modified by replacing the material beyond the layer contacting the third major surface 203 (FIGS. 2 and 4) or the first surface area 323 (FIG. 3) with the sheet of poly(ethylene terephthalate) 707 comprising the thickness 709 of 100 μm, as described above for determining the parallel plate distance. For example, the laminates 101 and 301 are modified by replacing the material beyond the first major surface 263 of the adhesive layer 261, with a 100 μm thick sheet of poly (ethylene terephthalate) 707 since the adhesive layer 261 is the layer contacting the third major surface 203 or the first surface area 323. Then, the outer surface that the pen is dropped on is opposite the 100 μm thick sheet of poly (ethylene terephthalate). When performing the Pen Drop test on a film or layer (e.g., film 901 and/or 1001 including layer 907 and/or 1007 shown in FIGS. 9-10), any release liner (e.g., release liner 271 in FIG. 9) is removed, the first major surface 903, 1003 of the film 901, 1001 is attached to a 30 μm thick glass-based substrate (e.g., substrate 201), and the second major surface 905, 1005 of the film 901, 1001 is attached to the 100 μm thick sheet of poly(ethylene terephthalate). For performing the Pen Drop Test for a film (e.g., films 901 and/or 1001), the 30 μm thick glass-based substrate comprises a composition, nominally, in mol % of: 69.1 $SiO_2$; 10.2 $Al_2O_3$; 15.1 $Na_2O$; 0.01 $K_2O$; 5.5 MgO; 0.09 $SnO_2$. The combined 30 μm thick glass-based substrate, the film (e.g., film 901 and/or 1001), and the 100 μm thick sheet of poly(ethylene terephthalate) are formed into a laminate by hot pressing at 180° C. for 1 hour. Then, the outer surface that the pen is dropped on is opposite the 100 μm thick sheet of poly(ethylene terephthalate), namely, an outer surface of the glass-based substrate.

For the Pen Drop Test 2601, the ballpoint pen 2603 is dropped with the cap attached to the top end (i.e., the end opposite the tip) so that the ballpoint tip 2605 can interact with the outer surface (e.g., fourth major surface 205 of the substrate 201 shown in FIGS. 2 and 4, sixth major surface 385 of the additional substrate 381 shown in FIG. 3) of the coating. In a drop sequence according to the Pen Drop Test, one pen drop is conducted at an initial height of 1 cm, followed by successive drops in 0.5 cm increments up to 20 cm, and then after 20 cm, 2 cm increments until failure of the sample to be tested. After each drop is conducted, the presence of any observable fracture, failure, or other evidence of damage to the laminate is recorded along with the particular predetermined height for the pen drop. Using the Pen Drop Test, multiple samples can be tested according to the same drop sequence to generate a population with improved statistical accuracy. For the Pen Drop Test, the ballpoint pen is to be changed to a new pen after every 5 drops, and for each new laminate tested. In addition, all pen drops are conducted at random locations on the laminate at or near the center of the laminate unless indicated otherwise, with no pen drops near or on the edge of the sample.

For purposes of the Pen Drop Test, "failure" means the formation of a visible mechanical defect in a sample. The mechanical defect may be a crack or plastic deformation (e.g., surface indentation). The crack may be a surface crack or a through crack. The crack may be formed on an interior or exterior surface of a sample. The crack may extend through all or a portion of the film and/or the laminate. A visible mechanical defect has a dimension of 0.2 millimeters or more. In aspects, the laminate 101, 301, and/or 401 (formed with the adhesive or film) can withstand a pen drop height of 1 cm or more, 2 cm or more, 3 cm or more, 4 cm or more, 5 cm or more, 6 cm or more, 7 cm or more, 8 cm or more, 9 cm or more, and/or 10 cm or more.

In aspects, the laminate can further comprise one or more of an easy-to-clean coating, a low-friction coating, an oleophobic coating, a diamond-like coating, a scratch-resistant coating, or an abrasion-resistant coating. A scratch-resistant coating may comprise an oxynitride, for example, aluminum oxynitride or silicon oxynitride with a thickness of about 500 micrometers or more. In such aspects, the abrasion-resistant layer may comprise the same material as the scratch-resistant layer. In aspects, a low friction coating may comprise a highly fluorinated silane coupling agent, for example, an alkyl fluorosilane with oxymethyl groups pendant on the silicon atom. In such aspects, an easy-to-clean coating may comprise the same material as the low friction coating. In other aspects, the easy-to-clean coating may comprise a protonatable group, for example, an amine, for example, an alkyl aminosilane with oxymethyl groups pendant on the silicon atom. In such aspects, the oleophobic coating may comprise the same material as the easy-to-clean coating. In aspects, a diamond-like coating comprises carbon and may be created by applying a high voltage potential in the presence of a hydrocarbon plasma.

Aspects of the disclosure can comprise a consumer electronic product. The consumer electronic product can comprise a front surface, a back surface, and side surfaces. The consumer electronic product can further comprise electrical components at least partially within the housing. The electrical components can comprise a controller, a memory, and a display. The display can be at or adjacent the front surface of the housing. The consumer electronic product can comprise a cover substrate disposed over the display. In aspects, at least one of a portion of the housing or the cover substrate comprises the film and/or laminate discussed throughout the disclosure. The display can comprise a liquid crystal display (LCD), an electrophoretic displays (EPD), an organic light emitting diode (OLED) display, or a plasma display panel (PDP). In aspects, the consumer electronic product can be a portable electronic device, for example, a smartphone, a tablet, a wearable device, or a laptop.

Figure 11:
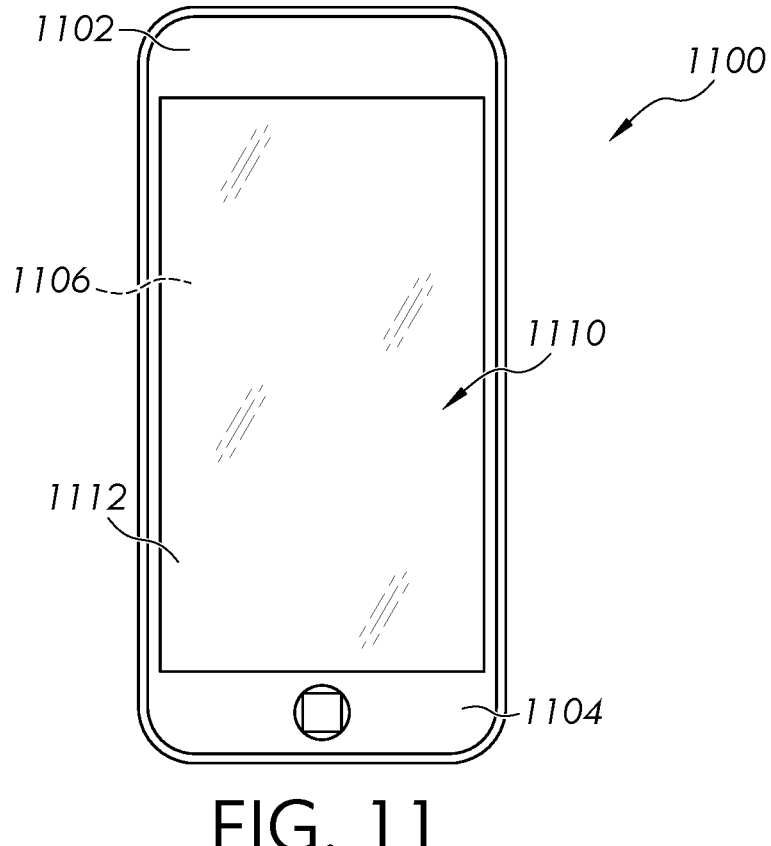
FIG. 11 schematic plan view of an example consumer electronic device in accordance with aspects of the disclosure.
Figure 12:
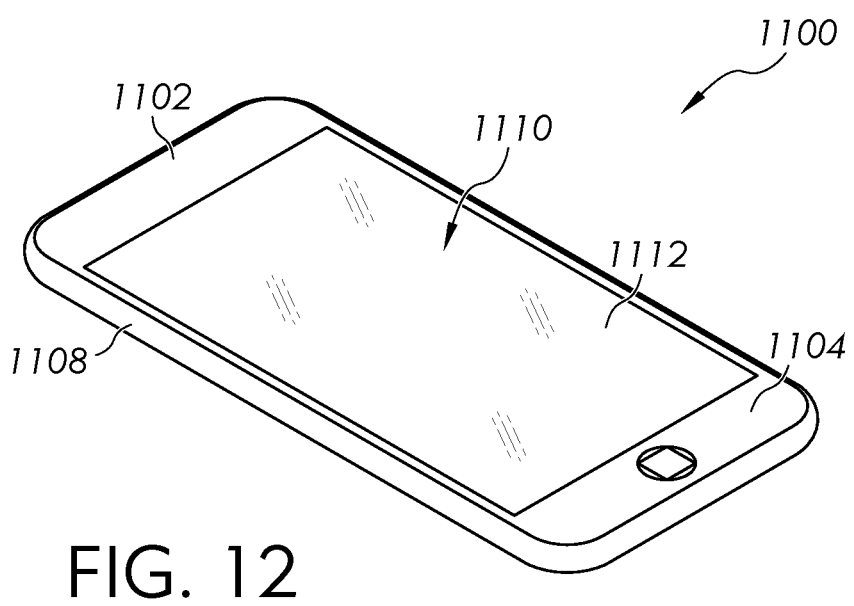
FIG. 12 is a schematic perspective view of the example consumer electronic device of FIG. 11.

The film and/or laminate disclosed herein may be incorporated into another article, for example, an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion resistance or a combination thereof. An exemplary article incorporating any of the laminates and/or films disclosed herein is shown in FIGS. 11 and 12. Specifically, FIGS. 11 and 12 show a consumer electronic device 1100 including a housing 1102 having a front surface 1104, a back surface 1106, and side surfaces 1108. The consumer electronic device 1100 can comprise electrical components (not shown) that are at least partially inside or entirely within the housing and including at least a controller, a memory, and a display 1110 at or adjacent to the front surface of the housing. The consumer electronic device 1100 can comprise a cover substrate 1112 at or over the front surface of the housing such that it is over the display. In aspects, at least one of the cover substrate 1112 or a portion of housing 1102 may include any of the film and/or laminate disclosed herein.

Aspects of methods of making the laminates 101, 301, and 401 in accordance with aspects of the disclosure will be discussed with reference to the flow chart in FIG. 13 and example method steps illustrated in FIGS. 13-25. With reference to the flow chart of FIG. 13, methods can start at step 1301. In aspects, step 1301 can comprise providing a substrate. In further aspects, the substrate can resemble the substrate 201 or 371 of FIGS. 1-4 comprising the substrate thickness 227 or 377. In further aspects, the substrate 201 or 371 can be provided by purchase or otherwise obtaining a substrate or by forming the substrate. In further aspects, the substrate can comprise a glass-based substrate and/or a ceramic-based substrate. In further aspects, glass-based substrates can be provided by forming them with a variety of ribbon forming processes, for example, slot draw, down-draw, fusion down-draw, up-draw, press roll, redraw, or float. In even further aspects, the substrate can be chemically strengthened and comprise a depth of compression (e.g., first depth of compression, second depth of compression), compressive stress (e.g., first maximum compressive stress, second maximum compressive stress), and/or depth of layer (e.g., first depth of layer, second depth of layer) within one or more of the corresponding ranges discussed above. In further aspects, step 1301 can comprise providing the film-forming material or precursors thereof, as discussed above. In further aspects, step 1301 can comprise providing the film. In aspects, if a film 901, 1001 is to be provided, after step 1301, the method can proceed through one or more of steps 1325 or 1307 where a film has been provided, for example, through heating a liquid (e.g., step 1305), extruding the film (e.g., step 1325), or purchasing the film.

In aspects, after step 1301, methods can proceed to step 1325 comprising extruding the film-forming material into a film (e.g., film 1001) with or without a release liner, as discussed above. In aspects, after step 1301, methods can proceed to step 1323 comprising reacting reactants to form the film-forming material(s), as discussed above. In aspects, after step 1301 or 1323, methods can proceed to step 1303 comprising disposing a liquid over a release liner, as discussed above with reference to FIG. 14. In aspects, after step 1303, methods can proceed to step 1305 comprising drawing an applicator 1503 across a free surface 1501 of the liquid 1401, as discussed above with reference to FIG. 15. In aspects, after step 1303 or 1305, methods can proceed to step 1307 comprising curing the liquid to form a film, as discussed above with reference to FIG. 16.

Figures 18, 19:
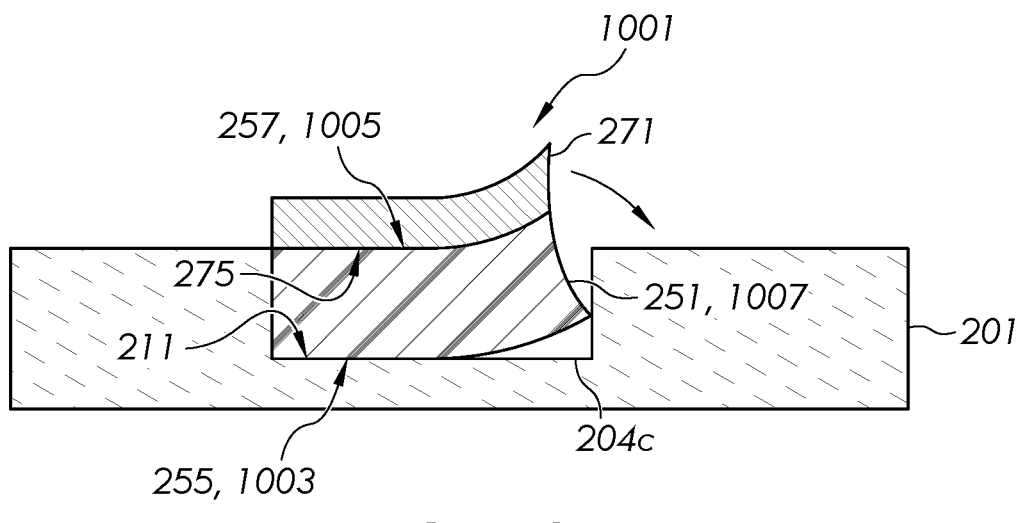

In aspects, after step 1301, 1307, or 1325, methods can proceed to step 1309 comprising disposing the film over the substrate. In further aspects, as shown in FIGS. 18-19, step 1309 can comprise disposing the film 1001 (e.g., see FIG. 17) over the substrate 201. In even further aspects, as shown in FIG. 18, step 1309 can comprise disposing the first major surface 255 and/or 1003 (e.g., polymer-based portion 251, layer 1007 of the film 1001) over the third central surface area 211 of the substrate 201. In still further aspects, as shown, the first major surface 255 and/or 1003 (e.g., polymer-based portion 251, layer 1007 of the film 1001) can contact the third central surface area 211 of the substrate 201. In even further aspects, although not shown, the third central surface area 211 can be treated with a silane coupling agent prior to disposing the film 1001. In even further aspects, the film can comprise a silane coupling agent, for example, on the first major surface 255 and/or 1003 or within the layer 1007. In further aspects, as shown in FIGS. 18-19, the film 1001 can comprise a release liner 271. In even further aspects, as shown in FIG. 19, step 1309 can comprise removing a second release liner, if present, from the second major surface 257 and/or 1005 before disposing (e.g., the polymer-based portion 251, the layer 1007) over the substrate 201. In further aspects, as shown in FIG. 10, the film 1001 may not comprise a release liner 271.

Figure 20:
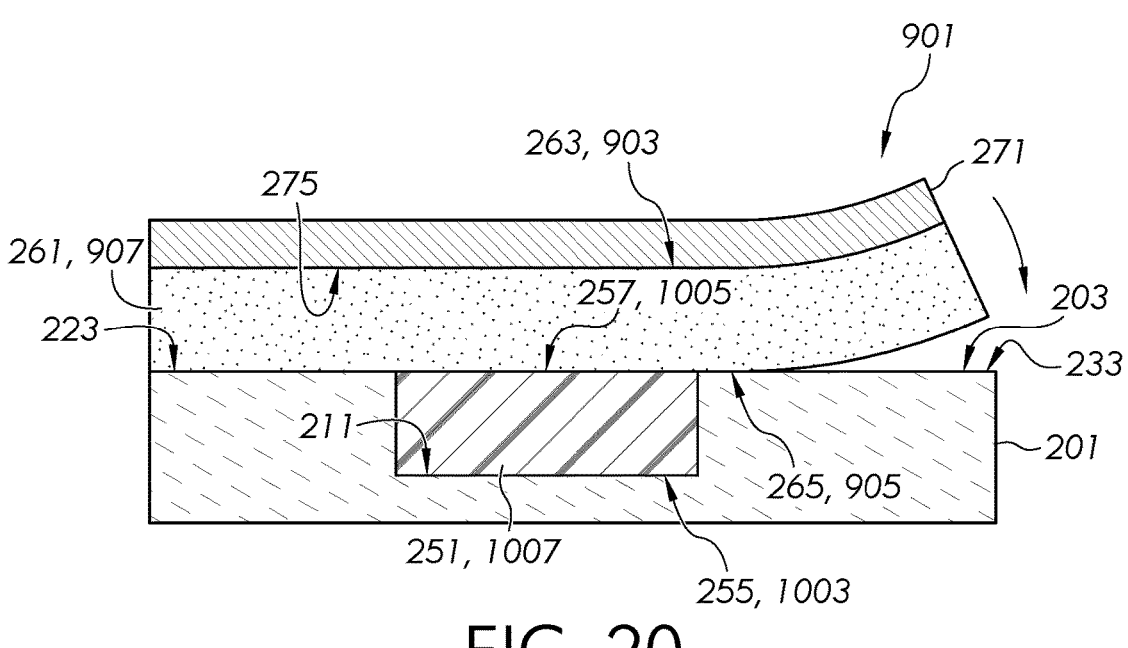

In further aspects, as shown in FIG. 20, step 1309 can comprise disposing the film 901 (e.g., see FIGS. 9 and 16) over the substrate 201. In even further aspects, as shown, step 1309 can comprise disposing the second major surface 265 and/or 905 (e.g., adhesive layer 261, layer 907 of the film 901) over the third major surface 203 (e.g., first surface area 223 and/or third surface area 233) of the substrate 201. In still further aspects, as shown, the second major surface 265 and/or 905 (e.g., adhesive layer 261, layer 907 of the film 901) can contact the third major surface 203 (e.g., first surface area 223 and/or third surface area 233) of the substrate 201. In even further aspects, although not shown, the third major surface 203 (e.g., first surface area 223 and/or third surface area 233) can be treated with a silane coupling agent prior to disposing the film 901. In even further aspects, the film can comprise a silane coupling agent, for example, on the second major surface 265 and/or 905 or within the layer 907. In further aspects, as shown in FIG. 20, the film 901 can comprise a release liner 271. In even further aspects, although not shown, step 1309 can comprise removing a second release liner, if present, from the second major surface 265 and/or 905 before disposing over the substrate 201. In further aspects, as shown in FIG. 9, the film 901 may not comprise a release liner 271 disposed over the second major surface 905.

Figure 23:
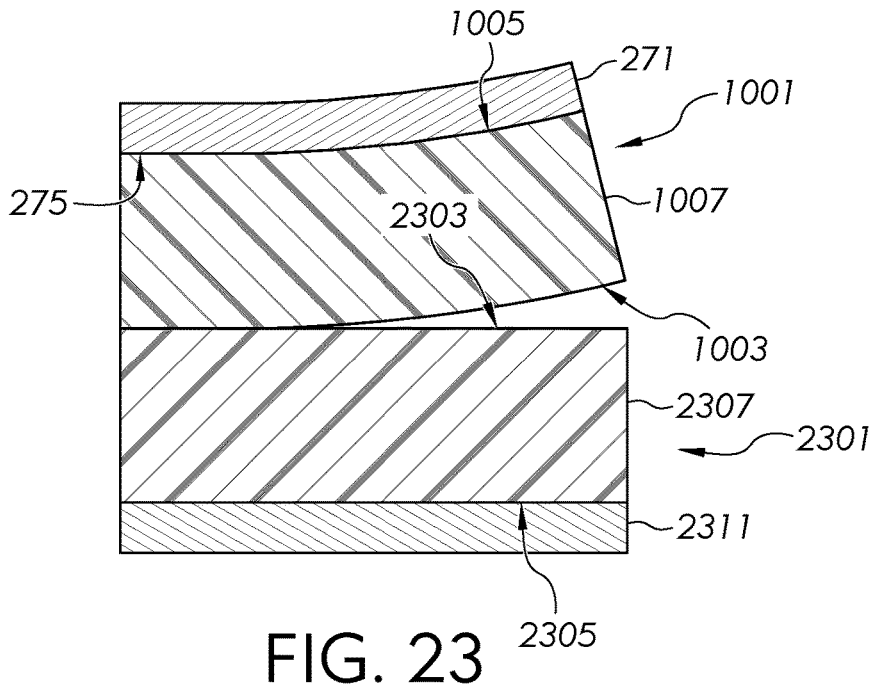
Figure 24:
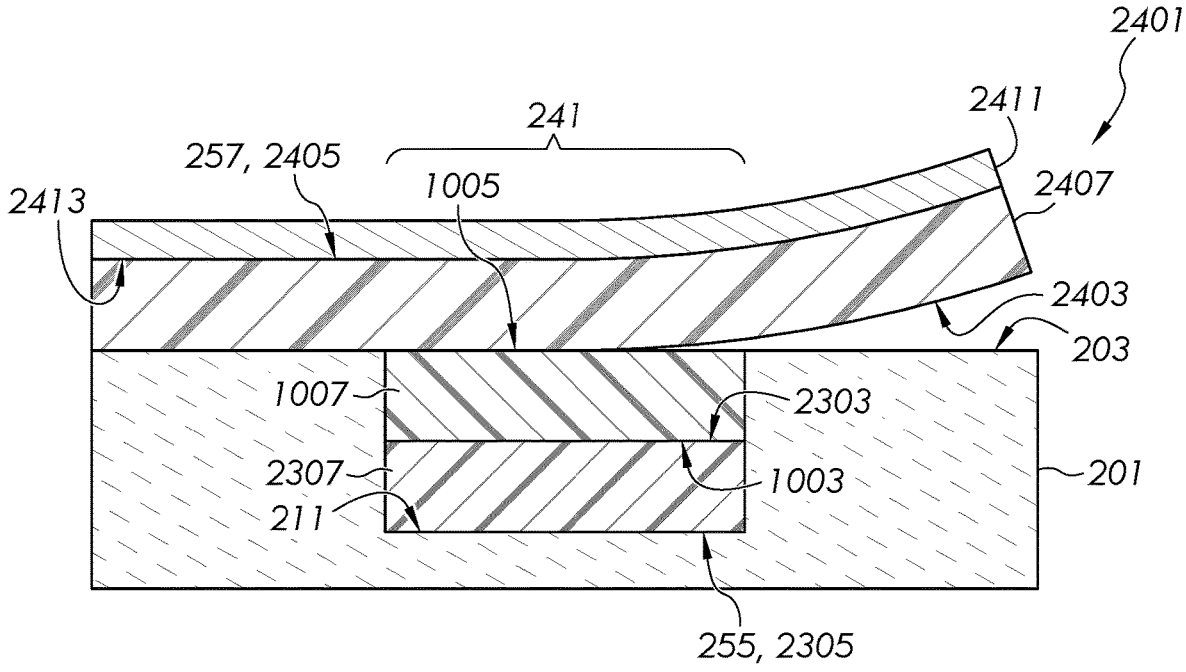

In aspects, as shown in FIGS. 23-24, step 1309 can comprise disposing more than one film (e.g., film 1001 and another film 2301) over the substrate. In further aspects, as shown in FIG. 23, the film 1001 can be disposed over one or more additional films (e.g., another film 2301) or vice versa before the film 1001 is disposed over the recess. In even further aspects, as shown, the another film 2301 can comprise an another release liner 2311 contacting a sixth major surface 2305 of the another layer 2307 opposite a fifth major surface 2303 of the another layer 2307. In even further aspects, as shown, the first major surface 1003 of the layer 1007 of the film 1001 can contact the fifth major surface 2303 of the another layer 2307 of the another film 2301. In further aspects, as shown between FIGS. 23-24, the another release liner 2311 can be removed and the combined layer 1007 and another layer 2307 can be disposed over the substrate 201 (e.g., third central surface area 211, for example, with the sixth major surface 2305 of the another film 2301 corresponding to the first major surface 255 of the polymer-based portion 251 contacting the third central surface area 211. In further aspects, the another layer 2307 of the another film 2301 can comprise the same block copolymer grafted with the first functional group as the layer 1007 of the film 1001.

Figure 25:
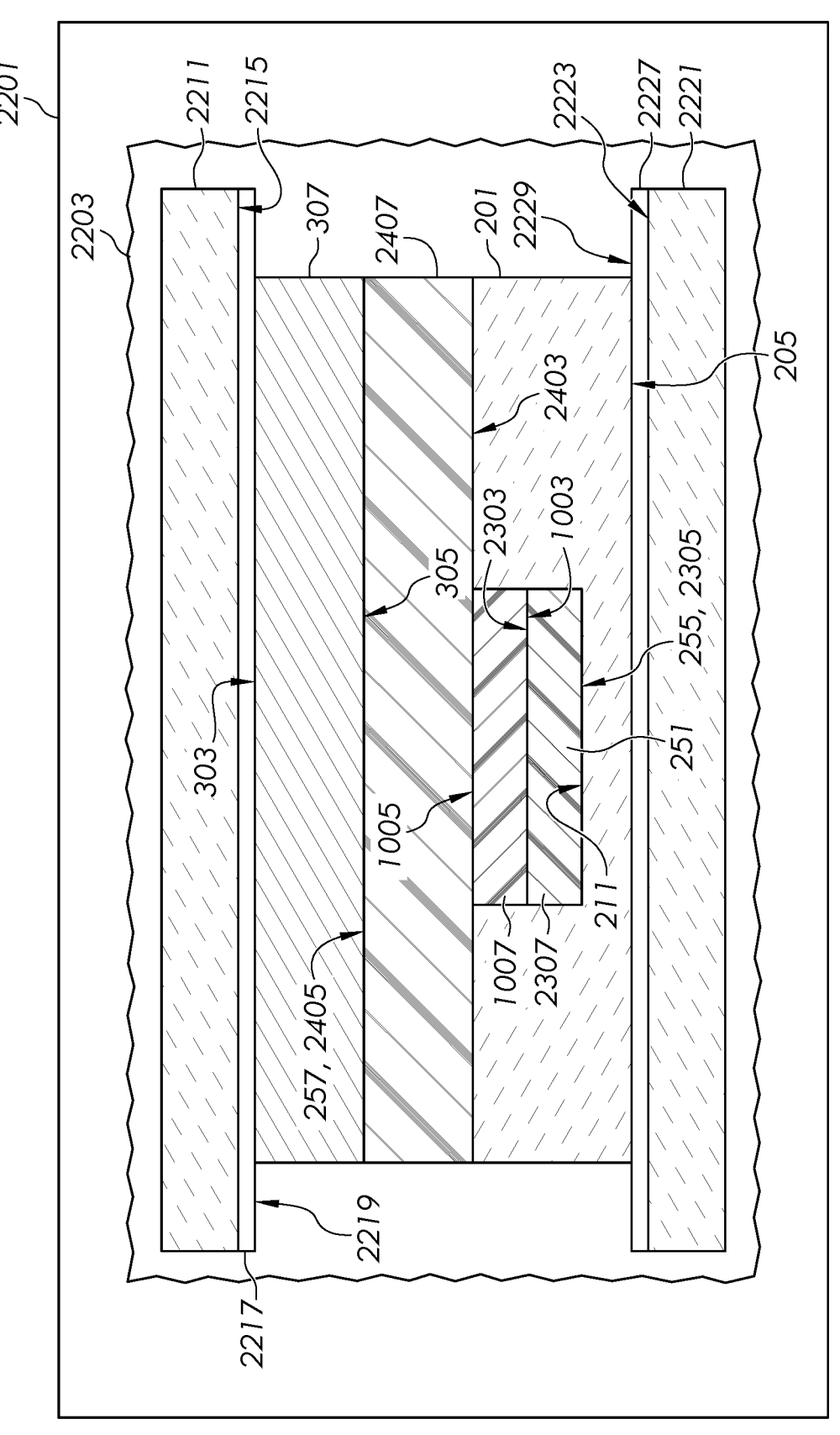

In aspects, as shown in FIG. 24, step 1309 can further comprise disposing one or more additional films (e.g., second another film 2401 over the layer 1007 (e.g., of the film 1001). In aspects, as shown, a release liner (e.g., release liner 271 shown in FIGS. 9, 18-19, and 23) can be removed, if present, before disposing the second another film 2401 thereon. In further aspects, as shown, the second another film 2401 can comprise a second another release liner 2411 comprising a release surface 2413 contacting an eighth major surface 2405 of the second another layer 2407 opposite a seventh major surface 2403 of the second another layer 2407. In further aspects, as shown in FIGS. 24-25, the eighth major surface 2405 can correspond to the second major surface 257 of the polymer-based portion 251. In further aspects, as shown, the seventh major surface 2403 of the second another layer 2407 can be disposed over and/or contact the third major surface 203 and/or the second major surface 1005 of the layer 1007. In further aspects, the second another layer 2407 of the second another film 2401 can comprise the same block copolymer grafted with the first functional group as the layer 1007 of the film 1001.

Figure 21:
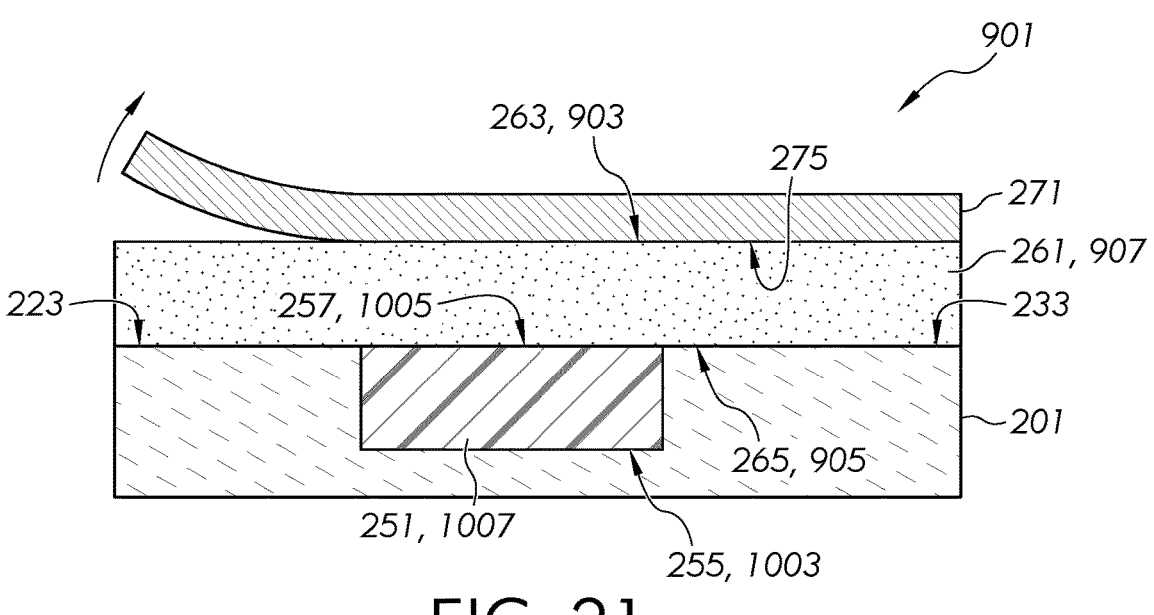

In aspects, after step 1309, methods can proceed to step 1311 comprising removing the release liner (e.g., release liner 271 as shown in FIGS. 19, 21, and 23, second another release liner 2411 shown in FIG. 24). In aspects, arrow 1304 can be followed to skip step 1311, for example, if there is not a release liner 271 at the end of step 1309.

In aspects, after step 1309 or 1311, methods can proceed to step 1327 comprising disposing another film over the substrate. In further aspects, as shown in FIG. 20, step 1327 comprises disposing the film 901 (e.g., see FIGS. 9 and 16) over the substrate 201. As further shown in FIGS. 20-21, the film 901 can further be disposed over the layer 1007 or the polymer-based portion 251. As discussed above in step 1309, a silane coupling agent can be applied to the surface that the film is to be disposed over, the film can comprise a silane coupling agent on its surface, a silane coupling agent can be within the film, and/or a silane coupling agent may not be used here. In further aspects, as shown in FIG. 21, the release liner 271, if present, can be removed in step 1327.

Figure 22:
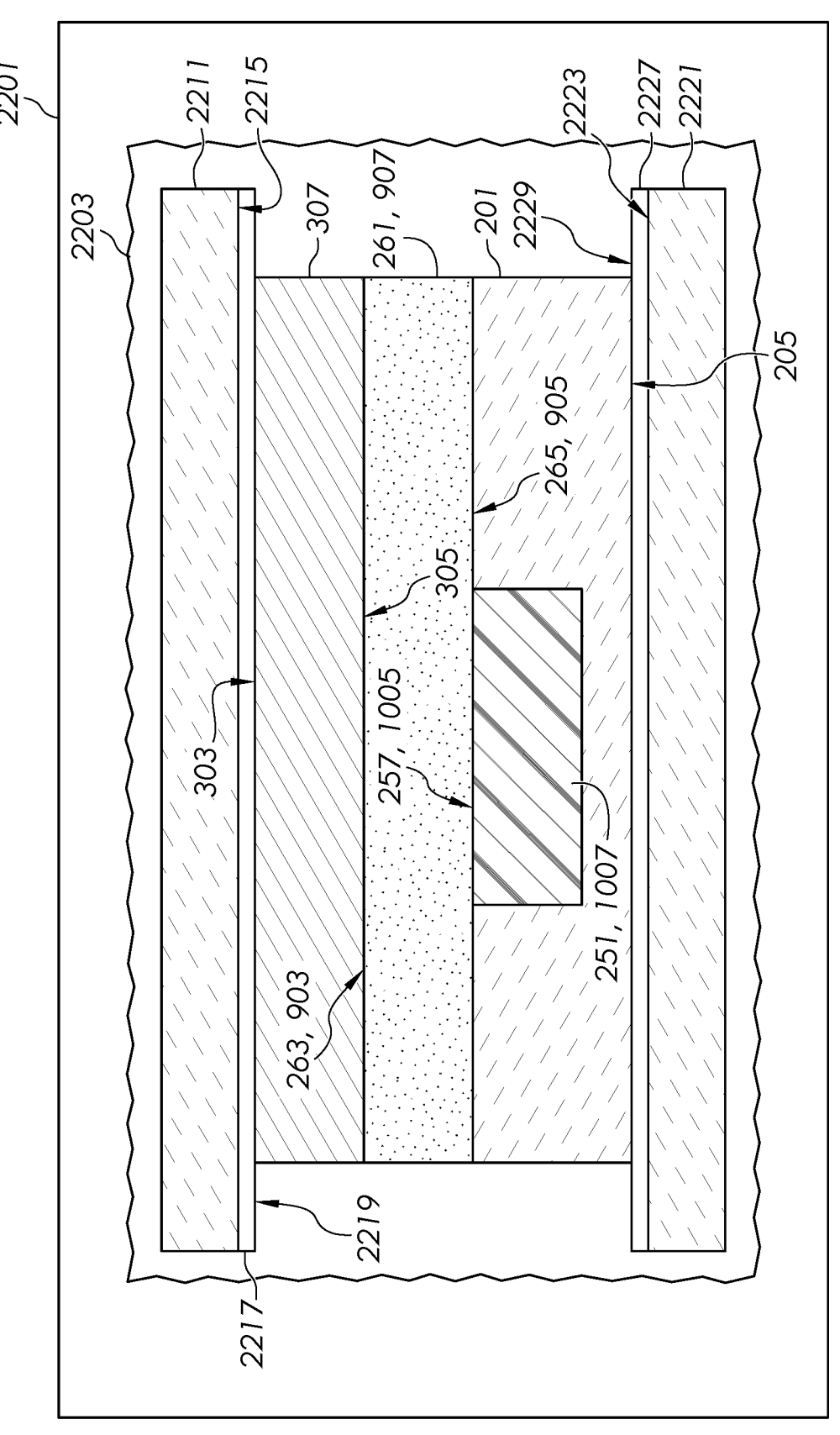

In aspects, after step 1309, 1311, or 1327, methods can proceed to step 1313 comprising preparing for a thermal lamination process. In aspects, as shown in FIG. 22, step 1313 can comprise disposing one or more elements (e.g., display device 307) over the first major surface 263 of the adhesive layer 261. In further aspects, as shown in FIGS. 22 and 25, step 1313 can comprise applying a first release liner 2217 over the display device 307. As shown in FIG. 22, the first release liner can comprise a first surface area 2219 facing a first major surface 263, which can further contact the sixth major surface 303 of the display device 307. In even further aspects, a first support 2211 can be disposed over the first release liner 2217, for example, with a third surface 2215 of the first support 2211 facing and/or contacting the first release liner 2217. In further aspects, as shown in FIGS. 22 and 25, step 1313 can comprise applying a second release liner 2227 over the fourth major surface 205 of the substrate 201. In even further aspects, a first surface area 2229 of the second release liner 2227 can face and/or contact the fourth major surface 205 of the substrate 201. In even further aspects, a second support 2221 can be disposed over the second release liner 2227, for example, with a third surface 2223 of the second support 2221 facing and/or contacting the second release liner 2227. In further aspects, as shown in FIGS. 22 and 25, methods can comprise placing the assembly in a vacuum container 2203. In even further aspects, the vacuum container can provide an airtight closure and can withstand the conditions of steps 1315 and 1317. Exemplary aspects of vacuum containers include the OBSJ/ABSJ vacuum bags available from Simtech. In further aspects, the first release liner 2217 and/or the second release liner 2227 can comprise any of the material discussed above for release liner 271, for example a fluorine-containing polymer. In further aspects, the first support 2211 and/or the second support 2221 can comprise an elastic modulus of about 3 GPa or more and/or can comprise a glass-based material and/or a ceramic-based material. Providing one or more release liners can reduce (e.g., prevent) adhesion of the film to undesired materials during methods and can reduce damage to the laminate during processing. Providing one or more supports can decrease deformation (e.g., warp) of the substrate and/or film during processing. Providing a vacuum container can protect the substrate, film, and/or laminate from contamination during processing.

In aspects, after step 1327 or 1313, methods can proceed to step 1315 comprising heating the film and the substrate at a first temperature for a first period of time. In further aspects, as shown in FIG. 22, heating the assembly can comprise placing the film and the substrate in an oven 2201. In further aspects, the first temperature can be about 40° C. or more, about 50° C. or more, about 60° C. or more, about 100° C. or less, about 90° C. or less, about 80° C. or less, or about 70° C. or less. In further aspects, the first temperature can be in a range from about 40° C. to about 100° C., from about 40° C. to about 90° C., from about 50° C. to about 90° C., from about 50° C. to about 80° C., from about 60° C. to about 80° C., from about 60° C. to about 70° C., or any range or subrange therebetween. In further aspects, the first period of time can be about 10 minutes or more, about 15 minutes or more, about 20 minutes or more, about 25 minutes or more, about 8 hours or less, about 4 hours or less, about 2 hours or less, about 1 hour or less, about 45 minute or less, or about 35 minutes or less. In further aspects, the first period of time can be in a range from about 10 minutes to about 8 hours, from about 10 minutes to about 4 hours, from about 15 minutes to about 4 hours, from about 15 minutes to about 2 hours, from about 20 minutes to about 2 hours, from about 20 minutes to about 1 hour, from about 20 minutes to about 45 minutes, from about 25 minutes to about 45 minutes, from about 25 minutes to about 35 minutes, or any range or subrange therebetween. In even further aspects, step 1315 can comprise heating the film and the substrate from ambient temperature (e.g., about 25° C.) to the first temperature at a first rate. In even further aspects, the first rate can be about 0.1° C. per minute (° C./min) or more, about 0.5° C./min or more, about 1° C./min or more, about 10° C./min or less, about 5° C./min or less, or about 3° C./min or less. In even further aspects, the first rate can be in a range from about 0.1° C./min to about 10° C./min, from about 0.1° C./min to about 5° C./min, from about 0.5° C./min to about 5° C./min, from about 0.5° C./min to about 3° C./min, from about 1° C./min to about 3° C./min, or any range or subrange therebetween.

In aspects, after step 1315, methods can proceed to step 1317 comprising heating the film and the substrate at a second temperature for a second period of time at a gauge pressure. As used herein, gauge pressure refers to pressure measured relative to atmospheric pressure (e.g., about 101.325 kPa). In further aspects, the second temperature can be about 150° C. or more, about 170° C. or more, about 190° C. or more, about 250° C. or less, about 230° C. or less, or about 210° C. or less. In further aspects, the second temperature can be in a range from about 150° C. to about 250° C., from about 150° C. to about 230° C., from about 170° C. to about 230° C., from about 170° C. to about 210° C., from about 190° C. to about 210° C., or any range or subrange therebetween. In further aspects, the second period of time can be about 30 minutes or more, about 35 minutes or more, about 40 minutes or more, about 2 hours or less, about 50 minutes or less, or about 45 minutes or less. In further aspects, the second period of time can be in a range from about 30 minutes to about 2 hours, from about 30 minutes to about 50 minutes, from about 35 minutes to about 50 minutes, from about 35 minutes to about 45 minutes, from about 40 minutes to about 45 minutes, or any range or subrange therebetween. In further aspects, the gauge pressure can be positive. In further aspects, the gauge pressure can be about 1.0 MegaPascals (MPa) or more, about 1.1 MPa or more, about 1.2 MPa or more, about 1.5 MPa or less, about 1.4 MPa or less, or about 1.3 MPa or less. In further aspects, the gauge pressure can be in a range from about 1.0 MPa to about 1.5 MPa, from about 1.0 MPa to about 1.4 MPa, from about 1.1 MPa to about 1.4 MPa, from about 1.1 MPa to about 1.3 MPa, from about 1.2 MPa to about 1.3 MPa, or any range or subrange therebetween. In further aspects, the second temperature can be greater than the first temperature. In even further aspects, step 1317 can comprise heating the film and the substrate from the first temperature to the second temperature at a second rate. In still further aspects, the second rate can be about 0.1° C. per minute (° C./min) or more, about 0.5° C./min or more, about 1° C./min or more, about 10° C./min or less, about 5° C./min or less, or about 3° C./min or less. In even further aspects, the second rate can be in a range from about 0.1° C./min to about 10° C./min, from about 0.1° C./min to about 5° C./min, from about 0.5° C./min to about 5° C./min, from about 0.5° C./min to about 3° C./min, from about 1° C./min to about 3° C./min, or any range or subrange therebetween. In further aspects, step 1317 can comprise increasing a pressure at a third rate to reach the gauge pressure. In even further aspects, the third rate can be about 3 kiloPascals per minute (kPa/min) or more, about 7 kPa/min or more, about 10 kPa/min or more, about 15 kPa/min or more, about 50 kPa/min or less, about 35 kPa/min or less, about 30 kPa/min or less, about 25 kPa/min or less, or about 20 kPa/min or less. In even further aspects, the third rate can be in a range from about 3 kPa/min to about 50 kPa/min, from about 3 kPa/min to about 35 kPa/min, from about 7 kPa/min to about 35 kPa/min, from about 7 kPa/min to about 30 kPa/min, from about 10 kPa/min to about 30 kPa/min, from about 10 kPa/min to about 25 kPa/min, from about 15 kPa/min to about 25 kPa/min, from about 15 kPa/min to about 20 kPa/min, or any range or subrange therebetween.

In further aspects, step 1317 can comprise cooling the substrate and the film as a laminate from the second temperature to ambient temperature (e.g., about 25° C.) or another predetermined temperature at a fourth rate. In even further aspects, the fourth rate can be about 0.5° C./min or more, about 1° C./min or more, about 2° C./min or more, about 4° C./min or more, about 20° C./min or less, about 10° C./min or less, about 8° C./min or less, or about 6° C./min or less. In even further aspects, the fourth rate can be in a range from about 0.5° C./min to about 20° C./min, from about 0.5° C./min to about 10° C./min, from about 1° C./min to about 10° C./min, from about 1° C./min to about 8° C./min, from about 2° C./min to about 8° C./min, from about 2° C./min to about 6° C./min, from about 4° C./min to about 6° C./min, or any range or subrange therebetween. In further aspects, step 1317 can comprise decreasing a pressure from the gauge pressure to ambient pressure (e.g., 0 Pascals gauge pressure) or another predetermined pressure at a fifth rate. In even further aspects, the fifth rate can be about 10 kPa/min or more, about 35 kPa or more, about 50 kPa/min or more, about 103 kPa/min or less, about 80 kPa/min or less, or about 60 kPa/min or less. In even further aspects, the fifth rate can be in a range from about 10 kPa/min to about 103 kPa/min, from about 35 kPa/min to about 103 kPa/min, from about 35 kPa/min to about 80 kPa/min, from about 50 kPa/min to about 80 kPa/min, from about 50 kPa/min to about 60 kPa/min, or any range or subrange therebetween. In further aspects, step 1317 can comprise removing the laminate formed from the film and the substrate from the vacuum container, support layer(s), and/or release liner(s), if present.

In aspects, although not shown, after the step 1317, methods can proceed to step 1319. In further aspects, step 1319 comprises assembling the laminates. In further aspects, step 1319 comprises including at least one of the laminates in an electronic device, for example, the consumer electronic device shown in FIGS. 11-12.

After step 1317 or 1319, methods can be complete at step 1321, whereupon methods of making the laminate 101, 301, and/or 401 can be complete. In aspects, the laminates and/or films can comprise the color difference, CIE L* value, absolute difference in CIE L* value, CIE a* value, absolute difference in CIE a* value, CIE b* value, absolute difference in CIE b* value, shear strength, transmittance, haze, and/or refractive index properties discussed above for the laminate and/or the film.

In aspects, as discussed above with reference to the flow chart in FIG. 13, methods can start at step 1301 and then proceed sequentially through steps 1303, 1305, 1307, 1309, 1311, 1313, 1315, 1317, 1319, and 1321. As discussed above, in aspects, arrows 1306, 1310, 1312, 1318, and/or 1322 can be followed. In aspects, arrow 1302 can be followed from step 1301 to step 1309, for example, if the film was provided in step 1301. In aspects, arrow 1304 can be followed from step 1309 to step 1313, skipping step 1311, for example, if the film does not comprise a release liner and/or the release liner does not need to be removed at that stage of the methods. In aspects, arrow 1308 can be followed from step 1317 to step 1321, for example, if the laminate is complete at the end of step 1317. In aspects, arrow 1314 can be followed from step 1327 to step 1313, for example, if additional materials (e.g., display device, release liner) are to be disposed on the film and/or the additional film before the thermal lamination process in steps 1315 and 1317. In aspects, arrow 1316 or 1320 can be followed from step 1311 or 1309, respectively, to step 1327, for example, if there is an additional film to be disposed over the substrate. In aspects, arrow 1322. Any of the above options may be combined to make a laminate in accordance with aspects of the disclosure.

For example, a laminate 101 as shown in FIG. 2 can be created in a single curing (e.g., step). As described above, the polymer-based portion 251 (e.g., film 1001) can be disposed over the third central surface area 211 of the substrate 201 followed by disposing the adhesive layer 261 (e.g., film 901) over the third major surface 203 and the second major surface 257 of the polymer-based portion 251. Further, a release liner 271 can be disposed over the adhesive layer 261. In aspects, the polymer-based portion 251 can comprise one or films (e.g., film 1001) either alone or stacked to form the desired thickness 259. Heating the assembled substrate, films, and release liner in steps 1315 and 1317. In contrast to the above single-step method, use of a liquid material to form the polymer-based portion and a liquid material to form the adhesive layer could not produce the laminate in a single step.

In another example, a laminate 301 as shown in FIG. 3 can be created in a single curing (e.g., step). The polymer-based portion 251 (e.g., film 1001) can be positioned between a first portion 321 and a second portion 331. In aspects, the polymer-based portion 251 can comprise one or more films (e.g., film 1001) either alone or stacked to form the desired thickness 259. An adhesive layer 261 can be disposed over the first portion 321, the second portion 331, and the polymer-based portion 251 followed by disposing the substrate 371 over the adhesive layer 261, the third adhesive layer 361 over the substrate 371, and a display device 307 over the third adhesive layer 361. A second adhesive layer 391 can be disposed over the first portion 321, the second portion 331, and the polymer-based portion 251 followed by disposing the additional substrate 381 over the second adhesive layer 391. Heating the assembled substrate, films, and release liner in steps 1315 and 1317. In contrast to the above single-step method, use of a liquid material to form the polymer-based portion and a liquid material to form the adhesive layers could not produce the laminate in a single step. Rather, using a liquid material to form the polymer-based portion and a liquid material to form the adhesive layers would require four curing steps.

In another example, a laminate 401 as shown in FIG. 4 can be created in a single curing (e.g., step). As described above, the polymer-based portion 251 (e.g., film 1001) can be disposed over the third central surface area 211 of the substrate 201. In aspects, the second portion 257b of the polymer-based portion 251 positioned in the recess 219 can comprise a different film (e.g., film 1001, another film) than a first portion 257a of the polymer-based portion 251. In aspects, the second major surface 256b of the first portion 257a can be brought into contact with the sixth major surface 258b of the second portion 257b either before disposing the second portion 257b in the recess 219 or afterwards. For example, the second portion 257b can comprise the film (e.g., film 1001), and the first portion 257a can comprise another film, where the film (e.g., film 1001) of the second portion 257b can comprise the same block copolymer with the first functional group grafted on the first block as the film (e.g., film 1001) of the first portion 257a. In even further aspects, the second portion 257b of the polymer-based portion 251 positioned in the recess 219 can comprise one or films (e.g., film 1001) either alone or stacked to form the desired thickness 259. In further aspects, as shown, the second major surface 256b of the first portion 257a can contact the fourth major surface 205. Further, a release liner 271 can be disposed over the polymer-based portion 251. Heating the assembled substrate, films, and release liner in steps 1315 and 1317. In contrast to the above single-step method, use of a liquid material to form the polymer-based portion and a liquid material to form the adhesive layer could not produce the laminate in a single step.

EXAMPLES

Various aspects will be further clarified by the following examples. Tables 2-6 present information about aspects of films, which may be used to form the laminates. Tables 7-12 present information about aspects of laminates. Unless otherwise specified, the substrate used in measuring the properties reported in Tables 7-12 is a glass-based substrate (having a Composition 1 of, nominally, in mol % of: 69.1 $SiO_2$; 10.2 $Al_2O_3$; 15.1 $Na_2O$; 0.01 $K_2O$; 5.5 MgO; 0.09 $SnO_2$) having a substrate thickness of 30 μm.

Examples A-P comprised films comprising a tri-block copolymer. Specifically, Examples A-O were created using one or more tri-block copolymers available from Kraton, namely, FG 1901, FG 1924, and/or 025 (not commercially available). FG 1901 contains between 1.4 wt % and 2 wt % maleic anhydride grafted onto the tri-block copolymer (i.e., polystyrene-(ethylene-co-butylene)-polystyrene tri-block copolymer). FG 1924 contains between 0.7 wt % and 1.3 wt % maleic anhydride grafted onto the tri-block copolymer (i.e., polystyrene-(ethylene-co-butylene)-polystyrene tri-block copolymer). 025 contains between 1.0 wt % and 1.2 wt % maleic anhydride grafted onto the tri-block copolymer (i.e., polystyrene-(ethylene-co-butylene)-polystyrene tri-block copolymer). Example A consisted of 025, which comprises a polystyrene-(ethylene-co-butylene)-polystyrene tri-block copolymer grafted with maleic anhydride and 7 wt % of a polystyrene-(ethylene-co-butylene) di-block copolymer. Example B consisted of 58.5 wt % FG 1901 and 41.5 wt % FG 1924, which are both polystyrene-(ethylene-co-butylene)-polystyrene tri-block copolymers grafted with maleic anhydride. Example P consisted of 2.0 wt % of silane (i.e., triethoxysilane) grafted on to the tri-block copolymer (i.e., polystyrene-(ethylene-co-butylene)-polystyrene tri-block copolymer). Example Z comprised a urethane-acrylate polymer disclosed in U.S. Non-Provisional patent application Ser. No. 17/068,272 filed on Oct. 12, 2020.

The films of Examples A-N were prepared by a 20 wt % solution of the tri-block copolymer that was disposed over a release liner and an applicator bar was used to set a thickness of 250 μm and heated at a first temperature of 60° C. for 3 hours and then 100° C. for 3 hours. Comparable properties were also exhibited for films prepared by extruding a 250 μm film using the corresponding tri-block copolymer. The films of Examples A-N and Z comprised a resulting film thickness from 200 μm to 400 μm, and the films of Examples O and AA-CC comprise a film thickness of 30 μm. The film of Example P was prepared by a 30 wt % solution of the tri-block copolymer that was disposed over a release liner and an applicator bar was used to set a thickness of 50 μm and heated at a first temperature of 60° C. for 3 hours and then 100° C. for 3 hours to obtain a film with a thickness of 30 μm.

Table 2 presents the shear strength measured in the Lap Shear test for Examples A-B measured under different conditions. As used herein, "RT" refers to the condition where the Examples are held at a room temperature of 25° C. with 50% relative humidity (RH) for the specified time period (e.g., 1 day, 5 days, 10 days). Examples A-B comprised a shear strength of 3.3 MPa or more after being held at room temperature (e.g., 25° C., 50% relative humidity (RH)) for 1 day as well as for 10 days. However, the shear strength decreased to 1.25 MPa and 1.02 MPa for Examples A-B, respectively, after being held in a 65° C. at 70% RH environment for 10 days. In contrast, the shear strength of Example P increased from 3.10 MPa after 1 day to 10 days after being held at room temperature and more noticeably after being held in a 65° C. at 70% RH environment for 10 days. It is unexpected that the shear strength of Example P would increase after being held in a 65° C. at 70% RH environment for 10 days given that the shear strength of Examples A-B decreased by 60% to 70% under the same conditions.

TABLE 2

| Shear Strength in Lap Shear Test of Examples A-B | | | |
| --- | --- | --- | --- |
| Example | A | B | P |
| RT, 1 day (MPa) | 3.36 | 3.44 | 3.10 |
| RT, 10 days (MPa) | 3.35 | 3.32 | 3.12 |
| 65° C., 70% RH, 10 days (MPa) | 1.25 | 1.02 | 3.38 |

TABLE 3

| Shear Strength in Lap Shear Test of Examples C-H and Z | | | | | | | |
| --- | --- | --- | --- | --- | --- | --- | --- |
| Example | C | D | E | F | G | H | Z |
| 65° C., 70% RH, 10 days (MPa) | 1.06 | 1.17 | 2.41 | 0.90 | 1.36 | 3.24 | 3.06 |

Table 3 presents the shear strength measured in the Lap Shear test for Examples C-H and Z. Examples C-E comprised the film from Example A, but a silane coupling agent was used to promote adhesion between the film and the substrate. Examples F-H comprised the film from Example B, but a silane coupling agent was used to promote adhesion between the film and the substrate. In Examples C and F, the silane coupling agent was (3-glycidoxypropyl)trimethoxysilane. In Examples D and G, the silane coupling agent was (3-glycidoxypropyl)triethoxysilane. In Examples E and H, the silane coupling agent was (3-aminopropyl)triethoxysilane. Example Z did not comprise a silane coupling agent but comprised a shear strength of 3.06 MPa after being held in a 65° C., 70% relative humidity environment for 10 days. For Examples C-D, the shear strength decreased relative to Example A. Likewise, the shear strength of Example F decreased relative to Example B. However, the shear strength of Example E increased by 1.16 MPa (93% increase) relative to Example A. Likewise, the shear strength of Example H increase by 2.22 MPa (217% increase) relative to Example B. The shear strength of Example G increased by 0.36 MPa (35% increase) relative to Example B. The increase in shear strength of Examples E and H (using (3-glycidoxypropyl)trimethoxysilane) provides an unexpected increase in shear strength over Examples A and B, respectively, without a silane coupling agent as well as Examples C-D and E-F, respectively. Without wishing to be bound by theory, it was expected that shear strength would be greater using the glycidyl-functionalized silane coupling agent because of the similarity between the glycidyl group and the maleic anhydride grafted onto the tri-block copolymer. However, using the amine-functionalized silane coupling agent increased the shear strength by about 90% or more (e.g., 93% for Example E, 217% for Example H) relative to the film without a silane coupling agent and by even more compared to the other silane coupling agents tested.

Table 4 presents the composition of Examples I-N along with refractive index, tensile strength, and ultimate elongation. Throughout the disclosure, a tensile strength, ultimate elongation (e.g., strain at failure), and yield point of the polymer-based portion and elastomers is determined using ASTM D412A using a tensile testing machine, for example, an Instron 3400 or Instron 6800, at 23° C. and 50% relative humidity with a type I dogbone shaped sample. "Refractive index (ave)" refers to the refractive index averaged over optical wavelengths from 400 nm to 700 nm, which was calculated using measurements refractive index from 6 different optical wavelengths roughly evenly spaced. Examples I-N comprise from 13 wt % to 30 wt % polystyrene (PS) content, which refers to the total weight of the two second blocks (polystyrene). The refractive index at 589 nm varies from 1.4897 to 1.5075 for Examples I-N and the refractive index is between 1.493 to about 1.512 for Examples I, J, and N. For comparison, a non-chemically strengthened substrate comprising Composition 1 comprises a refractive index of 1.5002 at 589 nm, which is substantially the same as Example L. The tensile strength of Examples I, L, and N is between about 2.3 MPa and about 5.5 MPa with Example L exhibiting the lowest tensile strength. The ultimate elongation of Examples I, L, and N is between about 400% and about 530%. As demonstrated in Table 4, a predetermined refractive index (e.g., from about 1.49 to about 1.508) can be obtained while maintaining a tensile strength of about 1 MPa or more (e.g., about 2 MPa or more) and an ultimate elongation of about 400% or more by changing the total weight of the two second blocks (e.g., from 13 wt % to 30 wt % polystyrene).

TABLE 4

| | | | | | | | |
| --- | --- | --- | --- | --- | --- | --- | --- |
| Composition, Optical, and Mechanical Properties of Examples I-N | | | | | | | |
| Example | PS (wt %) | FG 1901 (wt %) | FG 1924 (wt %) | Refractive Index (589 nm) | Refractive Index (ave) | Tensile Strength (MPa) | Ultimate Elongation (%) |
| I | 13.0 | 0 | 100 | 1.4897 | 1.4931 | 4.19 | 530 |
| J | 19.8 | 40 | 60 | 1.4965 | 1.5009 | | |
| K | 22.35 | 55 | 45 | 1.4995 | | | |
| L | 22.95 | 58.5 | 41.5 | 1.5002 | | 2.31 | 485 |
| M | 23.54 | 62 | 38 | 1.5006 | | | |
| N | 30 | 100 | 0 | 1.5075 | 1.5116 | 5.43 | 408 |

TABLE 5

CIE values for Example A

| Example A | CIE L* | CIE a* | CIE b* |
|---|---|---|---|
| As Formed | 91.4 | 0.26 | 2.1 |
| Thermal Shock, 5 days | 91.42 | 0.29 | 1.8 |
| Thermal Shock, 10 days | 91.2 | 0.26 | 2.2 |
| 65° C., 90% RH, 5 days | 91.42 | 0.24 | 2.2 |
| 65° C., 90% RH, 10 days | 90.9 | 0.25 | 2.5 |
| 85° C., 5 days | 91.6 | 0.18 | 2.3 |
| 85° C., 10 days | 91.42 | 0.13 | 2.6 |
| −25° C., 5 days | 91 | 0.18 | 2.6 |
| −25° C., 10 days | 91.02 | 0.25 | 2.9 |

TABLE 6

Differences in CIE values for Example A

| Example A | Absolute Difference CIE L* | Absolute Difference CIE a* | Absolute Difference CIE b* | Color Difference |
|---|---|---|---|---|
| Thermal shock, 5 days | 0.02 | 0.03 | 0.3 | 0.3 |
| Thermal shock, 10 days | 0.2 | 0 | 0.1 | 0.25 |
| 65° C., 90% RH, 5 days | 0.22 | 0.02 | 0.1 | 0.41 |
| 65° C., 90% RH, 10 days | 0.5 | 0.01 | 0.4 | 0.45 |
| 85° C., 5 days | 0.2 | 0.08 | 0.2 | 0.44 |
| 85° C., 10 days | 0.02 | 0.13 | 0.5 | 0.81 |
| −25° C., 5 days | 0.4 | 0.08 | 0.5 | 0.81 |
| −25° C., 10 days | 0.38 | 0.01 | 0.8 | 0.93 |

Tables 5-6 present the CIE values and differences in those values between different conditions for Example A. In Table 6, the absolute differences and color differences are calculated based on the as-formed values for the films subjected to the specific treatment. As used herein, the "thermal shock" condition refers to cycling the film between −25° C. and 105° C. environments every 30 minutes for the stated period of time. The "as formed" values are the average of initial measurements for samples subjected to 5 days and/or 10 days in the various environments. As shown in Table 5, the CIE L* value started at 91.4 and remained between 90.9 and 91.6 for all conditions. The CIE a* value started at 0.26 and remained between 0.13 and 0.29 for all conditions. The CIE b* value started at 2.1 and remained between 1.8 and 2.9 for all conditions. As shown in Table 6, the absolute difference in CIE L* value was about 0.5 or less for all conditions. The absolute difference in CIE a* values was about 0.13 or less for all conditions. The absolute difference in CIE b* values was about 0.8 or less for all conditions. The color difference was calculated using the initial and final CIE values for a specific sample whereas the absolute difference in individual CIE values use average values for all samples subject to the same environment for the same period of time. As shown in Table 6, the color difference is about 1 or less for all conditions. For thermal shock and 65° C., 90% RH for 5 or 10 days, the color difference was about 0.5 or less.

Tables 7-8 present the CIE values and differences in those values between different conditions for Example O. Example O comprises a laminate formed using the film of Example A and two glass-based substrates comprising Composition 1 and a substrate thickness of 30 μm. The film and the substrate were secured using PTFE films and 2 mm thick support layers comprising glass-based material and placed in a OBSJ vacuum bag (Simtech). The substrate and film was then heated at a first temperature of 65° C. with a heating rate of 0.7° C./min and maintaining the first temperature for 30 minutes. Then, the substrate and film was heated at a second temperature of 150° C. with a heating rate of 1.5° C./min and under a gauge pressure of 1.2 MPa reached by increasing a pressure at 20 kPa/min and maintaining the second temperature and gauge pressure for 40 minutes to form the laminate. Then, the laminate was cooled with a temperature decreasing at 3° C./min and decreasing a pressure at 20 kPa/min to at least 50° C. and a gauge pressure of 0.08 MPa.

As shown in Table 7, the CIE L* value started at 91.0 and remained between 90.2 and 91.0 for all conditions. The CIE a* value started at 0.21 and remained between 0.16 and 0.22 for all conditions. The CIE b* value started at 2.85 and remained between 2.8 and 3.2 for all conditions. As shown in Table 8, the absolute difference in CIE L* value was about 1.1 or less for all conditions. The absolute difference in CIE a* values was about 0.10 or less and about 0.05 or less for all conditions. The absolute difference in CIE b* values was about 0.5 or less and about 0.35 or less for all conditions. As shown in Table 8, the color difference is about 2 or less for all conditions. For thermal shock and 65° C., 90% RH for 5 or 10 days, the color difference was about 1 or less and about 0.6 or less. For thermal shock for 5 or 10 days, the color difference is about 0.5 or less.

TABLE 7

CIE values for Example O

| Example O | CIE L* | CIE a* | CIE b* |
|---|---|---|---|
| As Formed | 91.0 | 0.21 | 2.85 |
| Thermal Shock, 5 days | 90.5 | 0.18 | 3.0 |
| Thermal Shock, 10 days | 90.2 | 0.22 | 3.2 |
| 65° C., 90% RH, 5 days | 90.5 | 0.21 | 2.83 |
| 65° C., 90% RH, 10 days | 90.9 | 0.18 | 2.9 |
| 85° C., 5 days | 90.4 | 0.20 | 3.0 |
| 85° C., 10 days | 89.9 | 0.21 | 3.08 |
| −25° C., 5 days | 90.4 | 0.18 | 3.18 |
| −25° C., 10 days | 90.2 | 0.16 | 3.18 |

TABLE 8

Differences in CIE values for Example O

| Example O | Absolute Difference CIE L* | Absolute Difference CIE a* | Absolute Difference CIE b* | Color Difference |
|---|---|---|---|---|
| Thermal shock, 5 days | 0.5 | 0.03 | 0.15 | 0.04 |
| Thermal shock, 10 days | 0.8 | 0.01 | 0.35 | 0.45 |
| 65° C., 90% RH, 5 days | 0.5 | 0 | 0.02 | 0.25 |
| 65° C., 90% RH, 10 days | 0.1 | 0.03 | 0.05 | 0.56 |
| 85° C., 5 days | 0.6 | 0.01 | 0.15 | 1.34 |
| 85° C., 10 days | 1.1 | 0 | 0.23 | 1.81 |
| −25° C., 5 days | 0.6 | 0.03 | 0.33 | 0.38 |
| −25° C., 10 days | 0.8 | 0.05 | 0.33 | 0.56 |

Tables 8 and 11-12 present differences in CIE L*, CIE a*, and CIE b* values as the final value minus the initial value for Examples O and AA-CC for different conditions. In Table 8, the absolute differences and color differences are calculated based on the as-formed values for the films subjected to the specific treatment. An increase in CIE L* value is associated with a brighter film and/or laminate. A decrease in a positive CIE a* value is associated with a decrease in color along a red-green axis with more positive values corresponding to redder colors and more negative values corresponding to greener colors. A decrease in a positive CIE b* value is associated with a decrease in color along a yellow-blue with more positive values corresponding to yellower colors and more negative values associated with bluer colors. Example AA comprises the same film as Example O with the addition of 0.1 wt % Irganox 1010 and 0.1 wt % Ultranox 168. Example BB comprises the same film as Example O with the addition of 0.1 wt % Irganox 1010 and 0.2 wt % Ultranox 168. Example CC comprises the same film as Example O with the addition of 0.1 wt % Irganox 1010 and 0.2 wt % Irgafos.

TABLE 9

| CIE values for Example P | | | |
| --- | --- | --- | --- |
| Example P | CIE L* | CIE a* | CIE b* |
| As Formed | 90.4 | 0.23 | 2.98 |
| 65° C., 90% RH, 5 days | — | 0.23 | 3.06 |
| 65° C., 90% RH, 10 days | 90.8 | 0.25 | 3.24 |

TABLE 10

| | Differences in CIE values for Example P | | | |
| --- | --- | --- | --- | --- |
| Example P | Absolute Difference CIE L* | Absolute Difference CIE a* | Absolute Difference CIE b* | Color Difference |
| 65° C., 90% RH, 5 days | — | 0 | 0.08 | — |
| 65° C., 90% RH, 10 days | 0.4 | 0.02 | 0.26 | 0.48 |

Tables 9-10 present the CIE values and differences in those values between different conditions for Example P. The film and the substrate were secured using PTFE films and 2 mm thick support layers comprising glass-based material and placed in a OBSJ vacuum bag (Simtech). The substrate and film was then heated at a first temperature of 65° C. with a heating rate of 0.7° C./min and maintaining the first temperature for 30 minutes. Then, the substrate and film was heated at a second temperature of 150° C. with a heating rate of 1.5° C./min and under a gauge pressure of 1.2 MPa reached by increasing a pressure at 20 kPa/min and maintaining the second temperature and gauge pressure for 40 minutes to form the laminate. Then, the laminate was cooled with a temperature decreasing at 3° C./min and decreasing a pressure at 20 kPa/min to at least 50° C. and a gauge pressure of 0.08 MPa.

As shown in Table 9, the CIE L* value started at 90.4 and increased to 90.8 after being held in a 65° C., 70% relative humidity environment for 10 days. The CIE a* value started at 0.23 and remained between 0.23 and 0.25 for all conditions. The CIE b* value started at 2.98 and remained between 2.98 and 3.24 for all conditions. As shown in Table 10, the absolute difference in CIE L* value was about 0.4 for being held in a 65° C., 70% relative humidity environment for 10 days. The absolute difference in CIE a* values was about 0.10 or less, about 0.05 or less, and 0.02 or less for all conditions. The absolute difference in CIE b* values was about 0.5 or less, about 0.35 or less, and 0.26 or less for all conditions. As shown in Table 10, the color difference is about 0.5 or less for being held in a 65° C., 70% relative humidity environment for 10 days.

As shown in Table 11, the CIE L* value decreased for Examples O and AA-CC, but the decrease was the smallest for Example AA. The CIE a* value decreased for Examples O and AA, increased from Example P, but stayed the same for Examples BB-CC. The CIE b* value decreased for Example BB but increased for Examples O-P, AA, and CC. Consequently, Examples AA and BB comprised the same or less yellow as Example O. Example AA increased in brightness compared to Example O with the same change in color.

TABLE 11

| Differences in CIE values after 10 days at 65° C., 90% RH | | | |
| --- | --- | --- | --- |
| 65° C., 90% RH, 10 days | Difference in CIE L* | Difference in CIE a* | Difference in CIE b* |
| Example O | −0.15 | −0.01 | 0.09 |
| Example P | 0.4 | 0.02 | 0.26 |
| Example AA | −0.10 | −0.01 | 0.09 |
| Example BB | −0.52 | 0 | −0.04 |
| Example CC | −0.08 | 0 | 0.14 |

TABLE 12

| Differences in CIE values after 10 days at 85° C. | | | |
| --- | --- | --- | --- |
| 65° C., 90% RH, 10 days | Difference in CIE L* | Difference in CIE a* | Difference in CIE b* |
| Example O | 0.07 | 0 | 0.15 |
| Example AA | 1.51 | −0.06 | −0.13 |
| Example BB | 0.53 | −0.02 | 0.07 |
| Example CC | 0.43 | −0.01 | 0.02 |

As shown in Table 12, the CIE L* value increased for Examples O and AA-CC, but the increase was the largest for Example AA. The CIE a* value decreased for Examples AA-CC but stayed the same for Example O. The CIE b* value decreased for Example AA but increased for Examples O and BB-CC. Consequently, Examples AA-CC comprised less yellow as Example O, indicating that the antioxidants can decrease yellowing in the films and/or laminates. Example AA increased in brightness compared to Example O with a lower color laminate. Consequently, adding antioxidants can improve the CIE L*, CIE a*, and/or CIE b* value of a film and/or laminate.

The above observations can be combined to provide films and laminates comprising a polymeric material and methods of making the same. Providing a polymeric material comprising low haze can enable good visibility through the film and/or laminate. In aspects, a refractive index of the polymeric material of the film can comprise a small (e.g., about 0.01 or less) absolute difference from a refractive index of a substrate. Further the film and/or laminate can substantially maintain its optical properties (e.g., CIE values, color difference) after being held in various environments for 5 days or more or 10 days or more.

In aspects, the polymeric material can comprise a tri-block material. Providing a tri-block copolymer can improve an impact resistance of the film and/or laminate, for example, by absorbing and dissipating impact energy. Providing more than one type of tri-block copolymer can enable fine-tuning of the refractive index of the resulting layer (e.g., film). Providing a first block of the tri-block copolymer with a first glass transition temperature (Tg1) outside (e.g., below) of an operating range (e.g., from about 0° C. to about 40° C., from about −20° C. to about 60° C.) can enable consistent properties across the operating range of the article (e.g., film, laminate). Providing a second block of the tri-block copolymer with a second glass transition temperature outside (e.g., above) of an operating range (e.g., from about 0° C. to about 40° C., from about −20° C. to about 60° C.) can enable consistent properties across the operating range of the article (e.g., film, laminate). Providing a di-block copolymer in combination with the tri-block copolymer can increase a flexibility and/or impact resistance of the resulting layer (e.g., film, laminate). Providing a di-block copolymer comprising materials corresponding to the materials of the first block and one or both of the two second blocks can enable increased flexibility without substantially modifying the optical properties of the layer (e.g., film, laminate). Providing an antioxidant can improve a color of the film and/or laminate, for example by decreasing yellowing as the film and/or laminate ages.

The film can comprise good adhesion to a substrate (e.g., glass-based substrate and/or ceramic-based substrate). Providing the tri-block copolymer comprising the first block grafted with the first functional group can improve adhesion of the film (e.g., tri-block copolymer) with a substrate (e.g., glass-based substrate, ceramic-based substrate). Providing a silane coupling agent can increase an adhesion of the layer (e.g., film) to a substrate (e.g., glass-based substrate, ceramic-based substrate, the rest of a laminate) and improve the durability of the film and/or laminate. Providing the first function group comprising a silane can increase an adhesion of the film (e.g., tri-block copolymer) without the need for a separate silane coupling agent, decreasing processing complexity and time. Providing the first functional group comprising a silane can maintain and/or increase an adhesion of the film (e.g., tri-block copolymer) as the film ages, for example, as the silane forms and/or reforms interactions with the substrate, silsesquioxanes, and/or other silanes. Providing the film can enable a substantially uniform thickness of the film when incorporated in the laminate, for example, by having good dimensional stability. Providing the film can be easy to handle, store, and/or process into the laminate.

Methods are disclosed that can form a laminate from a film and a substrate. For example, a film can be formed of an adhesive material and/or a polymeric material by heating a liquid comprising the material and/or by extruding the material into a film. Providing a film can reduce processing steps to assemble the laminate. For example, laminates can be assembled using methods of the disclosure using a single heating cycle to bond one or more films, substrates, and/or other components of the laminate. Consequently, processing time and costs to create the laminate can be reduced. Providing films can reduce energy use, reduce material waste, and otherwise improve forming of the laminate. Multiple films can be stacked to form shapes and/or thicknesses configured to correspond to a shape of the substrate (e.g., recess) and/or a first portion and second portion.

Directional terms as used herein—for example, up, down, right, left, front, back, top, bottom—are made only with reference to the figures as drawn and are not intended to imply absolute orientation.

It will be appreciated that the various disclosed aspects may involve features, elements, or steps that are described in connection with that aspect. It will also be appreciated that a feature, element, or step, although described in relation to one aspect, may be interchanged or combined with alternate aspects in various non-illustrated combinations or permutations.

It is also to be understood that, as used herein the terms "the," "a," or "an," mean "at least one," and should not be limited to "only one" unless explicitly indicated to the contrary. For example, reference to "a component" comprises aspects having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, aspects include from the one particular value and/or to the other particular value. Similarly, when values are expressed as approximations, by use of the antecedent "about," it will be understood that the particular value forms another aspect. Whether or not a numerical value or endpoint of a range in the specification recites "about," the numerical value or endpoint of a range is intended to include two aspects: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In aspects, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular aspects may be disclosed using the transitional phrase "comprising," it is to be understood that alternative aspects, including those that may be described using the transitional phrases "consisting" or "consisting essentially of," are implied. Thus, for example, implied alternative aspects to an apparatus that comprises A+B+C include aspects where an apparatus consists of A+B+C and aspects where an apparatus consists essentially of A+B+C. As used herein, the terms "comprising" and "including", and variations thereof shall be construed as synonymous and open-ended unless otherwise indicated.

The above aspects, and the features of those aspects, are exemplary and can be provided alone or in any combination with any one or more features of other aspects provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the aspects herein provided they come within the scope of the appended claims and their equivalents.

What is claimed is:

1. A method of forming a laminate from a film comprising a first major surface and a second major surface opposite the first major surface, a film thickness defined between the first major surface and the second major surface in a range from about 5 micrometers to about 400 micrometers, the method comprising:

disposing the second major surface of the film over a third major surface of a substrate, the substrate comprising a fourth major surface opposite the third major surface and a substrate thickness defined between the third major surface and the fourth major surface wherein the substrate comprises a glass-based substrate and/or a ceramic-based substrate;

applying a first release layer over the first major surface of the film and a second release layer over the fourth major surface of the substrate;

placing the film and the substrate in a vacuum container;

heating the film and the substrate at a first temperature in a range from about 40° C. to about 100° C. for a time in a range from about 10 minutes to about 8 hours; and heating the film and substrate at a second temperature in a range from about 150° C. to about 250° C. at a gauge pressure in a range from about 1.0 MegaPascals to about 1.5 MegaPascals for a time in a range from about 30 minutes to about 2 hours to form the laminate, wherein the film comprising a tri-block copolymer comprising a first block positioned between two second blocks, the first block is grafted with a first functional group, the film comprises, based on 100 wt % of the film, from greater than or equal to 45 wt % to less than or equal to 87 wt % of the first block in the tri-block copolymer and from greater than or equal to 8 wt % to 45 wt % of the two second blocks in the tri-block copolymer.

2. The method of claim 1, the first block comprising a first glass transition temperature Tg1 of about 0° C. or less, the two second blocks each comprising a glass transition temperature Tg of about 50° C. or more, and a combined weight of the two second blocks is in a range from about 10 weight % to about 50 weight % of the tri-block copolymer.

3. The method of claim 1, wherein one or both of the second blocks is selected from a group consisting of polystyrene, poly(vinyl pyridine), poly(vinyl phenol), poly(ethylene terephthalate), polysulfone, parylene, poly(phenylene oxide), polyarylate, polycarbonate, poly(methyl methacrylate), polymethylacrylic acid, poly(acrylic acid), polymethacrylamide, polyacrylamide, polyacrylonitrile, and derivatives thereof.

4. The method of claim 1, wherein the first block is selected from a group consisting of polybutadiene, polybutylene, polyisobutylene, polyisoprene, poly(ethylene-co-butylene), poly(ethylene-co-butylene-co-styrene), poly(ethylene-co-propylene), and combinations thereof.

5. The method of claim 1, wherein the first functional group is selected from a group consisting of anhydrides, acrylates, isocyanates, maleates, and silanes.

6. The method of claim 1, wherein a weight of the first functional group is in a range from about 0.5 weight % to about 2 weight % of the tri-block copolymer.

7. The method of claim 1, wherein the film comprises a refractive index at 589 nanometers in a range from about 1.48 to 1.53.

8. The method of claim 7, wherein the refractive index of the film at 589 nanometers is in a range from about 1.498 to about 1.502.

9. The method of claim 1, further comprising a silane coupling agent attaching the second major surface of the film to the third major surface of the substrate.

10. The method of claim 9, wherein the silane coupling agent comprises an amine-functionalized silane coupling agent.

11. The method of claim 1, wherein the film further comprises an antioxidant.

12. The method of claim 2, wherein the combined weight of the two second blocks is in a range from about 13 weight % to about 30 weight % of the tri-block copolymer.

13. The method of claim 1, wherein the tri-block copolymer comprises a plurality of tri-block copolymers, a first tri-block copolymer of the plurality of tri-block copolymers comprising a first combined weight of the two second blocks greater than a second combined weight of the two second blocks of a second tri-block copolymer of the plurality of tri-block copolymers.

14. The method of claim 1, wherein the film comprises a shear strength of about 1 MegaPascal or more in a Lap Shear Test after being held in a 65° C., 70% relative humidity environment for 10 days.

15. The method of claim 1, wherein the film comprises a color difference of about 0.5 or less after being held in a 60° C., 90% relative humidity environment for 120 hours.

16. The method of claim 1, wherein an absolute difference in a CIE L* value between the film as-formed and the film is about 1 or less after being held in a 60° C., 90% relative humidity environment for 240 hours.

17. The method of claim 1, wherein the first functional group comprises maleic acid, maleic anhydride, or combinations thereof.

18. The method of claim 1, wherein an absolute difference between a refractive index of the substrate at 589 nanometers and the refractive index of the film at 589 nanometers is about 0.01 or less.

19. The method of claim 1, wherein a maximum absolute difference between a refractive index of the substrate and the refractive index of the film over optical wavelengths from 400 nanometers to about 700 nanometers is about 0.01 or less.

* * * * *